(12) United States Patent  
Gamble

(10) Patent No.: US 7,194,072 B2  
(45) Date of Patent: Mar. 20, 2007

(54) METHOD AND SYSTEM FOR REMOTELY ACCESSING AND CONTROLLING REMOTE DEVICES

(76) Inventor: Oliver W. Gamble, 436 E. 75th St., New York, NY (US) 10021

( * ) Notice: Subject to any disclaimer, the term of this patent is extended or adjusted under 35 U.S.C. 154(b) by 354 days.

(21) Appl. No.: 09/803,257

(22) Filed: Mar. 9, 2001

(65) Prior Publication Data

US 2002/0041667 A1    Apr. 11, 2002

Related U.S. Application Data

(63) Continuation-in-part of application No. 09/552,711, filed on Apr. 19, 2000, now Pat. No. 7,068,776.

(60) Provisional application No. 60/263,506, filed on Jan. 24, 2001.

(51) Int. Cl.
*H04M 11/08* (2006.01)

(52) U.S. Cl. .......................... 379/102.03; 340/825.69; 455/403; 713/168

(58) Field of Classification Search ................ 379/563, 379/102.01–102.09, 379–382, 29.03, 29.04, 379/106.05, 106.08, 93.27, 93.18, 93.05; 455/419, 403, 414

See application file for complete search history.

(56) References Cited

U.S. PATENT DOCUMENTS

| | | | | |
|---|---|---|---|---|
| 5,051,720 A | * | 9/1991 | Kittirutsunetorn | ..... 340/310.12 |
| 5,761,280 A | * | 6/1998 | Noonen et al. | .......... 379/93.27 |
| 5,915,026 A | * | 6/1999 | Mankovitz | ................... 713/168 |
| 5,974,449 A | * | 10/1999 | Chang et al. | ................ 709/206 |
| 6,044,278 A | * | 3/2000 | Goto et al. | .............. 455/422.1 |
| 6,144,848 A | * | 11/2000 | Walsh et al. | ................. 455/419 |
| 6,167,251 A | * | 12/2000 | Segal et al. | .................. 455/406 |

FOREIGN PATENT DOCUMENTS

JP            410126494        *   5/1998

* cited by examiner

*Primary Examiner*—Gerald Gauthier

(57) ABSTRACT

A method and system for enabling users to remotely activate a device using a router. The router may be accessed by communication over one or more networks including, but not limited to, the internet, wireless networks, cable networks, etc. A user accesses an emitter of the user's router and, using transmitted DTMF tones, controls the device.

53 Claims, 12 Drawing Sheets

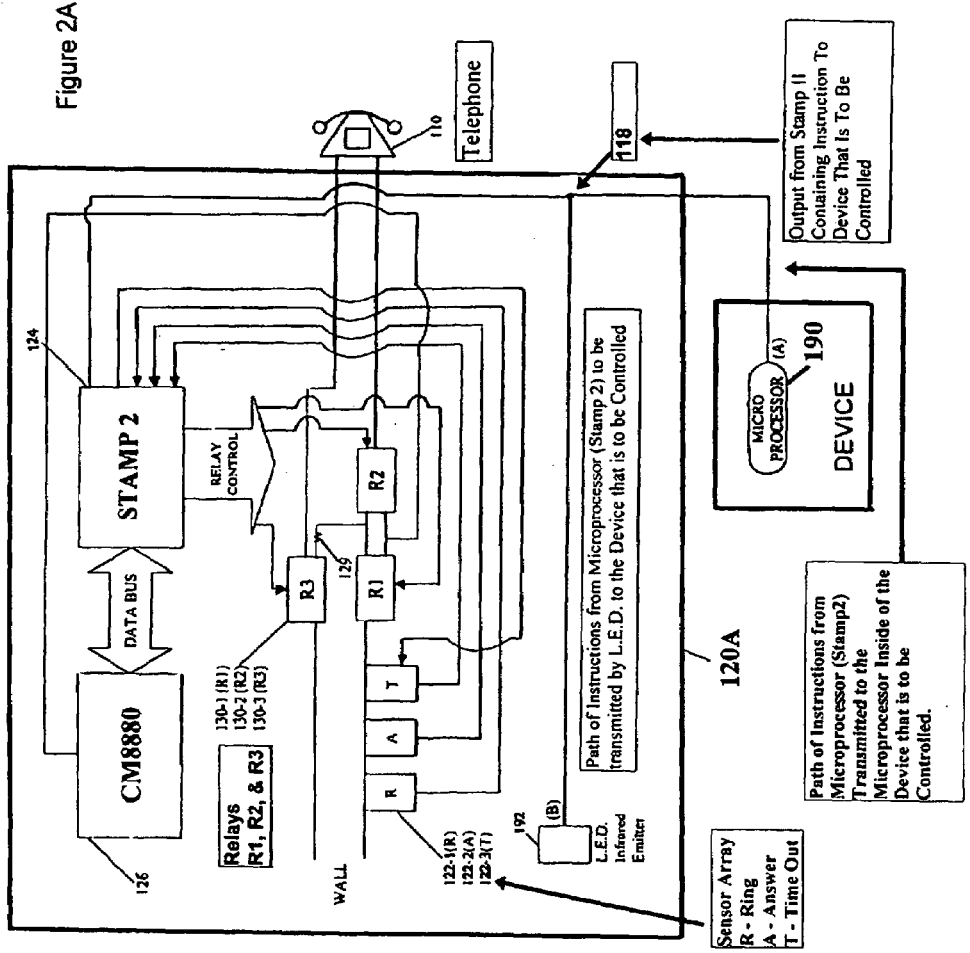

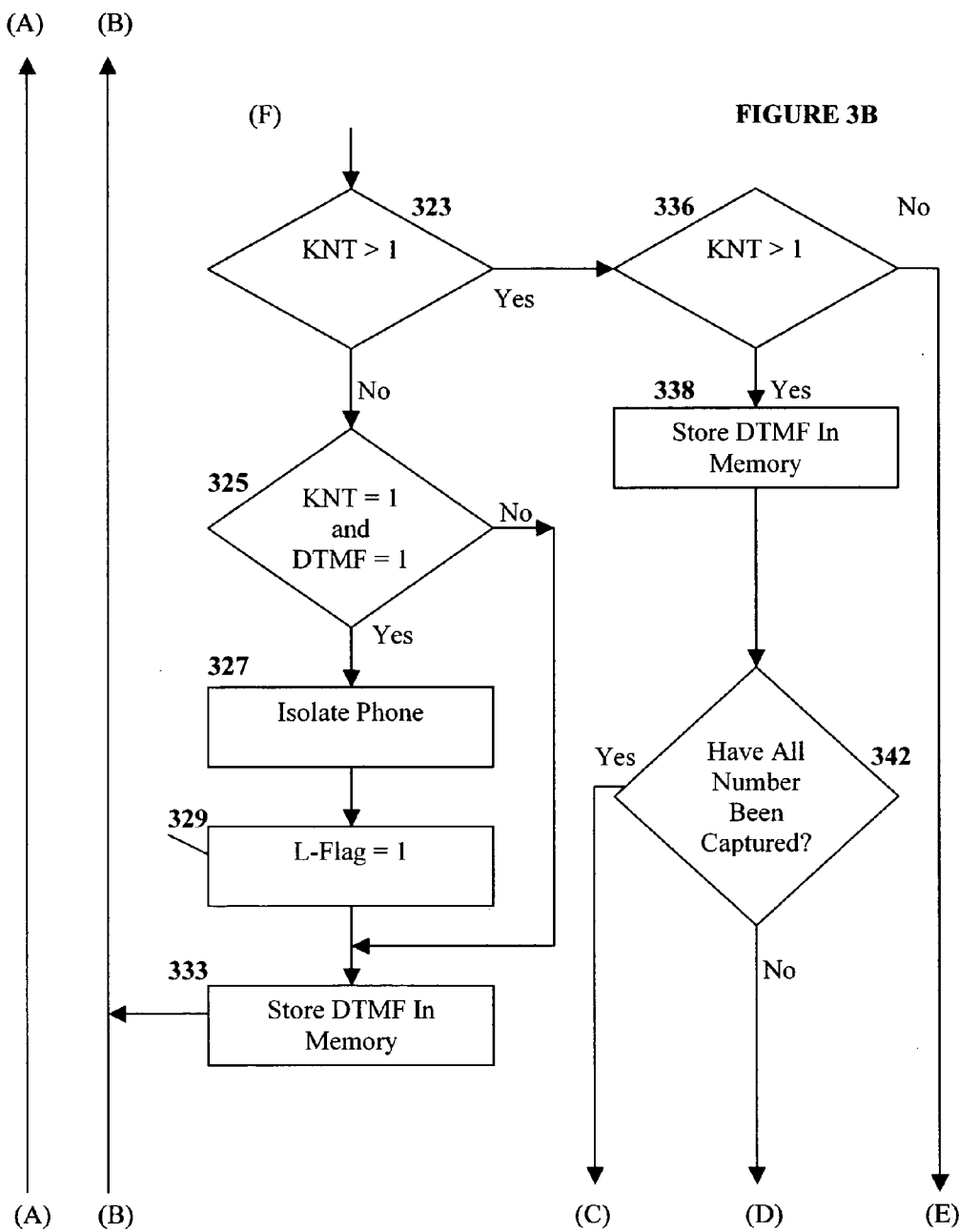

RINGING

ANSWER

DIALING

METHOD AND SYSTEM FOR REMOTELY ACCESSING AND CONTROLLING REMOTE DEVICES

This is a continuation-in-part of application Ser. No. 09/552,711, filed Apr. 19, 2000, now U.S. Pat. No. 7,068,776.

I claim the priority of provisional patent application 60/263,506, filed on Jan. 24,2001; this application is incorporated by reference in it entirely.

FIELD OF THE INVENTION

The present invention relates generally to a method and system for accessing and controlling devices via remote control over communication systems, and more particularly to a method and system for controlling media recording using the telephone, internet or cable.

BACKGROUND OF THE INVENTION

Often, individuals wish to view a program which requires users to set a media recorder to record the desired program or to contact another person to record the program on a user's behalf. The result is that viewers may miss out on programs that they would like to see because they lack the time to actually view the program, did not set their recorder to record the program, or could not get another person to record the program for them.

Various methods and systems exist for the recording of media, be it media in the form of conventional television, cable, Internet or satellite. The media can be recorded on tapes (e.g., VCR), digital storage sit on top boxes (e.g., TiVo) and hard disk or compact disk storage system. If there is no method of communicating with the storage device via remote access, then there is a lack of opportunity to record interesting media if user is away from the recording device.

SUMMARY OF THE INVENTION

The present invention allows users to remotely set their media recording devices for programs that they want to see, event if no one is in the same location as the recording device. This is accomplished by accessing an enhanced automatic router unit that is in communication with any device that may recognize an incoming call (e.g., answering machine, modified caller ID box, etc.).

The present invention is part of a system/method that allows users to contact a central site and leave instructions for their media recording devices. In one embodiment, users may be signed up purchasers of registered remote units.

The remote user can contact the central site via any Internet accessing device, phone (wire/wireless), fax, etc. The user may then supply requested information to enable the central site to access and set the user's recording device. The enhanced automatic router (EA router) may be attached to a modified Caller ID Box, a phone line with a standard answering machine, a computer, a cable line, etc. The media recording device can be one of a variety of media storage devices including, but not limited to, tape (e.g., VCR), digital (e.g., TiVo), laser (write-able compact disk), etc.

DETAILED DESCRIPTION

System of the Invention

Figure 1:
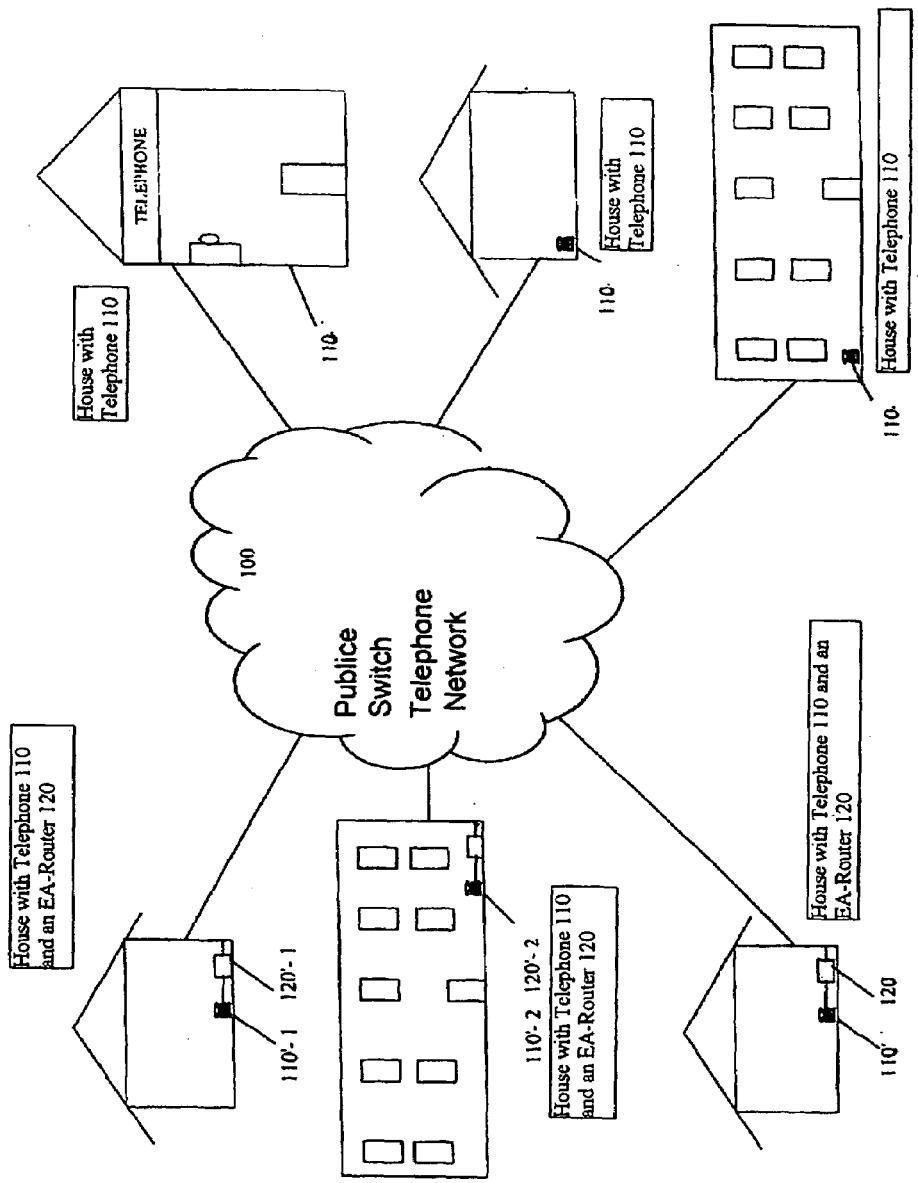
FIG. 1 illustrates a system according to one embodiment of the current invention.

FIG. 1 shows one embodiment of a system incorporating the present invention. In this embodiment, the system includes telephones or user interface devices 110 and 110'. Although the interface user device, in one embodiment, is a telephone, in an alternate embodiment, user interface devices 110 and 110' may be a facsimile, computer, online access device, voice response unit or the like. It should be noted that although references are made herein to telephones and user interface devices, these terms are used interchangeably and may include the other user interface devices listed above, as well as those that are not listed herein, that utilize telephony services to effectuate communication over network 100. It should be noted that the difference between user interface devices 110 and 110' is the devices' connection with automatic router 120 which is described in detail below (i.e., 110' denotes that the device is connected to router 120, while 110 has no such router 120 connected to it).

As shown in FIG. 1, user interface devices or telephones 110 and 110' are connected to a network 100. Network 100 in one embodiment is a public switched telephone network (PSTN). In an alternate embodiment, network 100 may be the internet, world wide web or any network capable of effectuating long distance telephony communications between users. The network enables any one of the interface user devices 110 and/or 110' to be in communication with any of the other user interface devices 110 and/or 110'.

As shown in FIG. 1, some of the interface user devices 110 are connected to an automatic router 120 which may be situated between the telephone 110 and the port (i.e., wall socket) into which the telephone 110 is plugged. As will be described below with reference to FIGS. 3–5, router 120 enables users having such device to automatically make discount telephone calls (or telephone calls). It should be noted that while telephone 110 and automatic router 120 are shown as two separate devices, router 120 may be attached to, located within, or otherwise in communication with telephone 110. Finally, although users seeking to utilize discount long distance services are typically residential or non-commercial users, the scope of the system and method described herein are not limited to such use. Thus, the method and system described herein may include residential telephone users as well as commercial telephone users. Finally, it should be noted that the method and system described herein enable users to recognize discounts when placing potential discount calls. Discount calls are defined as long distance or international calls, and, in some cases, local calls. Because long distance carriers offer local telephone service, and vice versa, a discount telephone service provider may offer discounted service for international service calls, long distance calls, local calls, or any combination of these call types.

Automatic Router

Figure 2:
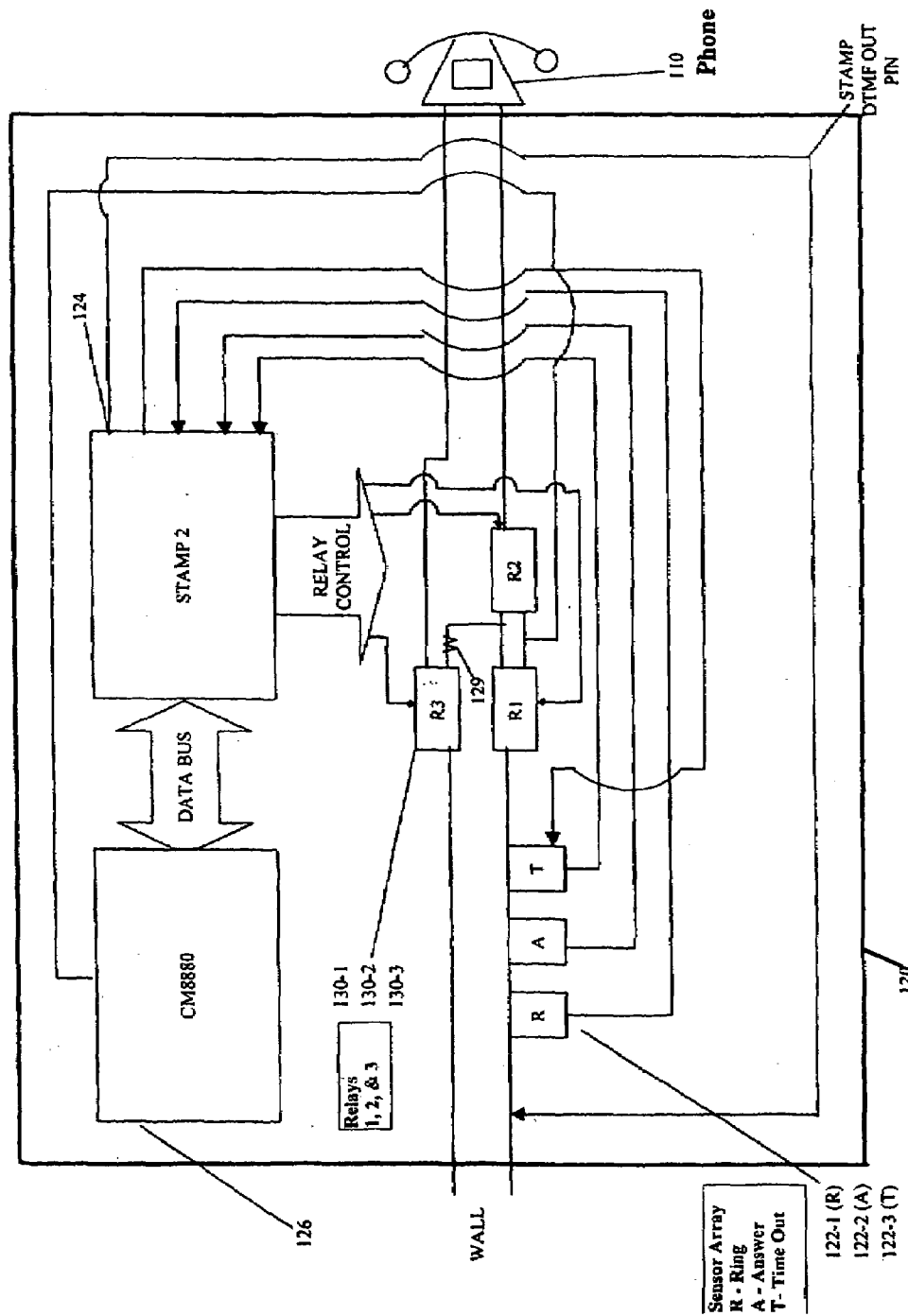
FIG. 2 illustrates one embodiment of the router used in the system shown in FIG. 1.

FIG. 2 illustrates one embodiment of the router 120 used in the system shown in FIG. 1. The main components of the automatic call router 120 are a sensor array 122, relays 130, stamp 124 (containing a microprocessing unit, EEPROM, clock and RAM memory), DTMF (Dual Tone Multi-Frequency) decoder and encoder chip 126, a 2 kilo-ohm@5 watt resistor 129, voltage regulator and a power supply. The automatic router 120 may be interposed between and in communication with the telephone or user interface device and the network as shown in FIGS. 1 and 2.

The sensor array 122 may consist of the following three sensors: ring sensor 122-1, an answer/off hook sensor 122-2, and a time out sensor 122-3. These sensors will be termed the R.A.T. for ringing, answering incoming call/off hook status of phone, and time out.

The ringing sensor 122-1 comprises an alternating current optoisolator coupler. The coupler may be attached to the phone line by a reverse facing diode, allowing only negative current to flow through the diode and the trigger of the coupler. Ringing is a process that employs both positive and negative moving current. The reverse facing diode allows only the negative current to reach the coupler. The light emitting diode inside the coupler, in one embodiment, activates a photo-transistor. The photo-transistor allows current to flow through it to a pin on the microprocessor. The microprocessor detects the current as a high signal, indicating ringing of the phone.

The answering/off hook sensor 122-2, comprises an alternating current optoisolator coupler. The coupler is attached to the phone line by a forward facing diode, allowing only positive current to flow through the diode and trigger the coupler. When the phone 110 is off the hook, current flows through the phone line to the coupler. The light emitting diode inside the coupler activates a photo-transistor. The photo-transistor allows current to flow through it to a pin on the microprocessor. The microprocessor detects the current as a high signal, indicating the off hook status of the phone.

The time-out sensor 122-3, in one embodiment, is comprised of an alternating current optoisolator coupler and a triac. The coupler is attached to the phone line with leads coming from both the ring and answering sensors. When the phone 110 is off the hook, current flows through the phone line to the coupler. The light emitting diode inside the coupler activates a photo-transistor. The photo-transistor allows a signal current to flow through it to a pin on an optoisolator triac. The triac is activated by a signal from the microprocessor. The phone line signal is directed to the relays. The microprocessor sends a one time activation signal to the triac after it has determined that the phone 110 is off the hook to make an outgoing phone call. This late activation prevents the time-out sensor from falsely reading the ringing or answering incoming call. While the phone is off the hook, the triac will pass a current through a photo-transistor to the microprocessor. The triac will continue to pass current and maintain the high pin state until a circuit break occurs, resulting in a momentary drop in current (and voltage) followed by a resumption of current (and voltage). The microprocessor sends a signal to activate the triac each time the power flowing through it is momentarily halted.

The high signal on the time-out pin is turned off. This continues until the triac is reactivated. The triac is activated once per outgoing telephone call. The absence of a high on the pin attached to the triac indicates expiration of the allotted time.

The optoisolator couplers employed, in one embodiment, is part number H11AA814AQT-ND or H11AA814QT-ND manufactured by Optoelectronics. The optoisolator triac may be part number MOC3010QT-ND also manufactured by Optoelectronics. Of course, other components and/or configurations may be used for accomplishing such monitoring.

The relays 130 used in one embodiment of the router 120 have both a normal close circuit and a normal open circuit. The application of a current to the coil will cause the normally open circuit to close, and the normally closed circuit to open. The default state (no power applied to the coil) allows a telephone call to pass through the automatic call router 120. When a current is applied to the coils of relay 1 (R1) 130-1 and relay 2 (R2) 130-2, an alternate path is opened, one that routes the phone line to the DTMF encoder/decoder 126. This re-routing of the phone line allow the microprocessor to monitor/read DTMF tones originating from the phone 110. The microprocessor initiates the monitoring for DTMF tones whenever it detects an outgoing call via the sensors 122. The signal from the microprocessor activating the relay designated relay 2 (130-2) also activates an optoisolator linking the phone line to a common ground, enabling the microprocessor to read the DTMF digits. The microprocessor activates the third relay (R3) 130-3 when it detects a one ("1") as the first DTMF position passing down the telephone line. Although detection of the number "1" as the first DTMF position activates relay 3 (130-3) and deactivates relay 1 (130-1) in the present embodiment, different number(s) and/or different DTMF position(s) may activate relay 3 (130-3) and deactivates relay 1 (130-1). Once relay 130-3 is triggered and relay 130-1 is deactivated, the phone 110 is isolated, and the phone line is seen as being busy to the outside world.

The signal that activates the third relay 130-3 may also activate an optoisolator. This optoisolator provides power needed to allow the phone 110 to continue functioning. When relay 3 (130-3) is activated, 2 kilo-ohm resistor which is connected across the incoming line from the wall enables the system to emulate that the phone 110 is busy. In one embodiment, the relays 130 used are part # G6E-134P-ST-US-DC5 made by Omron. Of course, other components and/or configurations may be used for accomplishing such control over the telephone line wiring.

A stamp 124 is employed by router 120 and comprises a PIC-micro-controller chip (microprocessor), PBasic interpreter chip (software language use to program the microcontroller), EEPROM (electrically erasable programmable read only memory), RAM (Random Access Memory), clock and ports through which information and instructions can be passed. In this embodiment these ports are called pins, and each pin may be in either a high or low state. The micro-controller uses the state of the sensor pins to monitor the phone line for activity. The sensors 122 are attached to specific pins on the micro-controller, and when these pins go high or low, the micro-controller via the program store in its memory, can determine what is happening. The micro-controller is able to detect an active phone state by monitoring the pin connected to the "A" (answer/off hook sensor). The relays 130 used in the router 120 are attached to specific pins of the micro-controller. The micro-controller recognizes which pin is attached to which relay 130, and the program tells the micro-controller when each relay should be employed. The micro-controller can activate a specific relay by outputting a small voltage to the pin attached to that relay coil. When the pin goes high the relay 130 is activated, and when the pin goes low the relay 130 is de-activated. In one embodiment a stamp II 124 manufactured by Parallax Inc./Microchip Technology (part # PIC 16C57) is used. Of course, other components and/or configurations may be used for accomplishing such control and monitoring of telephone line activity.

The CM8880 126 is a fully integrated DTMF transceiver. This transceiver 126 may be interfaced with a computer/microprocessor to detect and interpret DTMF signals. The transceiver 126 is attached to the telephone 110 via the alternate path created when the relay 1 (130-1) and relay 2 (130-2) are activated. By placing the transceiver 126 connection on the alternate path of the phone line, it is protected from the high voltage of a phone ringing. The phone ring consists of both forward and backward flowing (AC) current at a voltage level that could otherwise damage the transceiver 126.

Once the microprocessor detects an outgoing call state, it triggers the relays 130 that bring the transceiver 126 in contact with the phone line. This will enable the transceiver 126 to interpret the DTMF tones on the phone line, and pass it to the microprocessor. Although the current embodiment employs a CM8880 DTMF transceiver made by California Micro Devices (part # CM8880PI), other components and/or configurations may be used for accomplishing such decoding and encoding of DTMF.

A standard 9 volt and a standard 5 volt regulator may be employed as a power source for the router 120. The 5 volt supply may be used to power the DTMF transceiver 126, the relays 130, the sensors 122 to signal the microprocessor and the stamp 124. The 9 volt source powers the isolated telephone 110. The 5 volt and 9 volt regulators used by the router 126 may be, in one embodiment, Japan Radio Company part # NJM7809-FA and NJM7805-FA, respectively. Of course, other components may be used for accomplishing such regulation of voltage.

Modified Automatic Router

Figure 2:
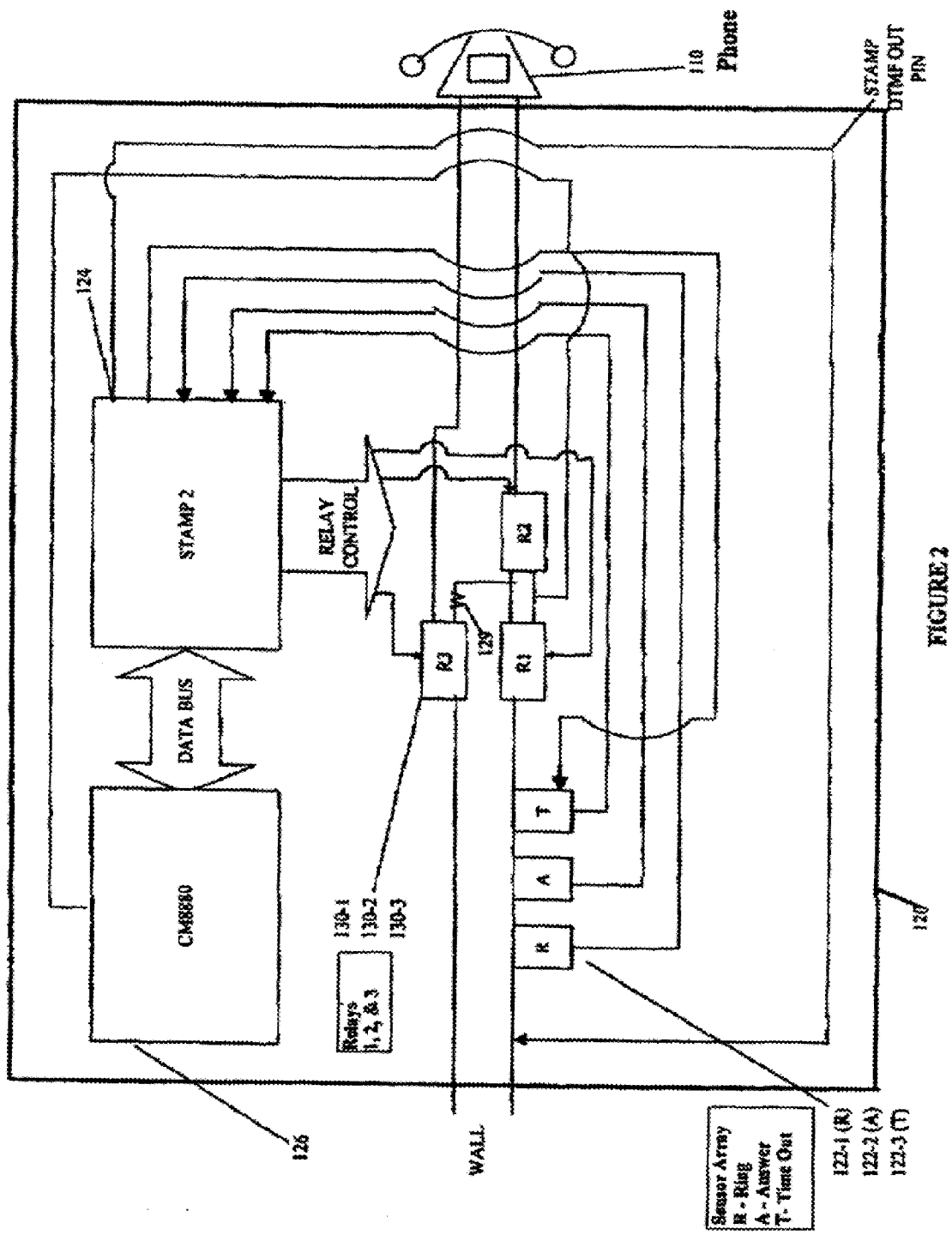
Figure 2A:
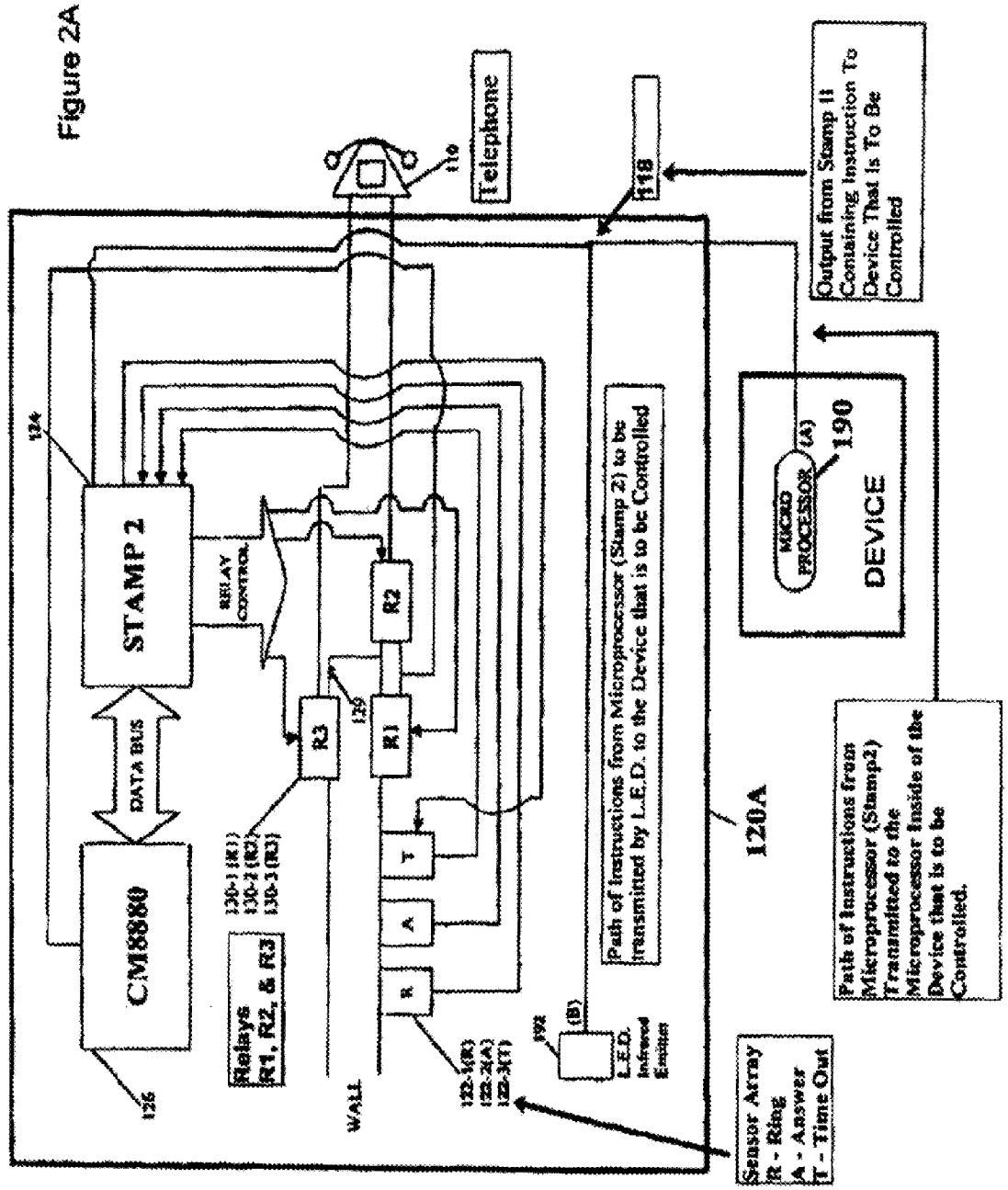
FIG. 2A illustrates another embodiment of the router (EA router) used in the system shown in FIG. 1.

FIG. 2A discloses automatic router 120A which has many of the same components as, and largely function similarly to, the router 120 of FIG. 2. In one embodiment, the router 120A is the same as router 120, except that it can communicate with an external device via light, electrical signals, etc. Router 120A can mimic a remote control device via infrared lights signals (by, e.g., infrared emitter 192), or via a wire connecting it to microprocessor 190 inside a recording device.

It should be noted that, in another embodiment, the functionality of stamp 124 can be divided into two separate but linked microprocessors. The EA router 120A may be in communication with the user's answering machine or some other remote user interface device accessible by a telecommunication system.

In one embodiment, the EA router 120A works by mimicking a manufacturer-supplied remote control. This remote control device can, for example, take the form of a hand held light emitting device or a wire-attaching the router 120A to a microprocessor controlling the external device (e.g., TiVo sit on top box).

In one embodiment, the EA router 120A works by mimicking. The infrared emitter 192 (FIG. 2A) component of the EA router 120A can mimic the manufacture's remote control device code signals. This enables the user to key in instructions from a remote site and have the EA router 120A act as their proxy in issuing instruction to their recorder.

In an another embodiment the EA router 120A may be physically connected to the recording device by a wire that jacks into both units. The EA router stamp 124 (FIG. 2A)., may send a series of electrical impulses through a connecting wire to a micro-controller in the recording device. The micro-controller 190 (e.g., PIC 16C63 from Microchip, Inc.) in the recording device (FIG. 2A) converts the stamp 124 communicated data into instructions for recording a desired program. This enables the user to key in instructions from a remote site and have the EA router 120A act as a proxy in issuing instruction to their recorder.

Automatic Routing Process

The process of automatic router 120 may be segmented into three functions: (1) monitoring the telephone line for activity; (2) detecting whether a potential discount telephone call is placed; and (3) placing such call at a discounted rate when such rate is available. These processes are described below in detail with reference to FIGS. 3–5 as well as the components illustrated in FIG. 2.

Phone Line Monitoring Process

The phone lines between the wall and the telephone 110 may be comprised of two wires. In one embodiment, the optoisolator of the "A" (answer/off hook) sensor 122-2 and "R" (ringing) sensor 122-1 are arranged in parallel with the telephone 110 red wire coming from the wall socket. The optoisolator of the time out sensor 122-3 is arranged in series with "A" (answer/off hook) sensor 122-2 and "R" (ringing) sensor 122-1. This allows the sensors to monitor phone line activity. In one embodiment, the phone line which the sensors are monitoring is connected to relay 1 (130-1). The optoisolator coupler of the time-out sensor 122-3 is connected to Relay 1 (130-1). Relay 1 is connected to relay 2 (130-2), and relay 2 is connected to the telephone 110. Relay 3 (130-3) is attached to the other wire in the line coming in from the wall and going to the phone 110. In this embodiment relay 3 (130-3) is attached to the green wire. The sensors are attached to the red wires.

Referring to FIG. 3, the automatic router 120 uses a sensor array 122 to monitor the telephone line for activity (i.e., ringing of the phone, answering an incoming call, or initiating a outgoing call) (steps 305 and 310). In FIG. 2 the sensor array 122 is denoted as 122-1 (ring), 122-2 (answer/off hook), and 122-3 (time out)- R.A.T.

The "A" (answering/off hook) sensor 122-2 is connected to the stamp 124 at a pre-determined pin. While this pin remains in a low state, the stamp 124 recognizes that the phone 110 is still on the hook (phone is inactive). The telephone 110 is considered active when it is ringing, being answered, or being used to make an outgoing call. When the phone is active the pin for the "A" (answer/off hook) sensor 122-2 is high.

Upon detecting a high state on the "A" (answer/off hook) sensor pin, the stamp 124 utilizes software to determine the exact nature of the phone active state. The stamp 124 briefly polls the pins for both the "R" (ringing) and "A" (answering) phone sensors. A polling cycle may vary, for example, from 0.3 to 0.6 seconds. The stamp 124 monitors the telephone line for activity that is specific to each of the three possible activities (FIG. 5). If the active state is the result of a ringing condition, the alternating (negative and positive flowing) current will appear as only the bottom portion of FIG. 5A. The reverse diode allows only the negative portion of the ring pattern to be detected. The pattern continues as long as the phone is ringing, and the stamp 124 experiences a series of periodic highs on the "R" (ring) sensor pin.

Figure 5A:
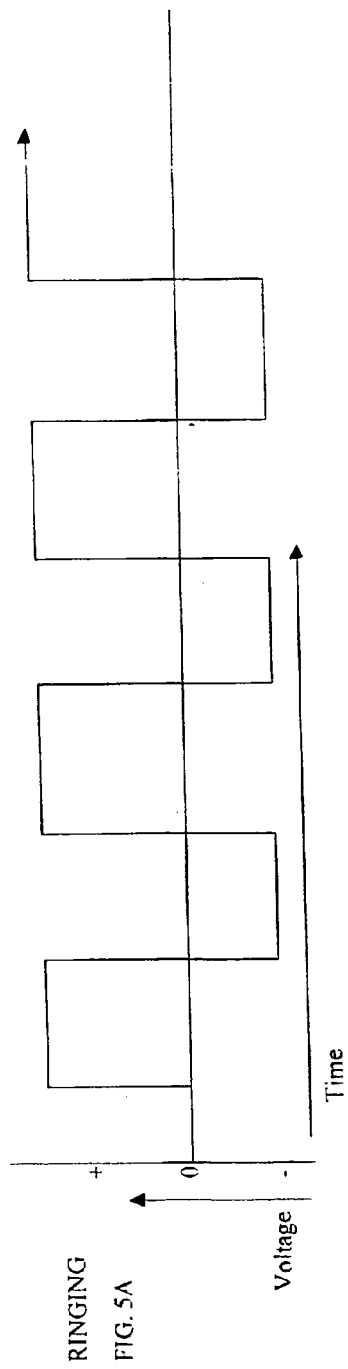
FIG. 5 is a chart illustrating the various signals detected by the automatic router shown in FIG. 2 as it monitors the phone line for activity.
Figure 5B:
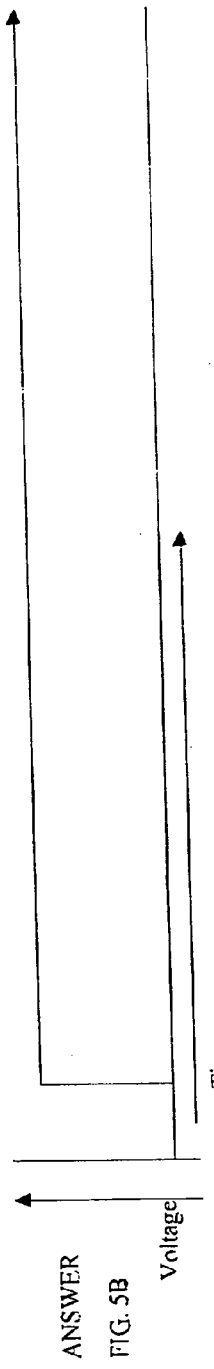
Figure 5C:
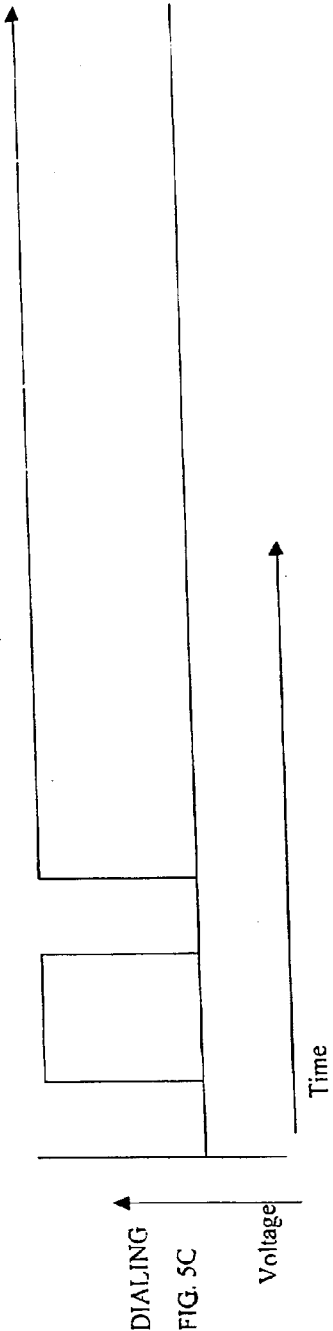

If the active state is the result of an incoming call being answered, the stamp 124 detects a pattern similar to FIG. 5B, and the "A" (answer/off hook) sensor 122-2 goes high and remains high until the telephone call is over. If the "A" (answer/off hook) sensor 122-2 is high because of an outgoing call, the stamp 124 detects a pattern similar to FIG. 5C. As FIG. 5C illustrates, a brief pause in the flow of current through the "A" (answer/off hook) sensor 122-2 is recognized. After the brief pause, the current will resume to flow and continue to flow until a time out occurs. A time-out is defined as a condition in which the phone company has determined that the phone 110 has been off the hook for a predetermined period of time and no valid phone number has been entered. When this occurs, the phone company may interrupt the calling process with a message instructing the caller to please hang-up and try again. In this embodiment, such message is termed the "time out message."

When the stamp 124 detects a high on the "A" (answer/off hook) sensor 122-2 pin, it briefly polls both the "A" (answer/off hook) sensor 122-2 and "R" (ring) sensor 122-1 for status. If a high on the "R" (ring) sensor 122-1 is detected, a ring-flag is changed from "0" to "1" in the software. The stamp 124 likewise changes the call-flag from "0" to "1" if the high on the "A" (answer/off hook) sensor pin is briefly interrupted. The stamp 124 continues the polling process until it no longer detects a high on the "R" (ring) sensor 122-1 during a polling cycle. Upon detecting a high on the ring sensor, the stamp 124 will restart the polling cycle. Once the ringing stops, or if no ringing is detected within a polling cycle, the stamp 124 polls the "A" (answer/off hook) sensor 122-2 to determine the "call-flag" status. If the call-flag has a value of "1", and the ring-flag has a value of "0", and the "A" sensor is high, then the stamp 124 recognizes that the call is outgoing. If the ring-flag has a value of "1" and the call-flag has a value of "0", and the "A" sensor is high, then the stamp 124 recognizes that the call is an answered incoming call. For a summary, see Table 1 below.

TABLE 1

| Ring-Flag | Call-Flag | Answer/Off Hook Sensor Status | Meaning |
|---|---|---|---|
| 1 | 0 | Low | Phone Ringed But Not Answered |
| 1 | 0 | High | Answer Incoming Call |
| 0 | 1 | High | Outgoing Call |
| 1 | 1 | High/Low | Phone is Ring |

The stamp 124 considers the "A" (answer/off hook) pin going low and remains low at the completion of an active event. The stamp 124 resets itself and goes back to polling the phone line for activity. In one embodiment, the "A" (answer/off hook) pin goes low and remains low once the call is completed and the phone is placed back on the hook.

If an outgoing call is being made, the router 120 will determine the nature of the call by looking, for example, for a "1" in the first position of the phone number being dialed. The absence of a "1," unless discounted local service is available, places the router 120 in a passive mode, and allows the phone call to occur but not to perform its routing function. The presence of a "1" in the first position of the phone number being dialed triggers the router 120 into performing its specialized function (routing the call) as described more fully below. Other series of numbers may be used to trigger router 120. For example, the router 120 may be configured to trigger all calls beginning with "011", or all eleven digit telephone numbers beginning with "1" less 1800, 1888, telephone numbers and the like, or all "9011", or "91" twelve digit phone numbers (usually dialed to gain long distance or international access in settings such as offices or hotels).

Long Distance Call Detection and Router Response Process

Although the system and methods may be configured for all types of telephone service, the process of detecting. and routing long distance calls will now be described Referring back to FIG. 3, once an outgoing telephone call is detected in step 315, stamp program determines whether the outgoing telephone call being placed is a long distance call. It should be noted that when an off-hook condition exists but the call is not an outgoing call, the monitoring process for an outgoing call is restarted at the end of the off-hook condition (step 320).

In step 321, the stamp 124 and DTMF decoder 126 determine whether a DTMF tone is detected prior to a time out condition (step 319). In one embodiment, whenever a time out condition is detected, the relays are released (step 334) and the process restarts once the phone is on hook (step 335).

If time-out has not occurred, the stamp 124 will start counting the DTMF signal detected. With each detected DTMF signal, the count is advanced. A determination is then made in step 323 as to whether the number of DTMF tones detected is greater than one. If the count is not greater than 1 (step 323), the stamp 124 advances the system to determine if the first DTMF is equal to one (step 325). The detected DTMF is then stored in memory and the process returns to step 319 (checking for a time-out and new DTMF signal). If the first DTMF is equal to 1, the stamp 124. isolates the phone from the outside world (step 327) and sets the L-flag from "0" to "1" (long distance flag to true) (step 329). The stamp 124 returns the process back to step 319 (checking for a time-out and new DTMF signal).

If the number of detected/stored DTMF signals is greater than one (step 325) and no long distance call is indicated (step 336), the router 120 waits until the phone is on the hook (step 375) before monitoring the phone line again (step 305-310).

The presence of a "1" in the first, or in a predetermined position of the phone number being dialed informs the router 120 that the call is a long distance call. In one embodiment, the router 120 will be monitoring the first position of the dialed telephone number. When the router's microprocessor detects a "1" in the first position of the phone number being dialed, the router 120 assumes an active mode. In the active mode, the router 120 activates relay 3 (130-3) and de-activates relay 1 (130-1), effectuating the isolation of the telephone 110 from the outside world. The internal power source needed to keep the phone 110 functioning is also turned on. The phone 110 uses the power to run its internal DTMF generator enabling the caller to dial their desired phone number.

The DTMF transceiver attached to the telephone line, along the alternate path created by relay 1 (130-1) and relay 2 (130-2) activation (FIG. 2 between 122-1 and 122-2), captures all dialed DTMF digits and pass them on to the microprocessor. The telephone numbers dialed by the user are captured and stored in the microprocessor RAM memory. While the dialed phone number is being captured, the microprocessor is periodically monitoring the "T" (time out) sensor. Once the microprocessor has captured the required number of DTMF digits to initiate the call it will check the first four digits. The first four digits will tell the router 120 if it should route the call to a discount carrier.

If the caller has dialed a special number such as 1(888), 1(800), 1(900), or 1(600) the router coding effectuates the dialing of the "balance" of the phone number that the user entered and then releases the relays 130. Releasing the relay will reconnect the telephone 110 to the outside world. The term "balance" refers to the condition in which a "1" was dialed before the telephone was isolated from the outside world. Therefore, to complete the call, the router 120 will only have to dial all the entered DTMF digits except the first "1". If the caller did not dial a special phone number, the router dials the "modify balance" of the number and releases the relays 130. In "modify balance" of the number, refers to the condition in which a "1" was already dialed before the telephone was isolated from the outside world. In "modify balance" mode, the router 120 dials the discount number without including the starting "1" when dialing the customer long distance number: for example, 1010-321 1(201)123-1234 would be 010-321 1(201)123-1234; and 1(800)7654321 would be 8007654321. If the long distance carrier requires an access code, the router 120 provides such code. The router 120 waits for the "A" (answer/off hook) sensor pin to go low and remain low before concluding that the call is over, and returns to monitoring the phone line for activity. It should be noted that the router 120 may be reconfigured/programmed such that any individual or series of digits and/or any predetermined positioning of such digit may trigger the discount long distance call placing process. For example, if the router 120 is being used in an office building, hotel or some other location where a "9" is dialed prior to placing outside call, the router 120 may be set (i.e., via a switch access by the user) so that the second position digit is detected for the number "1". If in the process of capturing the long distance telephone number being dialed by the user the "T" (time out) sensor 122-3 should go low (indicating the call can not be completed), the router's microprocessor releases the relays 130 allowing the user to hear the time out message. The microprocessor then waits until the "A" (answer/off hook) sensor 122-2 goes low before resetting the system and monitoring the telephone line for activity.

Returning to FIG. 3, if in step 336, a long distance call is indicated, DTMF tones are stored in memory (step 338) and a determination is made as to whether all of the numbers have been captured (step 342). If all of the numbers have not been captured, a determination is made as to whether a time-out condition has occurred (step 376). If such a condition has not occurred, the router 120 resumes detecting and collecting DTMF signals (step 319). If a time-out condition is sense in step 376, the relays are released (step 377) and the router 120 waits for an on hook condition (step 378) which restarts monitoring of the phone line (steps 305–310).

Discount Long Distance Call Placing Process

If long distance call has been detected (step 336) and all of the numbers have been captured (step 342), router 120 dials the access number for the discount supplier (step 345), provides the access code (if required) (step 350) and dials the telephone number entered by the user (step 355). The relays are then released (step 360), reconnecting the telephone 110 to the outside world allowing communication to occur. An end of call condition is then monitored (steps 365 and 370) upon which the router 120 returns to monitoring of the phone line (steps 305–310).

In certain cases, such as when the telephone user is accessing its dial around service from home, the access code may not be required by the discount long distance carrier. In those cases, the access code is not provided. The appropriate number and code may be, in one embodiment, chosen from a plurality of such numbers and codes in accordance with a predetermined protocol. For example, software may enable router 120 to choose a certain access number/code when such number/code is the most cost-efficient. In another embodiment, the stored access numbers/codes may be utilized on a rotating basis so that the subscribing long distance companies can benefit equally from use of its service while the customer continues to recognize savings associated with the discounted services.

Again, it should be noted that router 120 may be reconfigured such that any individual or series of digits and/or any predetermined positioning of such digits may trigger the discount long distance call placing process. For example, the router 120 may be programmed such that if the DTMF encoder/decoder chip 126 of router 120 senses that the first three number are "011" (or first four numbers are "9011" where "9" is required for an outside line), then an international call is being made. Accordingly, router 120 may be programmed with the appropriate discount international call access numbers in order to apply discounted rates to these calls as well. Once the predetermined sensing is accomplished, the discount long distance call placing process may be effectuated.

Discount Long Distance/International Call Dialing Process

Figure 3A:
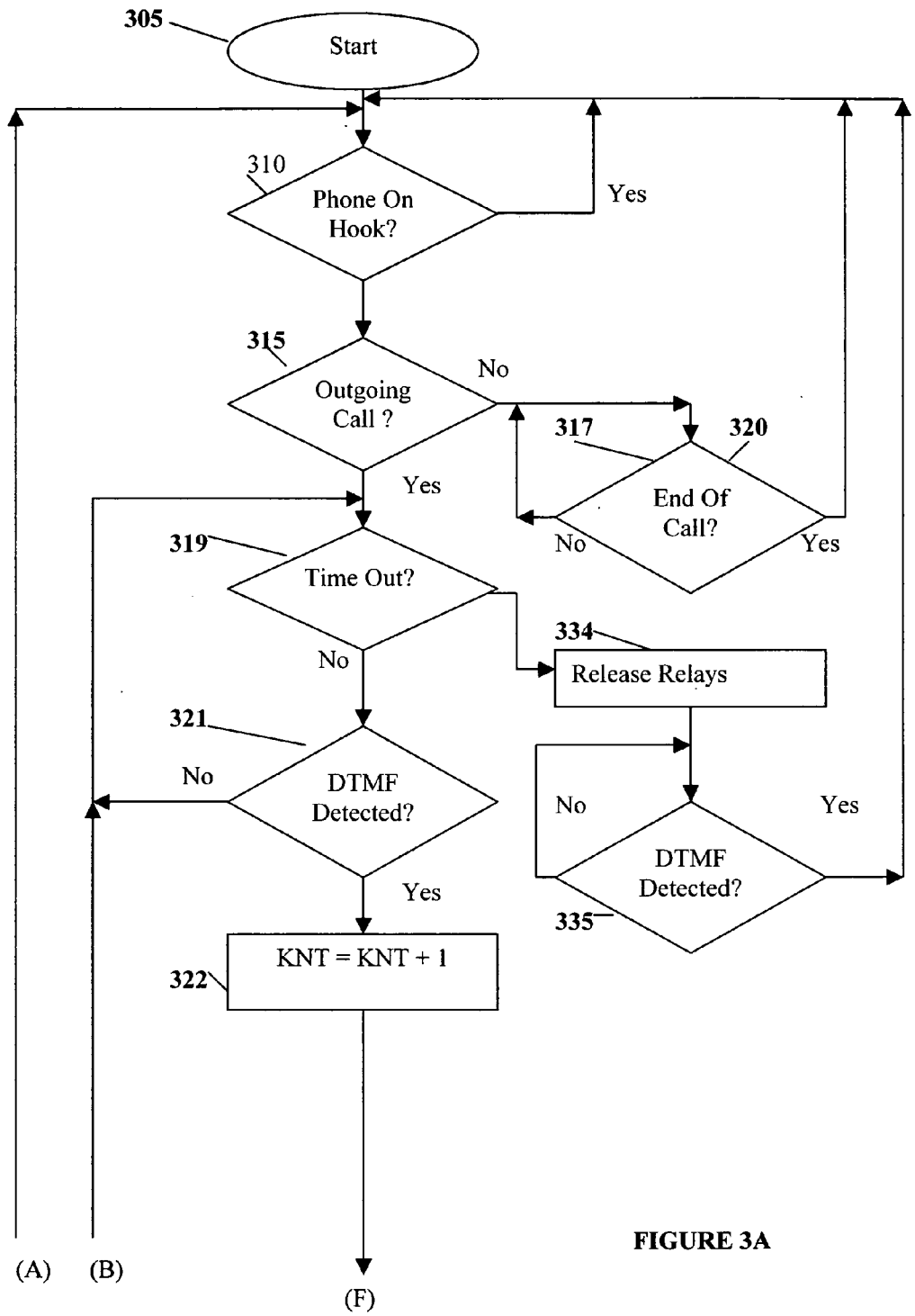
FIGS. 3A and 3B are flowcharts showing telephone line monitoring, discount call detection and call completion processes performed by the router shown in FIG. 2.
Figure 3C:
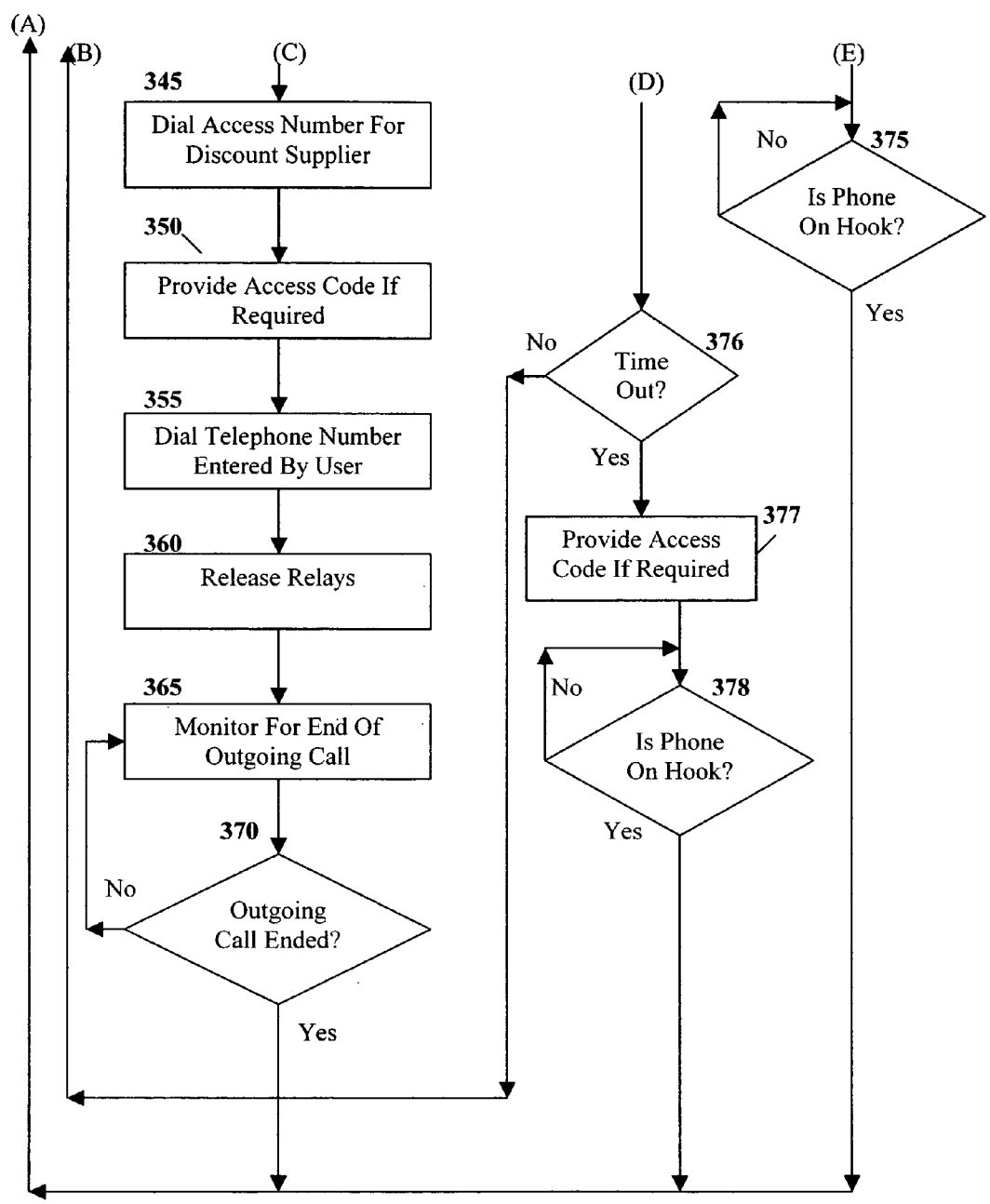
Figure 4A:
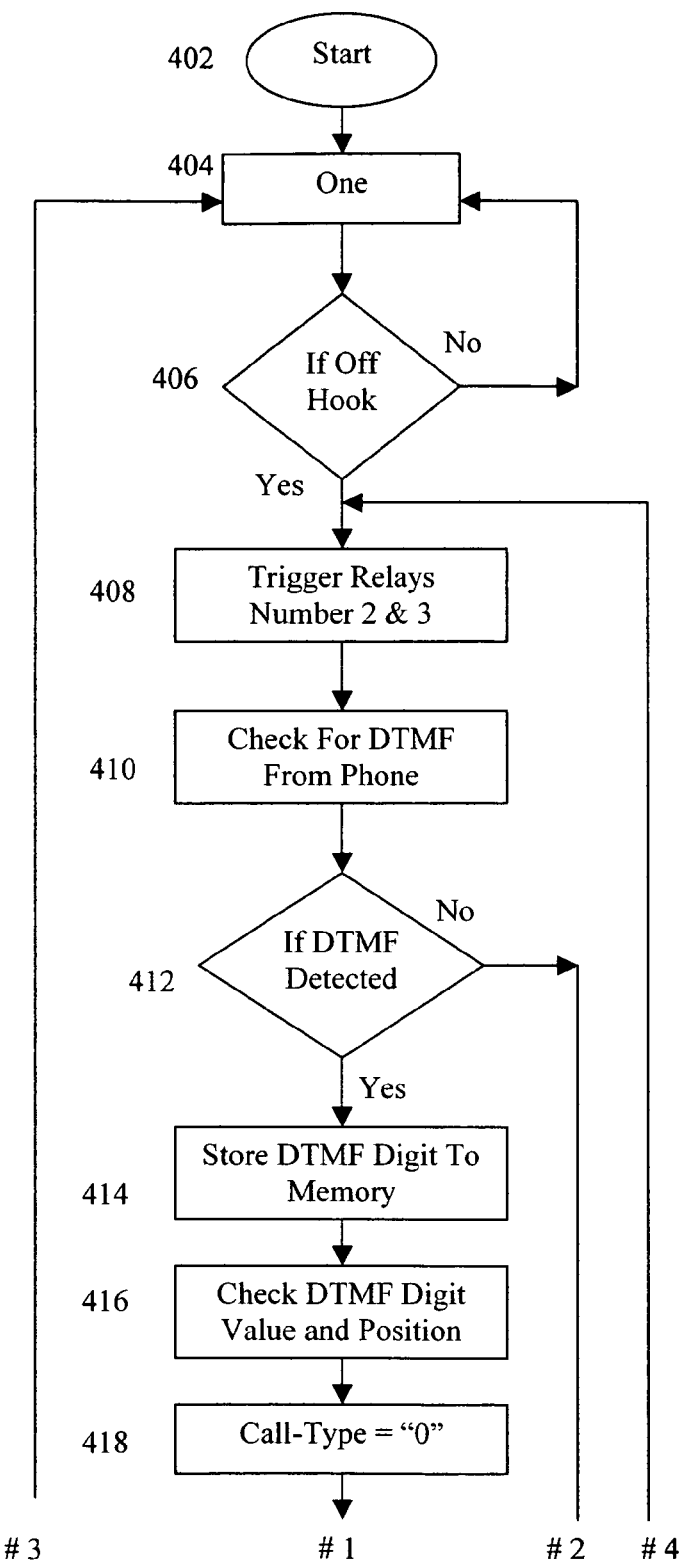
FIGS. 4A and 4B are flowcharts showing an alternate embodiment of the telephone line monitoring, discount call detection and call completion process performed by the router shown in FIG. 2.
Figure 4B:
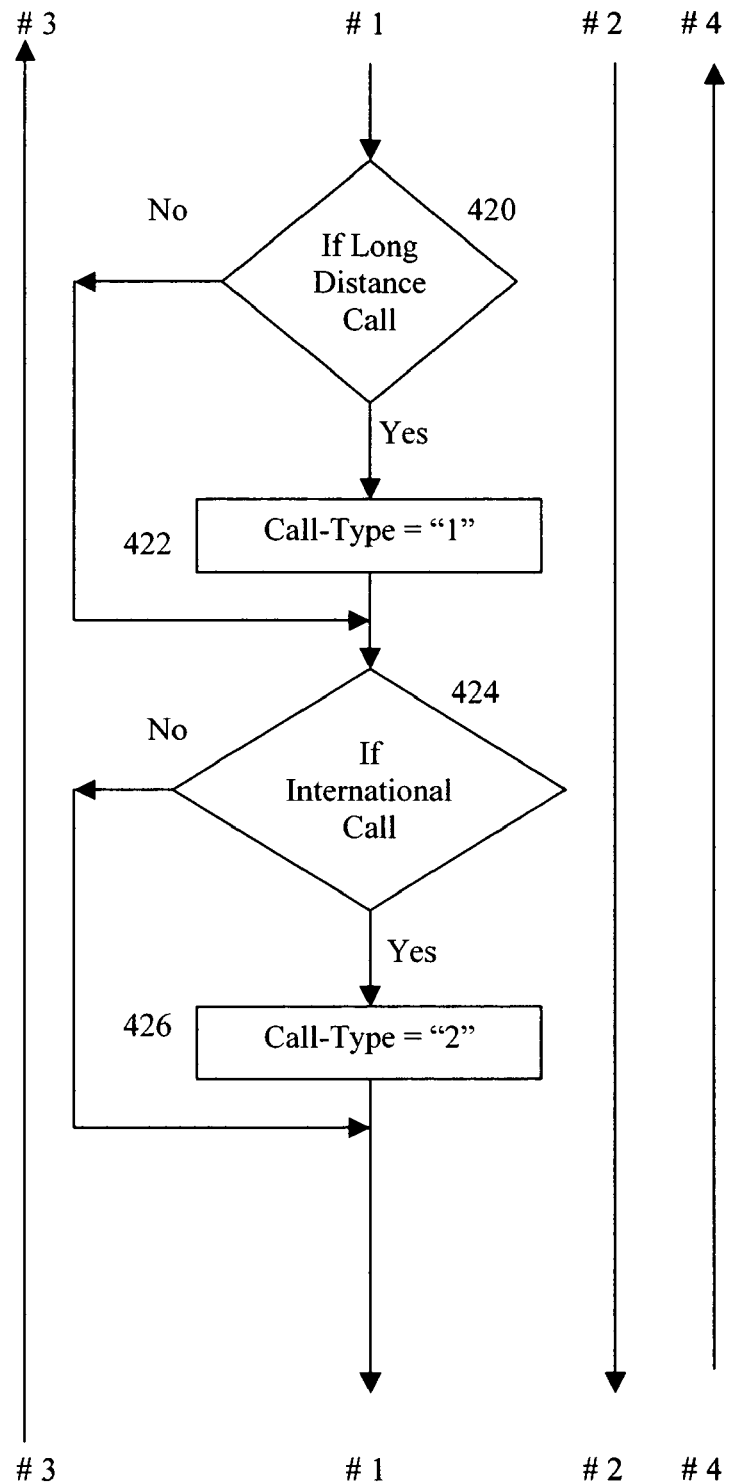
Figure 4C:
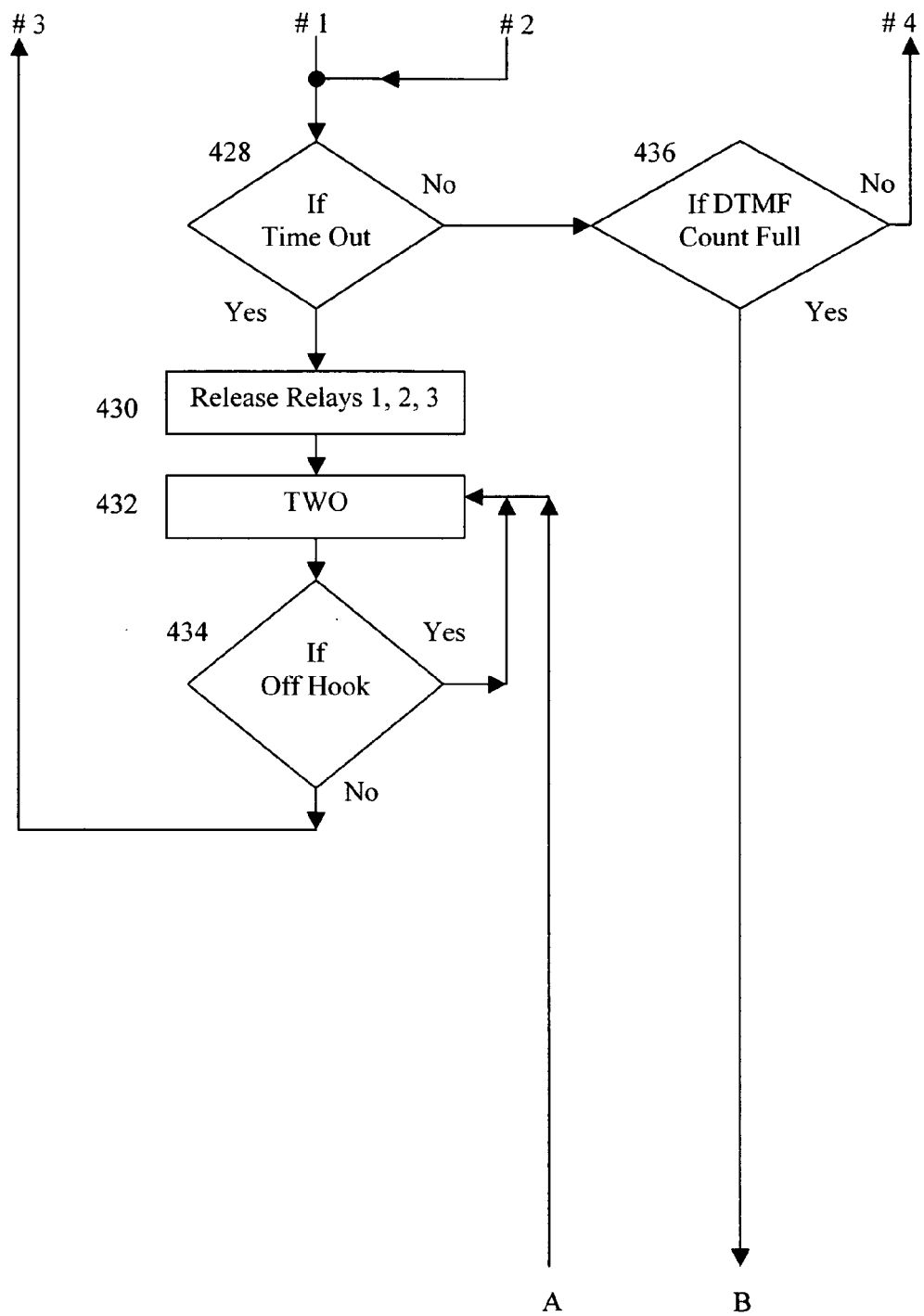
Figure 4D:
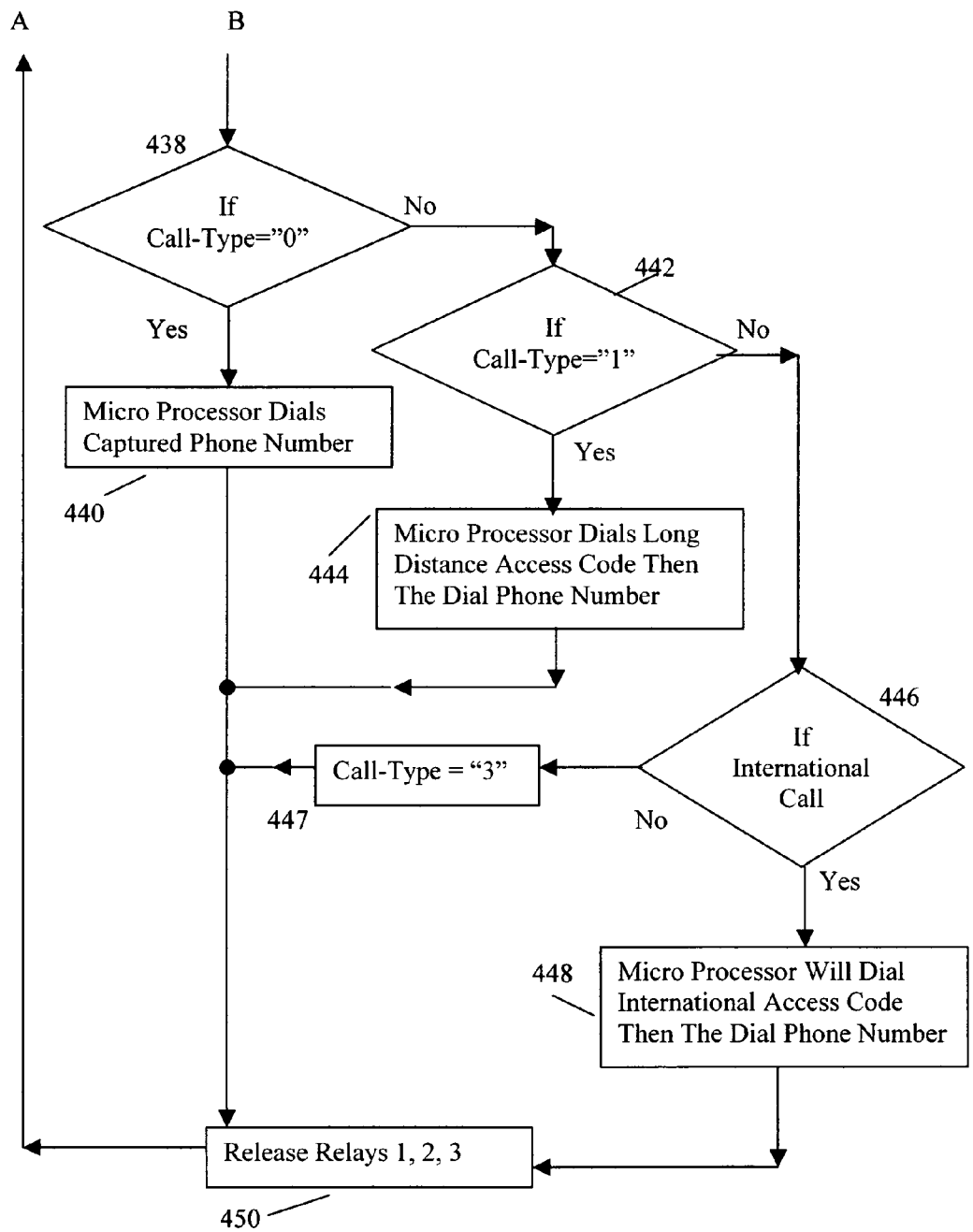
Figure 3A:
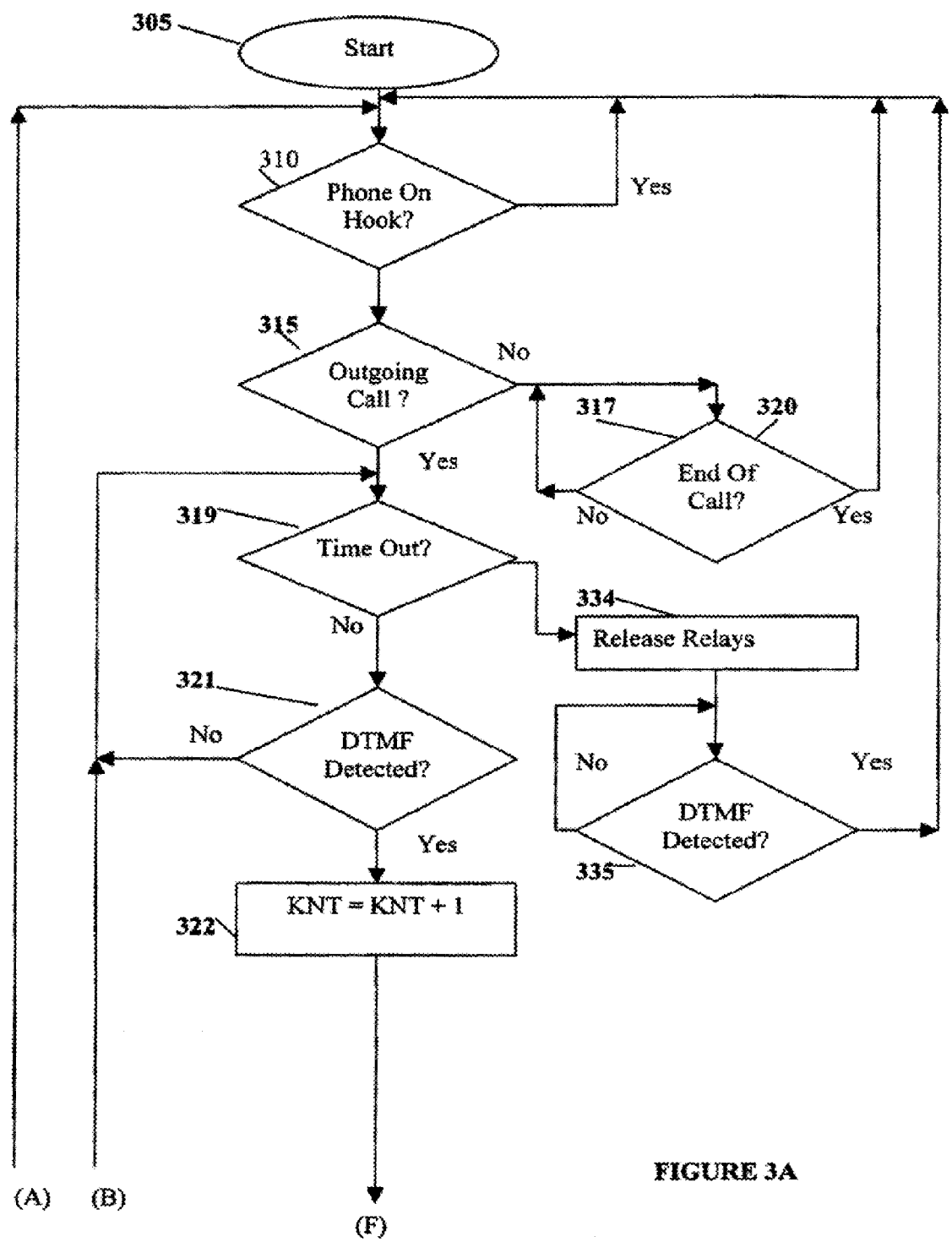
Figure 3B:
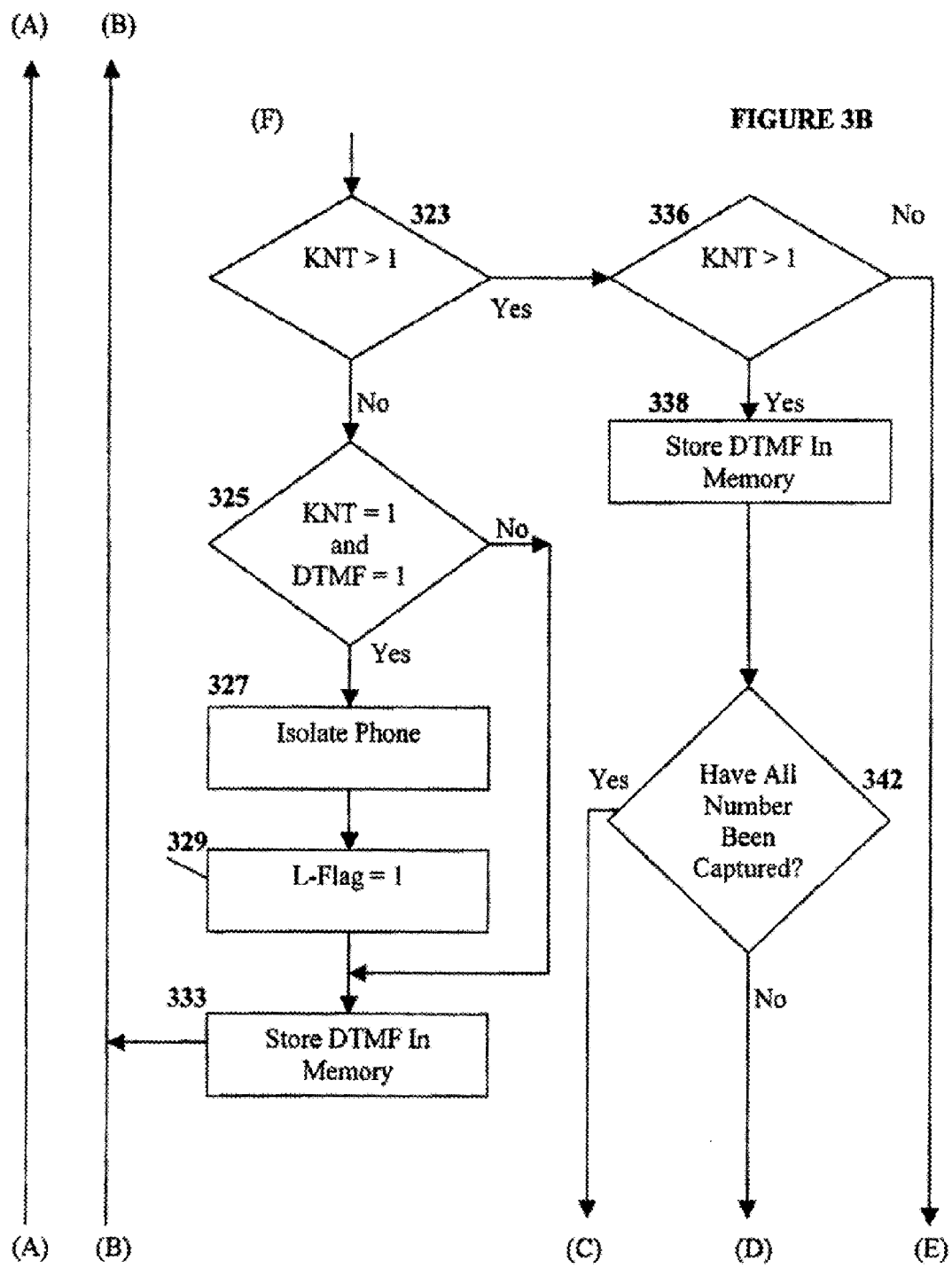
Figure 3C:
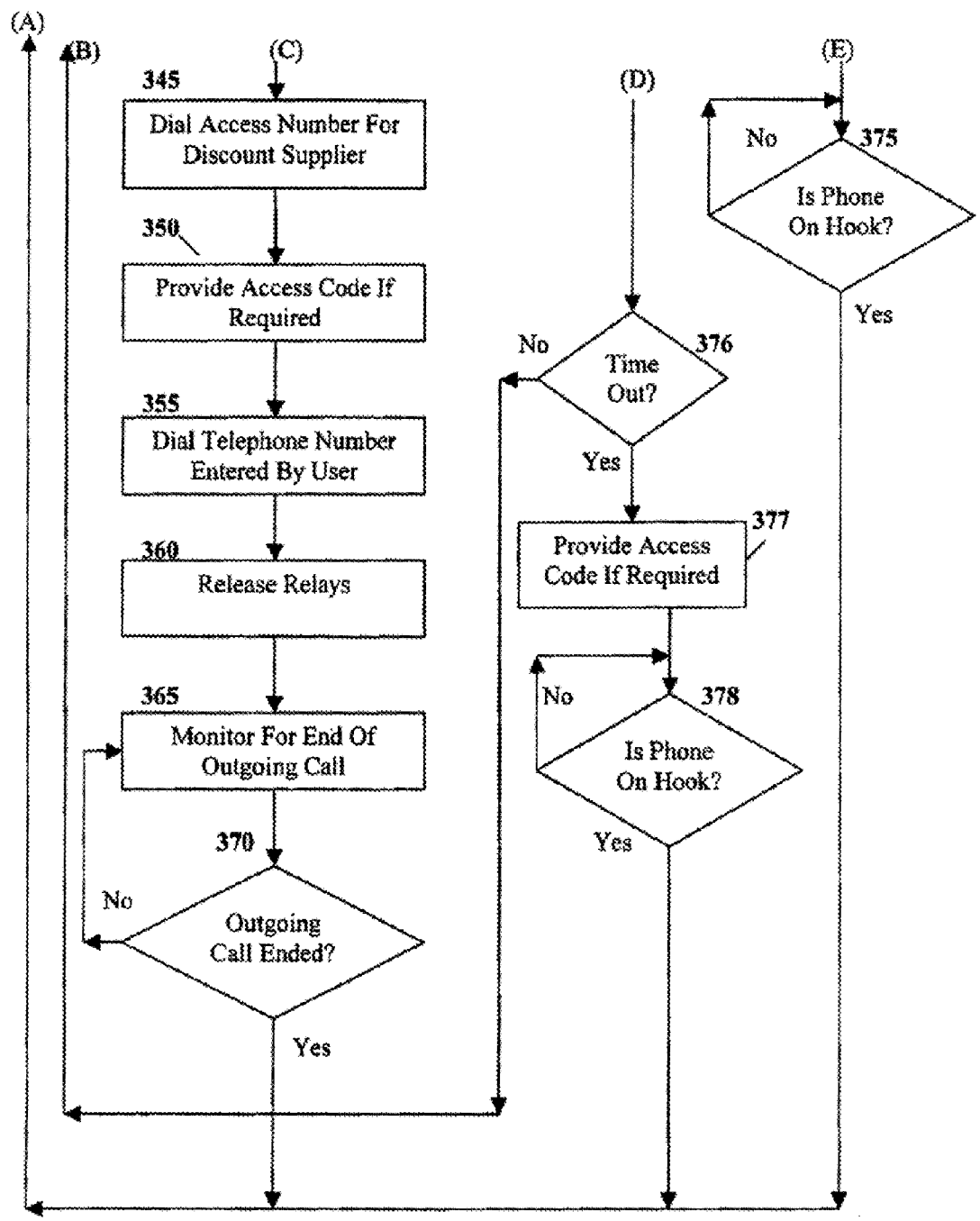
Figure 4A:
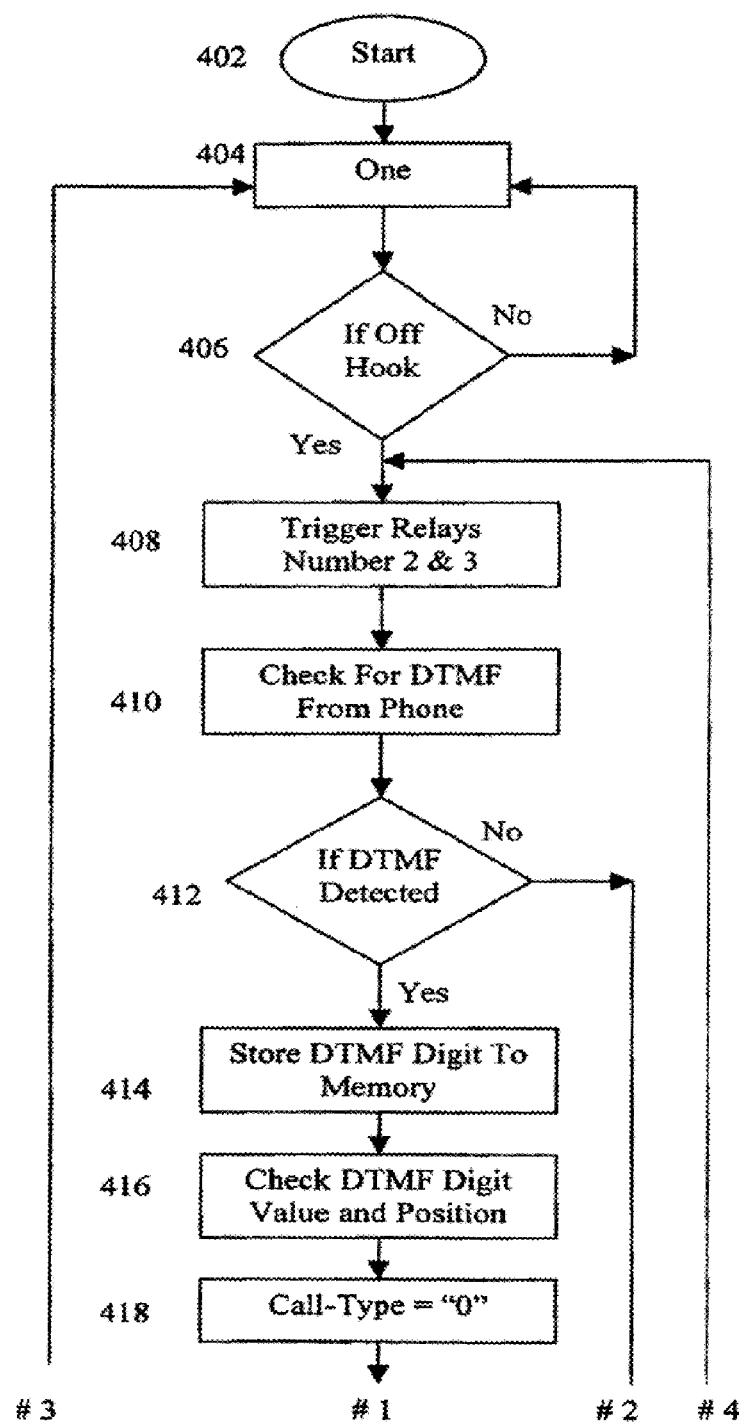
Figure 4B:
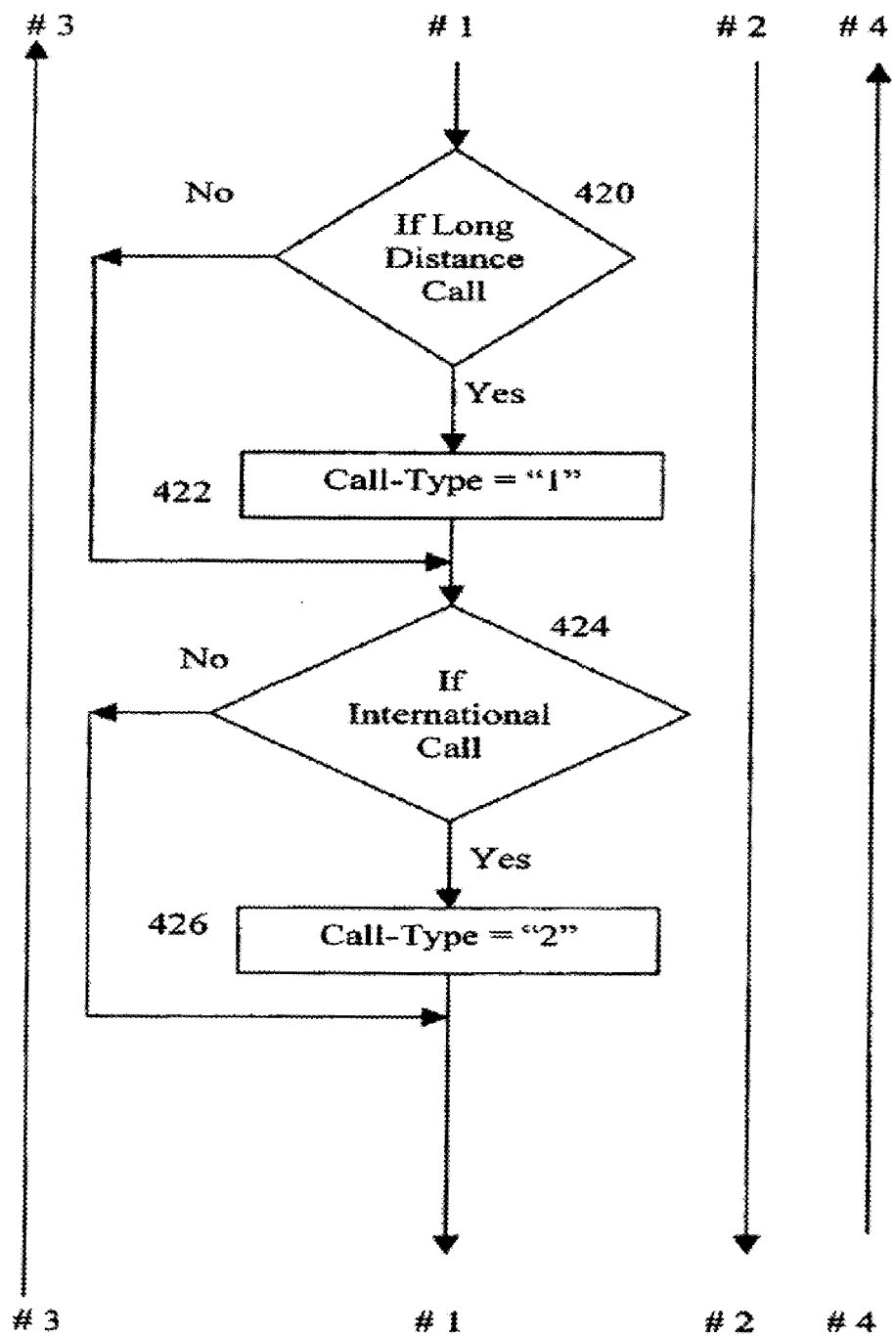
Figure 4C:
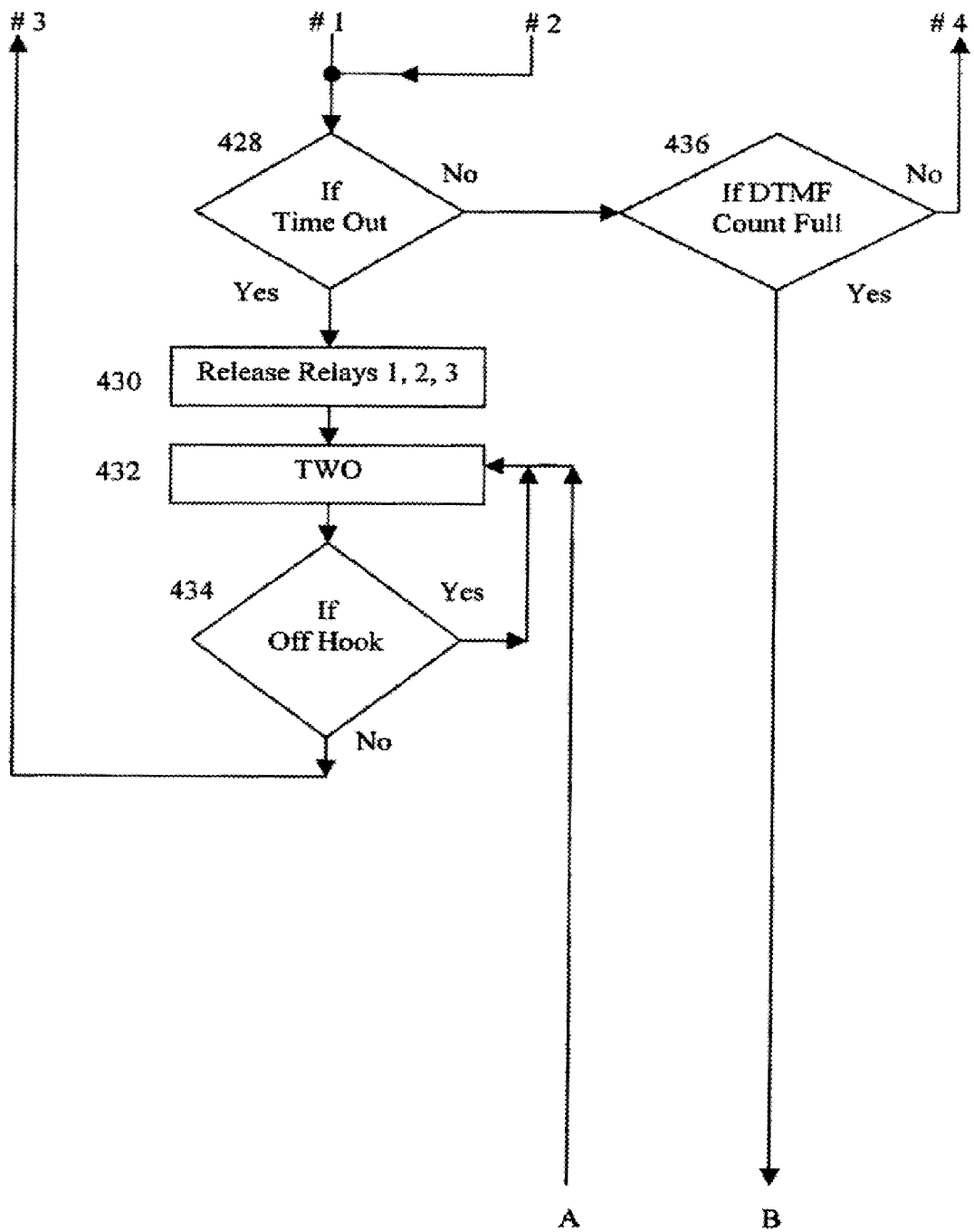
Figure 4D:
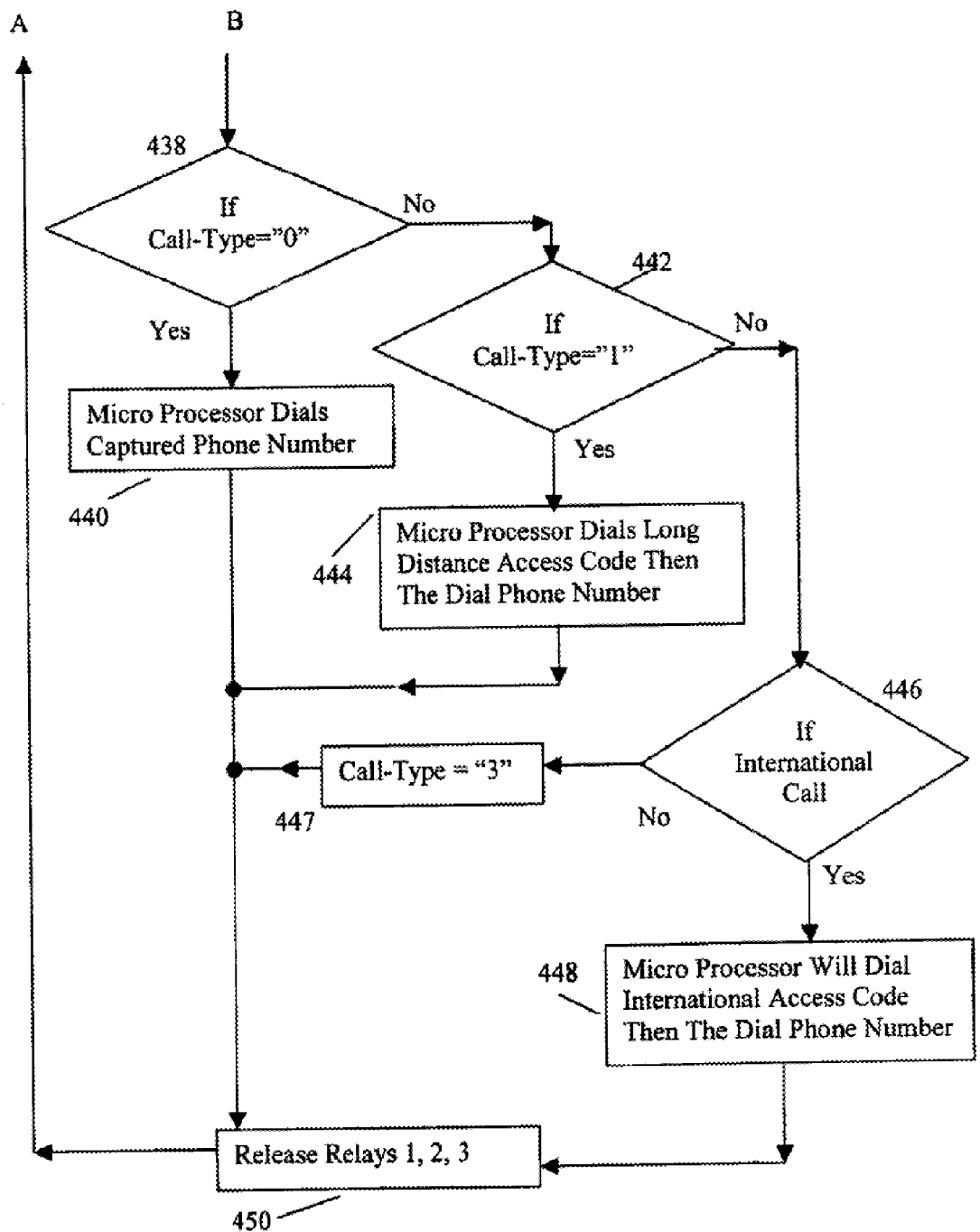
Figure 5A:
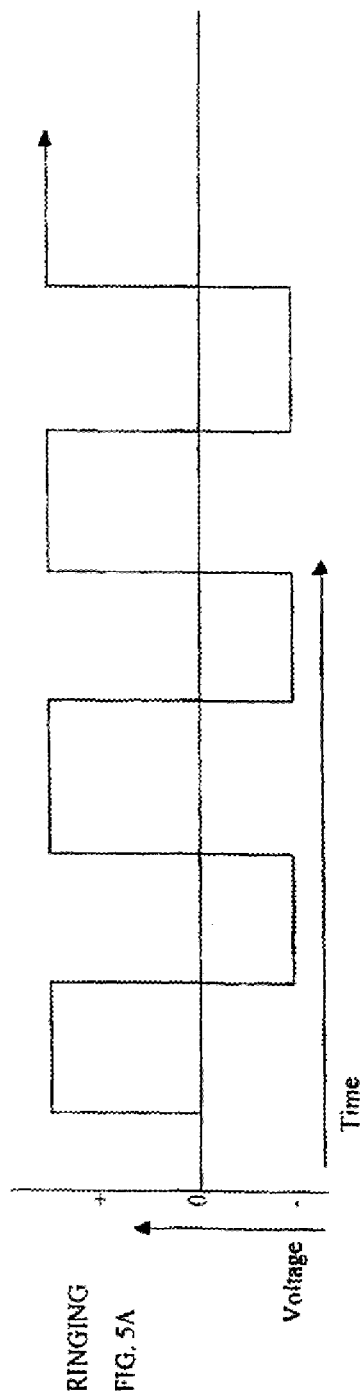
Figure 5B:
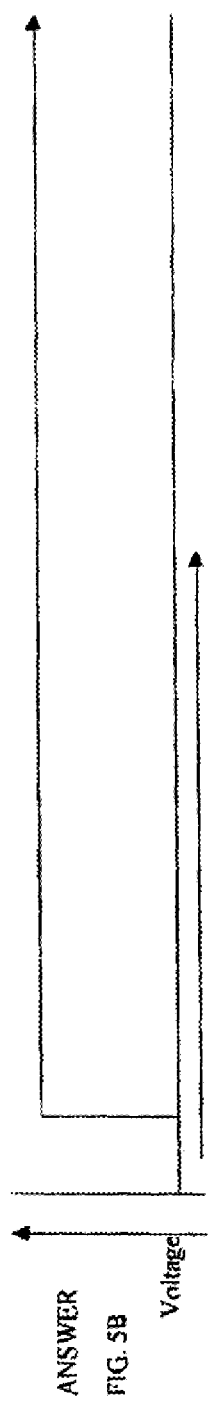
Figure 5C:
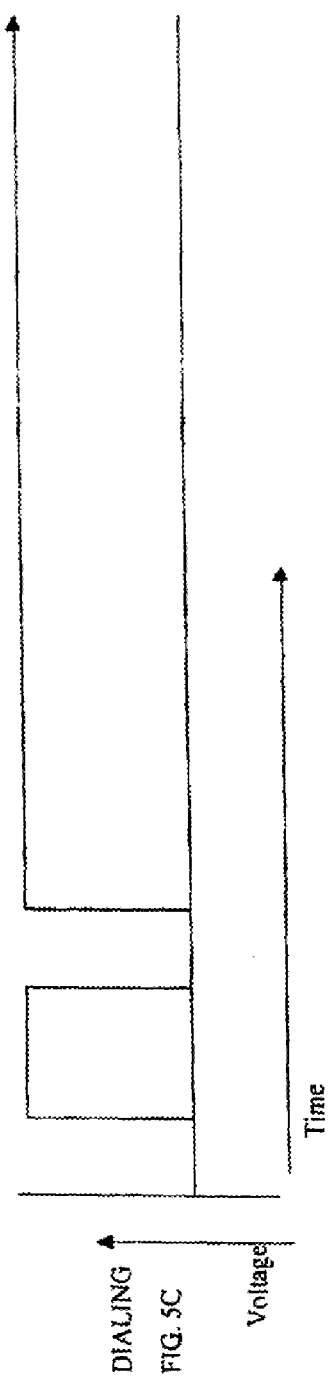
Figure 6:
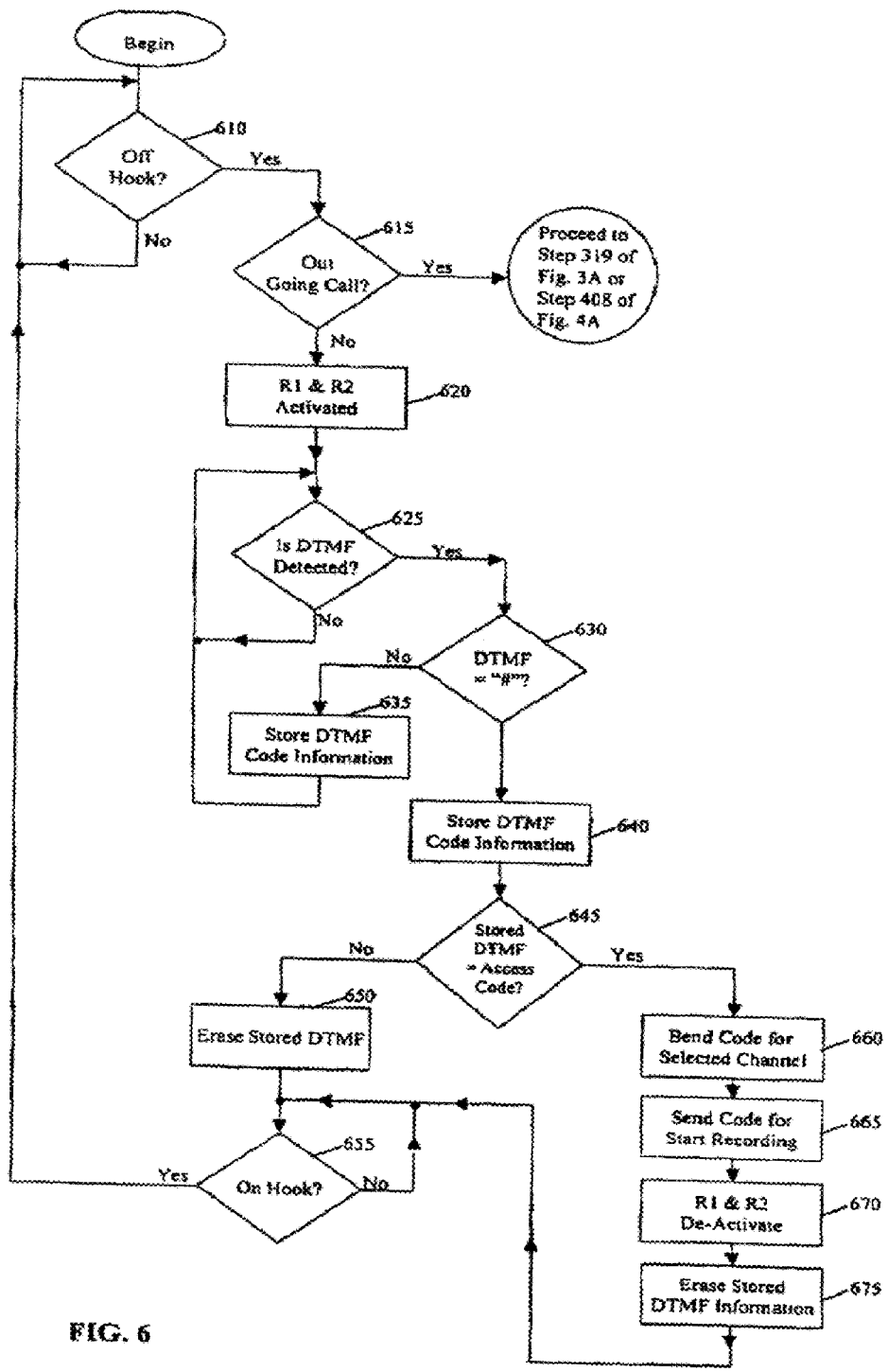

FIGS. 3A and 3B illustrate an embodiment of the present invention for primarily making long distance calls recognizing that the process may include dialing international and local calls. The process described with respect to FIGS. 4A and 4B illustrate an alternate process of effectuating discount long distance and international calls.

In step 402, the process is initiated. In step 406, the router 120 determines whether the telephone 110 is in an off hook condition. If the telephone 110 is experiencing such a condition, relays R2 and R3 are triggered together, isolating the telephone 110 from the outside world. The DTMF decoder 126 monitors whether DTMF signal are detected from the telephone 110 (steps 410 and 412). If DTMF signals are detected, they are stored in memory of the stamp 124 (step 414).

In step 416, the DTMF value and positions are analyzed by the microprocessor. This is done to determine the type of call that is being placed. For example, if the first digit is a "1", a long distance call (call type=1) is being placed. If the first digits are "011", an international call (call type=2) is being placed. If the first digits are "*69", "1800", "1888", or some other preprogrammed special prefix, then the call is classified under the "other" category (call type=3). Most of the remaining calls are local calls (call type=0). The type of call is determined in steps 418–426.

In step 428, a determination is made as to whether a time-out condition has occurred. As described above, if the appropriate number of digits is not captured (or some other problem occurs) within the parameters of the polling protocol, a time-out occurs, the line is released (i.e., user accesses the outside world and hears the time out message).

If no time-out condition occurs, the automatic router 120 checks to see if the DTMF digit count is full (step 436). If it is not full, the process returns to step 410 and awaits further DTMF tones from the telephone 110.

If the DTMF digit count is full, a determination is made as to whether the call is a local call (call type=0) (step 438), a long distance call (call type=1) (step 442), an international (call type=2) or other (call type=3) type of call (step 446). This determination is made by analyzing the beginning DTMFs of a dialed telephone number as described in detail above.

If the call is a local call, the microprocessor 124 dials the captured telephone number in step 440 and relays 130 are released (step 442). If the call is a long distance telephone call, microprocessor 124 dials the long distance access code and the dialed telephone number (step 444) and relays 130 are released (step 442). If the call is an international call, the microprocessor 124 dials the international access code and the number dialed (step 448) and then relays 130 are released (step 442). Finally, if the call being placed is not a local, long distance or international call, automatic router 120 treats the call as meeting the "other" category. Accordingly, the microprocessor 124 dials the captured numbers and the relays are released.

The phone line is then monitored for the end of the call (step 432). Once the call has ended the process returns to the beginning (step 402).

Media Recording Access and Control Process

Figure 6:
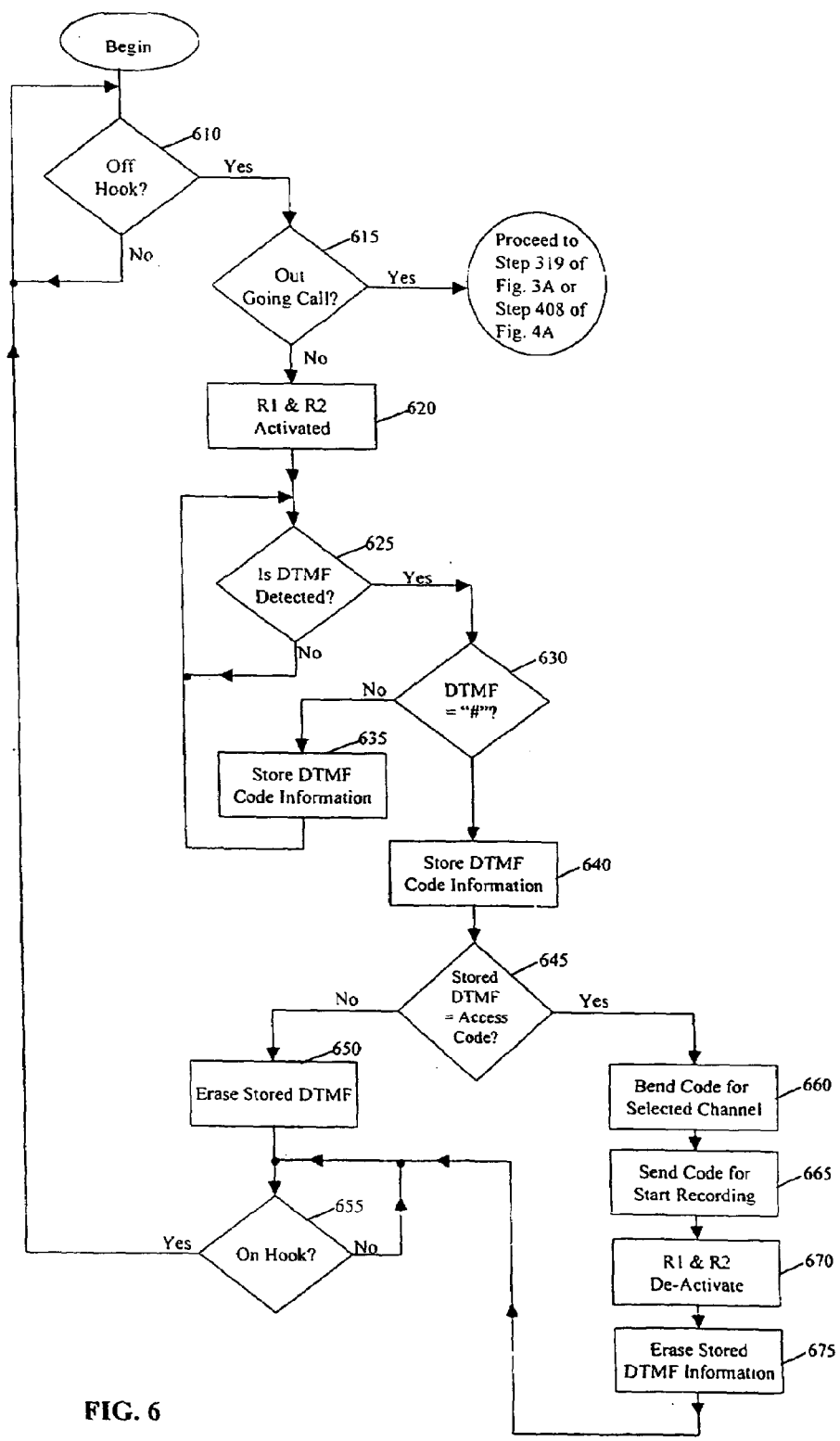
FIG. 6 is a flowchart showing the media recording access and control processes performed by the EA router shown in FIG. 2A.

FIG. 6 illustrates an embodiment of the present invention for accessing and controlling a recording device situated in a remote location. These processes are accomplished by EA router 120A and is described below with reference to FIGS. 2A and 6. The EA router 120A monitors a telephone line for activity, detects whether a potential activity on the phone line allows incoming instructions, captures such instructions and transmits them to an intended device.

As describe below, the EA router 120A is able to receive a string of DTMF tones and translate it into a series of digits. The received string of digits contains coded instructions for the EA router 120A. The instructions tell the EA router 120A how to generate signals that access and properly set the recording device to record a desired program. The user can communicate with their EA router 120A by keying in DTMF tones, supplying information over the internet or by voice commands over telephone to a central site. The central site converts the user's instructions into DTMF tone and transmits them to the user's EA router 120A. The EA router 120A may communicate with the user's recording device via a variety of methods such as light wave (infrared light) or electronic signals (analog or digital signals).

In one embodiment, for example, a request may be placed on a Sunday, to record a program that is aired at 9:30 PM on channel 7 Sunday night. At the central site, where the request is logged in, the user's file is located and checked for validity. If valid, the user's EA router access code, and model number information are retrieved from the user's record. This information is used to generate a numeric string that encodes the command instructions that are required to effectuate the recording. Since each manufacturer may use different remote control codes/pulses for a given digit or command, each user must register the type, brand, and model of their recording device in order to ensure that the EA router 120A can function properly. Panasonic, RCA and Toshiba VCRs, for example, may be encoded to start recording with a 123 cycle (c.p.s.) of duration 20 ms, 210 c.p.s. for 15 ms, and 30 c.p.s. for 50 ms, respectively. In this embodiment, pulses refer to the number of impulse (light/electrical) to be generated in one second. This difference in command coding makes it necessary for each user to register the make and model of their recording device.

In one embodiment, the central site validates the user's identity and collects information regarding the program the user wants to record: day of recording, time of the recording, channel from which to record the program. The central site then generates a string of DTMF tones that encodes the user's access code, channel from which the recording is to be made, the commands to activate the VCR, the commands for rewinding the tape, and the commands for start recording.

EA router 120A, in this embodiment, recognizes that the central site sends a string of DTMF tones in a predetermined format. This allows the EA router 120A to convert the captured DTMF tone sequence into a numeric string that can be segmented into both remote control command codes and access codes. The access codes allows the EA router 120A to recognize that the instructions come from an authorized VCR user. The command codes allows the EA router 120A to turn on the VCR, rewind the tape in the VCR, select the channel to record and then start recording.

In this embodiment, the central site sends the code out anywhere from 5 to 10 minutes before the desired recording time. This reduces the size and amount of coding required to be sent. In another embodiment, the string of DTMF tones sent to the EA router 120A contains coding information for selecting date and time. In other embodiments, the central site may allow interaction with the user's device directly.

In one embodiment, the instruction components may consist of two elements: number of pulses and duration of pulses. Each component may appear in a fixed position in the string and occupies a set number of spaces. If all the spaces are not required, the unneeded portion may be filled with zero(s) (e.g., 0020 is 20 ms).

In one embodiment, the password may be the first (9) nine digits of the decoded DTMF tone numeric string. The access code and the "End Of Data Flag" (#) components of the transmitted string of DTMF tones may not need a duration aspect.

The EA router 120A receives the number of pulses and the duration of a pulse in order to properly mimic a remote control device. Instructions may be transmitted from the central site in the form of code blocks. Each code block (CB) may consist of two distinct aspects: number of pulses and duration per pulse (in milliseconds (ms)).

In a CB, for example, the day of the week for which the recording is to be made is denoted by a single numeric character: Sunday, the first day of the week is "1" and Saturday, the last day of the week is a "7". A "0" can be used to indicate that the recording is to be made on the same day as the entry into the central site. The central site may indicate to the EA router 120A how the instruction codes are to be generated: as monotone or as dual tones (DTMF). If the code is to be generated in mono-tonal manner, the central site may indicate this with a "1" and a dual tone may be indicated with a "2". Further, the central site may use a 24 hours system time system, in which mid-night is 0000 and 1 pm is 1300. The central site may indicate the channel that is to be recorded as a three digit number: allowing for a range of 001 to 999.

The following are tables of codes that may be used in accordance with one embodiment.

| Code Key | Translation |
| --- | --- |
| 0 | If the recording is to be made on the same day as the entry is made into the central site |
| 1 | Recording is to be made on Sunday |
| 2 | Recording is to be made on Monday |

-continued

| Code Key | Translation |
|---|---|
| 3 | Recording is to be made on Tuesday |
| 4 | Recording is to be made on Wednesday |
| 5 | Recording is to be made on Thursday |
| 6 | Recording is to be made on Friday |
| 7 | Recording is to be made on Saturday |
| 1 | Mono-tonal code generation format, instruction codes for controlling the recording device may be generated by the EA router combining the number of impulses and a duration of the impulses. |
| 2 | Dual tonal code generation format, instruction codes for controlling the recording device may be generated by combining two different tones to generate a unique new tone (DTMF). |
| 0000 \| 1200 \| 1300 \| 2359 | The start of the day at midnight<br>Twelve noon<br>One in the afternoon<br>One minute before midnight |
| 001 \| 999 | The channel can range from 1 to 999, channel 7 is 007. |
| ABCD | The number of cycles per second to instruct the recording device to turn on. |
| EFGH | The duration of which the pulses should be transmitted to activate the recording device. Both ABCD & EFGH may be require to mimic the Remote control activation of the recording device. |
| PQRS | The number of cycles per second to instruct the recording device to start recording. |
| TUVW | The duration of which the pulses should be transmitted to start recording. |

Both PQRS & TUVW may be required to mimic the Remote control device to start recording instruction. The cycle duration of both instructions (activate and record) may be the same or different, depending of the recording device manufacture.

In one embodiment, the following string of DTMF tones may be transmitted to the EA router 120A. The position and length of each component of the encoded instructions to the recording device is preset, allowing the EA router 120A to easily convert the central site transmitted data string into an access code, instructions codes that mimic the recording device remote control unit, and a termination flag.

123456789DFTTTT 9999 8888 ABCD EFGH ANMY RETW PQRS TUVW #

123456789012130 0134 0020 0020 0050 0170 0020 0150 0020 #

In one embodiment, the above numeric string of digits may be converted into a string of DTMF tones. A DTMF encoder converts each digit into a distinct DTMF tone. The DTMF tone is transmitted to the EA router 120A. The EA router 120A then converts the DTMF tones back into digits that can be translated into instructions, access code information and an end of data flag.

POSITION TABLE
123456789DFTTTT ABCD EFGH ANMY RETW PQRS TUVW #

| Segment | Contents | Position |
|---|---|---|
| 123456789 | Access Code | (1–9) |
| D | Day Of Recording | (10) |
| F | Format To Use In Creating Control Codes | (11) |

-continued

POSITION TABLE
123456789DFTTTT ABCD EFGH ANMY RETW PQRS TUVW #

| Segment | Contents | Position |
|---|---|---|
| TTTT | Time Of Day To Start Recording | (12–15) |
| 9999 | Number Of Pulses In Channel Select Command | (16–19) |
| 8888 | Duration Of The Channel Command | (20–23) |
| ABCD | Number Of Pulses In VCR Activate Command | (27–31) |
| EFGH | Duration Of The Activate Command | (32–35) |
| ANMY | Number Of Pulses In VCR Rewind Command | (36–39) |
| RETW | Duration Of The Rewind Command | (40–43) |
| PQRS | Number Of Pulses In VCR Record Command | (44–47) |
| TUVW | Duration Of The Record Command | (48–51) |
| # | End Of Data Flag | Always Last |

CONTENT TABLE
1234567890121300134002000200050017000200150020#

| Segment | Contents | What It Contains |
|---|---|---|
| 123456789 | Access Code | 123456789 |
| 0 | Day Of Recording | Today |
| 1 | Mono Tone Format | Single Tone |
| 2130 | Time Of Day To Start Recording | 9:30 PM |
| 0134 | Number Of Pulses In Channel 7 Command | 134 pulses |
| 0020 | Duration Of The Channel Command | 20 ms |
| 0020 | Number Of Pulses In VCR Activate Command | 20 pulses |
| 0050 | Duration Of The Activate Command | 50 ms |
| 0170 | Number Of Pulses In VCR Rewind Command | 170 pulses |
| 0020 | Duration Of The Rewind Command | 20 ms |
| 0150 | Number Of Pulses In VCR Record Command | 150 pulses |
| 0020 | Duration Of The Record Command | 20 ms |
| # | End Of Data Flag | # |

As shown in FIG. 2A and explained above, the EA router 120A may receive a string of DTMF tones from the central site and convert them into light signals that may be communicated to the recording device via the infrared emitter 192 (FIG. 2A) attached to the stamp/micro-controller 124. An EA router user may enter information about what programs are to be recorded via the internet, wire/wireless phone, fax, etc.

In one embodiment the string of DTMF tones that originate from the central site is generated in the following manner. The user, using the internet, for example, logs into the central site web page and uses a graphical user interface to enter their username and password. The central site checks to ensure that the user is valid. All valid users have registered their EA router 120A, the phone number to which the EA router 120A is attached, brand and model number of their recording device.

In one embodiment the user may enter the day of the week for which they want to record, the time of day that they want to start recording and the channel that they want to record. The central site generates a string of DTMF tones that encodes this information as shown in the tables above. In one embodiment, the registered EA router's access code may be attached to the beginning of the encoded information, and the end of data flag (#) may be attached to the end of the encoded information. This allows the EA router 120A to determine if the incoming string of DTMF tones should be accepted. The end of data flag tells the EA router 120A that all of the sent information has been received, and that it can now proceed with process the string of DTMF tones.

In another embodiment, the EA router 120A user may communicate the user password name, and the pertinent recording information (day, time and channel) for recording a desired program via the phone either by voice response technology or by using the keypad to respond to options heard over the phone. Once the central site has gathered all of the required information, it generates a string of DTMF tones that contains instructions for creating commands that causes the user recording device to record a specific program.

The central site generates a string of DTMF tones that encodes this information as shown above. In one embodiment the registered EA router's access code is attached to the beginning of the encoded information, and the end of data flag (#) is attached to the end of the encoded information. The access code allows the EA router 120A to determine if the captured string of DTMF-tones should be accepted. The end of data flag tells the EA router 120A when the end of the string of DTMF tones is reached, and that it can now begin to process the string into code signals that will mimic a remote control unit.

At step 610, a determination is made as to whether telephone 110 is in an off-hook condition. If it is not, then the EA router 120A awaits such a condition. Once an off-hook condition is established, the micro-controller/stamp 124 may determine whether an outgoing or incoming call is being made (step 615). If the call being made is outgoing, the system and method proceed to 319 of FIG. 3A or step 408 of FIG. 4A (depending on the call type as described above).

The EA router 120A may detect an incoming call in using the method described above. When both an incoming call and off-hook status are detected, the EA router 120A may activate Relay 1 (R1) and Relay 2 (R2). Activation of R1 and R2 (step 620) in this embodiment enables the EA router 120A to detect any DTMF tones that may be transmitted on the incoming phone line (step 625).

If no DTMF tones are detected on the incoming line, the system will continue to await for such tones until the call is terminated. If a string of DTMF tones are detected on the incoming line, the system captures the DTMF tones one by one and converts them into digits using a DTMF decoder. Captured digit(s) are evaluated and then stored in an array (step 635 and step 640). The process of monitoring the incoming line for DTMF tones continues until one of the captured DTMF tones is a "#": the end of data flag (step 630).

Once the end of data flag is detected "#", the system stores the flag (step 640) and begins to process the captured string of DTMF-tones in the manner indicated above. The system checks the first nine (9) digits to see if they form a valid access code: the access code specific to that EA router 120A (step 645). If this access code does not match the access code stored in the EA router 120A, the entire stored string of digits is erased (step 650). After erasing the digits stored in the array, the system awaits the end of the call (step 655).

If the first nine digits matches the access code stored in the EA router 120A, the system processes the balance of the string of digits in the above-indicated manner. In this embodiment, the digits are converted into code signals that are transmitted by infrared light to the recording device. In one embodiment, the sequence of codes follows an order that allows the recording device to know which channel to record (step 660) and when to start recording (step 665).

After the EA router 120A has started the recording process, it erases the stored string of digits (step 675) and deactivates R1 and R2 (step 670). The system then awaits the end of the call (step 655) before resetting itself.

In this embodiment, once the string of digits is converted into valid code signal that the recording device recognizes, the instruction codes are transmitted to the recording device. The transmission mode may be in the form of infrared light impulses generated by the infrared diode/transmitter attached to the EA router 120A (FIG. 2A) and received by the recording device infrared detector.

In another embodiment, once the string of digits is converted into valid code signal that the recording device recognizes, the instruction codes are transmitted to the recording device. The transmission mode may be in the form a direct electrical line between the two devices (EA-Router and Recording Device). The instructions may go directly to a microprocessor/micro-controller inside of recording device. This may obviate the need for an infrared light sensor in the recording device, and permit greater flexibility in the control of the user's recording device.

In another embodiment, the recording device remote control may transmit instructions to the recorder in a dual tone (DTMF) format. The transmitted string of digits (CB) sent from the central site may contain an indicator telling the EA router 120A that the instruction codes are to be generated by combining two distinct tones. A dual tone CB may consist of paired tones ("A" and "B") and may not have or need a duration aspect. The system then retrieves the digits from the tone stream (CB) and convert them into a string of digits that may be used to create specific paired groups of tones. These tones may be combined by the system to form DTMF signals that the recording device would recognize. These signals may be transmitted to the recording device by infrared light or electrical impulses over a wire. In this embodiment the paired tones are indicate below as "A" and "B", and when "A" and "B" are combined, they produce a unique byproduct/signal.

POSITION TABLE
123456789DFTTTT ABCD EFGH ANMY RETW PQRS TUVW #

| Segment | What It Contents | Position |
|---|---|---|
| 123456789 | Access Code | (1–9) |
| D | Day Of Recording | (10) |
| F | Format To Use In Creating Control Codes | (11) |
| TTTT | Time Of Day To Start Recording | (12–15) |
| 9999 | Pulses/second (A) In Channel Select Command | (16–19) |
| 8888 | Pulses/second (B) In Channel Select Command | (20–23) |
| ABCD | Pulses/second (A) In VCR Activate Command | (27–31) |
| EFGH | Pulses/second (B) In VCR Activate Command | (32–35) |
| ANMY | Pulses/second (A) In VCR Rewind Command | (36–39) |
| RETW | Pulses/second (B) In VCR Rewind Command | (40–43) |
| PQRS | Pulses/second (A) In VCR Record Command | (44–47) |
| TUVW | Pulses/second (B) In VCR Record Command | (48–51) |
| # | End Of Data Flag | Always Last |

CONTENT TABLE
123456789012130013403200190015001700200015001 80#

| Segment | Contents | What It Contains |
| --- | --- | --- |
| 123456789 | Access Code | 123456789 |
| 0 | Day Of Recording | Today |
| 1 | Mono Tone Format | Single Tone |
| 2130 | Time Of Day To Start Recording | 9:30 PM |
| 0134 | Pulses/second (A) In Channel Select Command | 134 pulses/sec. |
| 0320 | Pulses/second (B) In Channel Select Command | 320 pulses/sec |
| 0190 | Pulses/second (A) In VCR Activate Command | 190 pulses/sec. |
| 0150 | Pulses/second (B) In VCR Activate Command | 150 pulses/sec. |
| 0170 | Pulses/second (A) In VCR Rewind Command | 170 pulses/sec. |
| 0200 | Pulses/second (B) In VCR Rewind Command | 200 pulses/sec |
| 0150 | Pulses/second (A) In VCR Record Command | 150 pulses/sec. |
| 0180 | Pulses/second (B) In VCR Record Command | 180 pulses/sec. |
| # | End Of Data Flag | # |

It should be noted that the example above describes accessing a media recording device by a user over a telephone line. It should be noted that many other types of communication networks may be used including, but not limited to, the internet, cable networks, wireless networks, etc. Further, although the example above describes an infrared emitter 192 accessing a media recording device, the emitter 192 may be replaced with another type of emitter (i.e., infrared, ultra-violet, RF, electrical signals, blue tooth technology) and the activated device may be any device that can receive such a signal.

It will be apparent to those skilled in the art that various modifications and variations can be made in the system and processes of the present invention without departing from the spirit or scope of the invention. Thus, it is intended that the present invention cover the modifications and variations of this invention provided they come within the scope of the appended claims and their equivalents. In this context, equivalents means each and every implementation for carrying out the functions recited in the claims, even if not explicitly described herein.

What is claimed is:

1. A method for controlling one or more remote targeted devices over a communication network by accessing a central computer, selecting a specific targeted device at a remote location, and entering instruction that will control future behavior of said targeted device at said remote location, comprising:
   accessing a central computer using a plurality of remote data entry points;
   accessing a central computer using a plurality of remote data entry modes;
   a central computer able to process and store instructions inputted from a plurality of data entry points;
   a central computer able to determine if incoming instructions are authorized to be accepted and forwarded to a specific remote location;
   a central computer able to forward instructions over a communication system to a chosen remote location where said instructions will be relayed to a targeted device; said targeted device accepting instructions that will control said device future behavior.

2. The method of claim 1, further comprising:
   a central computer receiving one or more DTMF tones over said communication network; and
   translating said tones into said instructions that can affect the future behavior of a specific device located at a remote location.

3. The method according to claim 2, further comprising:
   a central computer determining what information is encoded within a string of DTMF tones by analyzing order in which DTMF tones are received; and
   generating instructional coding that corresponds to the detected sequence of DTMF tones.

4. A method for controlling the future behavior one or more remotely located appliances at a remote site using instruction communicated over a communication network from a remote input terminal, comprising:
   a) monitoring a communication network linked of a central computer to detect incoming instructions from a remote data entry terminal;
   b) determining whether communication between a central computer and a remote site is established to transmit instructions to a device located at said remote site;
   c) a central computer for storing, processing, and transmitting instructions received from a remote data entry terminal;
   d) a central computer able to transmit the process instructions to a device located at a specific remote site;
   e) a device located at a remote site able to determine whether the incoming instructions are authorized to be used at said specific remote site;
   f) device able to transmitting any received instructions to a targeted appliance; and
   g) controlling the future behavior of the targeted appliances based on said instructions.

5. The method of claim 4, further comprising:
   a server receiving DTMF tones over said communication network from a remote input terminal; and
   translating said tones into instructions and information that is directed to a targeted remote site according to input received by the central computer.

6. The method according to claim 5, further comprising:
   a central computer analyzing the position and nature of DTMF tones to decipher the information contained within said DTMF.

7. The method according to claim 5 wherein the DTMF tones encoding information are transmitted by a central server over a telecommunication network to a site remote to both the server and the remote data entry terminal.

8. The method according to claim 5 wherein the DTMF tones encoding information are transmitted over the Internet to a central server where information and instructions are extracted and process before being passed on to a remote targeted site where said instructions will affect the future behavior of an appliance.

9. The method of claim 5, further comprising: a device at the remote site converting said DTMF tones received from the central computer into infrared light signals containing instructions that will control the behavior of the targeted appliance.

10. The method of claim 5, further comprising: a device at the remote site converting said DTMF tones received from the central computer into audio signals containing instructions that will control the behavior of the targeted appliance.

11. The method of claim 5, further comprising: the device at the remote site converting said DTMF tones received from the central computer into electrical signals containing instructions that are conveyed by cable to the target appliance, and wherein said instructions will control the future behavior of the targeted appliance.

12. A system for controlling a specifically targeted appliance at a remote location using information entered from a remote input terminal to a central computer that relay the instructions to a targeted device via a communication network, comprising:
   a means for central computer to monitor for incoming communication from a plurality of remote input terminals that are linked to said computer via a communication network;
   a means for determining whether said incoming communication contains valid instructional information;
   a means for processing, storing, and forwarding said instructional information from the central computer to a device at a targeted remote location;
   a mean for the device at the remote location to determine whether any incoming information over a communication network is authorized to be accepted as valid and proper;
   a means for the instructional information received by the device at the remote location being conveyed to said targeted appliance; and
   controlling said appliance future behavior using the instructions received from the remote input terminal.

13. The system of claim 12, further comprising:
   a means for the central computer to receive DTMF tones encoded instructions over a communication network;
   a means for he remotely located device to receive instructional information in the form of DTMF tones over said communication network; and
   a means for translating said tones into instructions that will control a targeted appliance future behavior.

14. The system according to claim 12, further comprising:
   a means for analyzing the position of each DTMF tone in a string of DTMF tones to determine what information is encoded in the string; and
   a means for translating said information into instructions that will control a specific appliance at a remote location.

15. A system for controlling one or more remotely targeted appliance by transmitting instructional information received from a remote input terminal over a communication system, comprising:
   a means for a central server to collect information from a plurality of remote input points linked to said server via a communication system;
   a means for monitoring a communication system for activity between a server at a central location and a remote input terminal;
   a means for determining whether a device at a targeted remote location can detect incoming instructions over the communication system;
   a means for determining whether the remote device is authorized to allow acceptance of input from the server;
   a means for transmitting incoming instructional information to a targeted device when reception of incoming instructions is enabled;
   a means for transmitting said instructions from said device to a targeted appliance; and
   a means for controlling said appliance future behavior based on said instructions.

16. The system of claim 15, further comprising:
   a means for said targeted device to receive one or more DTMF tones over said communication system; and
   a means for translating any received DTMF tones into instructions that will control the behavior a targeted appliance located at the remote location.

17. The system according to claim 16, further comprising:
   a means for determining what information is encoded into a sequence of DTMF tones by analyzing order in which the tones are arranged; and means for translating said information into an access code, targeted appliance location identify, and instructions to be used by the server to in affecting the behavior of said targeted appliance at the remote location.

18. The system according to claim 16, wherein the DTMF-tones are transmitted via a communication system to a central server from a remote input terminal and from the central server to the targeted device at a remote location.

19. The system according to claim 16, wherein said DTMF-tones are transmitted via the Internet to a central server from a remote input terminal and from the central server to the targeted device at a remote location.

20. The system of claim 16, further comprising:
   a means for said device to convert said DTMF-tones into Bluetooth Technology signals containing said instructions that will affect the future behavior of a targeted appliance.

21. The system of claim 15, further comprising:
   a means for said device to convert said DTMF-tones into audio signals containing said instructions that will affect the future behavior of a targeted appliance.

22. The system of claim 15, further comprising:
   a means for said device to convert said DTMF-tones into electrical pulses containing said instructions that will affect the future behavior of a targeted appliance.

23. A system for controlling a remotely located appliance by relaying instructions from a remote input terminal to a device over a communication system, comprising:
   a device with a processor at a remote location configured for monitoring a communication system for incoming activity from a central computer;
   a device further configured for determining whether incoming activity in a form of DTMF-tones over the communication system should be accept by said device;
   a central computer having memory for storing incoming instructions from a remote input terminal;
   a device at the remote location able to monitor the incoming activity on the communication system for the existence of a signal that enables the central computer forwarded instructions to be accepted as being authorized;
   a device at the remote location able to transmit received instructions to said appliance; and said instructions are able to control the future behavior of the appliance.

24. The system of claim 23, further comprising:
   a device containing a decoder configured for translating DTMF tones into instructions by generating signals that the targeted appliance will recognize as valid incoming instruction code.

25. The system according to claim 23, wherein a device is further configured for analyzing the position of a DTMF tone in a string of DTMF tones to determine what information is encoded in said string; and translating the string of DTMF tones into instructions.

26. A system for controlling one or more remote appliance with instructions communicated over a communication network from a input terminal remote to a central computer, comprising:

a device with a processor located at a remote location configured to monitor a communication network for incoming instructions from a central computer;

a plurality of remote input terminals configured to transmit information to a central computer via a communication network;

a central computer configured to receive information from a plurality of remote input terminals via a communication network;

a central computer with memory configured for processing and storing information received from a remote input terminal;

a central computer configured to determine whether a valid password, target location, and instructions are contained in the information received from a remote input terminal;

a central computer able to send said instructions to a targeted location using a communication network;

a device with a processor located at a remote location able to receive instructions over said network from said central computer and able to transmit the received instructions to a targeted appliance at said remote location; and control said appliance future behavior with said instructions.

27. The system of claim 26, further comprising:

a processor within the device at a remote location configured for transmitting received electrical pulses that containing instructions to the targeted appliance.

28. The system according to claim 26, wherein information is encoded in electrical pulses transmitted to a central server over a communication network from a remote input terminal.

29. The system according to claim 27, wherein the said electrical pulses are transmitted via the Internet from a remote input terminal to a central server.

30. The system of claim 27, wherein the device with a processor is further configured for converting said electrical pulses into Bluetooth Technology signals that encode the instructions that originated from the remote input terminal.

31. The system of claim 26, wherein the device with a processor is further configured for converting said electrical pulses into audio signals that encode the instructions that originated from the remote input terminal.

32. The system of claim 26, wherein the device with a processor at the remote location is further configured for converting received instructions into electrical pulses that are communicated to a microprocessor located in a targeted appliance via a cable.

33. The system of claim 27, wherein the processor within the targeted appliance is further configured for processing electrical pulses that encode instructions that were forwarded from a central computer and said instructions will affect future behavior of said appliance.

34. The system according to claim 26, wherein the processor at a remote location is further configured for decoding instructions from a string of DTMF tones by analyzing the order in which tones are arranged in a string; and said processor is further configured for transmitting the decoded instructions to a targeted device.

35. The system of claim 32, wherein the electrical pulses containing said incoming instructions are transmitted from the device to a microprocessor located in the remote device.

36. The system according to claim 26, wherein the processor at a remote location is further configured for decoding instructions from a string of DTMF tones by analyzing order in which the tones are arranged in the string; and said processor is further configured for transmitting the decoded instructions to a targeted device.

37. A computer readable medium having computer executable software code stored thereon, the code for controlling at least one remote device over a communication system, comprising:

code for enabling a remotely located computer to monitor a communication system for activity;

code for enabling a computer to determine whether an incoming activity from an input terminal contains instructions for controlling a device at a remote location;

code for enabling a remotely located processor to accept incoming instructions from a computer;

code for enabling a remotely located processor to determine whether incoming instructions over a communication system are authorized to be relayed to a device at a remote location;

code for storing incoming instructions when activity on the communication system enables reception of incoming instructions;

code for enabling a remotely located processor to transmit said incoming instructions to said device; and code for controlling said device based on said instructions.

38. A method for controlling future behavior of least one remotely located device via a communication system, comprising:

a server able to monitor a communication system for activity for incoming information containing an access code, remote location id, and instructions;

determining whether the incoming information is authorized to be accepted by the server;

processing and storing said incoming information when said activity on the communication system contains a signal indicating that the incoming information should be process and forwarded to a remote device; and controlling the behavior of said device with the instructions received from the server.

39. A system for controlling the future behavior of at least one remotely located appliance, comprising:

a means for a server to monitor a communication system for information from a remote input terminal;

a means for detecting whether activity on the communication system contains coding authorizing reception of any incoming information;

a means for directing information stored on a server to a remote location according to direction received from a remote input terminal; and a means for transmitting information that will affect the future behavior of a targeted device.

40. A system for controlling behavior of an appliance using a communication system to transmit time delayed instructions received from a remote input device, comprising:

a central server containing executable software code stored for monitoring a communication network for activity incoming from a plurality of remote input terminals;

a central server containing code for storing and validating and processing incoming instructions received over a communication network from a remote input device;

a central server containing code for determining whether instructions forwarded from said server over a communication network are authorized to be accepted at a remote location;

a device at a remote location able to accept instructions forwarded from said server and transmit said instructions to a targeted appliance; and affect the behavior of the appliance with said instructions.

41. A system for affecting behavior of a remotely located appliance using a communication system to transmit time delayed instructions received from a remote input device, comprising:

a means for monitoring a communication system for incoming instructions from a remote input terminal;

a means for determining whether incoming instructions are accompanied by a valid authorizing password for controlling a targeted device at a remote location;

a means for enabling reception of any incoming instructions from a central computer;

a means for storing said incoming instructions when authorization received over the communication system enables reception of incoming instructions; and a means for transmitting said incoming instructions to said remote appliance.

42. A computer readable medium having computer executable software code stored thereon, the code for controlling at least one remote device over a communication system, comprising:

code for enabling a remotely located computer to monitor a communication system for activity;

code for enabling a computer to determine whether an incoming call from an input terminal contains instructions for controlling a device at a remote location;

code for enabling a remotely located processor to accept incoming instructions from a computer;

code for enabling a remotely located processor to determine whether incoming instructions over a communication system are authorized to be relayed to a device at a remote location;

code for storing incoming instructions when activity on the communication system enables reception of incoming instructions;

code for enabling a remotely located processor to transmit said incoming instructions to said device; and code for controlling said device based on said instructions.

43. A remotely located server programmed for controlling a remotely located appliance by transmitting instructions over a communication system, comprising:

a central computer accessible to a plurality of remote input terminals via a communication system;

a central computer able to store and process information received from a plurality of remote input terminals;

a central computer able to response to received information from each remote input terminal by directing output to a specific remote location corresponding to the received information;

a central computer able to response to received information from each remote input terminal by directing an access coded and instructions to a specific remote location corresponding to the received information;

a device at the remote location is able to accept instructions received over a communication network once a valid access code is detected;

a device able to transmit received instructions to an appliance and effect said appliance behavior.

44. A remote input device able to relay instructions to a targeted device at remote location by transmitting instructions and an access code over a communication system to a server and said server re-transmitting the access code and instructions to an appliance at a remote location, comprising:

an input terminal able to transmit instructions and an access code over a communication system to a server for processing;

a server able to monitor a communication system for incoming information from a remote input terminal;

a server able to determine whether a received input from the input terminal should be accepted, process and stored in memory for future forwarding to a previously added location;

a server able to forward the process information over the communication system to a specific remote location;

a device at the remote location able to check for a valid access code before accepting the information forwarded from the server to the remote location;

a device able to transmit information received from the server to a targeted appliance at the remote location;

and affect the future behavior of said appliance.

45. A method for controlling at least one remote device over a communication system, comprising:

monitoring a communication system for activity; detecting whether an outgoing call is being made;

determining whether activity on the communication system contains instructions;

storing incoming instructions when activity on the communication system contains a signal indicating that the incoming instructions are authorized to be process and forwarded to a remote device; and controlling behavior of a targeted appliance with the instructions the remote device received and relayed to said appliance.

46. A method for controlling future behavior of a remotely located appliance by transmitting instructions over a communication system using a central computer and a plurality of remote input terminals, comprising:

monitoring a communication system for activity; determining whether the communication system is able to relay instructions from a remote terminal to a central computer;

determining whether an incoming call is made from the central computer that is transmitting instruction to a remote location;

determining whether activity on the communication system contains a valid password that will enable reception of any incoming instructions;

storing said incoming instructions when valid authorization password enables reception of incoming instructions;

transmitting said incoming instructions to said device; and controlling said device based on said instructions.

47. A remote input device able to relay instructions to a targeted device at remote location by transmitting instructions and access codes over the Internet to a server and said server re-transmitting the access code and instructions to an appliance at a remote location, comprising:

an input terminal able to transmit instructions and an access code over a communication system to a server for processing;

a server able to monitor the Internet for incoming information from a remote input terminal;

a server able to determine whether received input from the input terminal should be accepted, process and stored in memory for future forwarding to a previously added location;

a server able to forward the process information over the Internet to a specific remote location;

a device at the remote location able to check for a valid access code before accepting the information forwarded from the server to the remote location;

a device able to transmit information received from the server to a targeted appliance at the remote location; and affect future behavior of said appliance.

48. A device able to affect future behavior a targeted appliance at a remote location by enabling the reception of instruction from a remote input terminal, comprising:

a means for a server to monitor a communication system for activity incoming from a remote input terminal;

a means for a server to determine whether activity incoming over a communication system from a remote input terminal contains information should be process and stored;

a means for a server store any incoming information from a remotely located terminal when it contains an access code, a remote location identifier, and instructions;

a means for the server to transit the information over a communication system to a targeted remote location;

a means for the transmitted information to be convey to a selected appliance at the remote location; and controlling said appliance behavior with said instructions.

49. A method for controlling future behavior of a remotely located appliance by transmitting instructions over a communication system using a central computer and a plurality of remote input terminals, comprising:

a means for a server to monitor a communication system for incoming activity containing instructional information and a valid access code;

a means for a server to process and store information received over a communication system;

a means for a server to transmit the process information to a targeted appliance at a remote location; and affect the appliance behavior with the transmitted information.

50. A system for controlling at least one remote appliance, comprising:

a means for a server to monitor a communication system for incoming information related to controlling an appliance located at a remote location:

a means for monitoring information inputted into a server over a communication system from a remote input terminal;

a means for determining whether the communication system has established a connection between the server and a device at a remotely targeted location;

a means for determining whether the remotely targeted device attached to the communication system is authorized to accept incoming information;

a means for a device at the remote location to transmit received information as electrical impulses that are conducted to the targeted appliance via a connecting cable; and controlling said appliance based on said information.

51. A system for controlling behavior at least one remotely located appliance using a communication system, comprising:

a means for a server to monitor a communication system for incoming information related to controlling an appliance located at a remote location:

a means for monitoring information inputted into a server over a communication system from a remote input terminal;

a means for determining whether the communication system has established a connection between the server and a device at a remotely targeted location;

a means for determining whether the remotely targeted device attached to the communication system is authorized to accept incoming information;

a means for a device at the remote location to transmit received information as Bluetooth Technology signals to the targeted appliance; and controlling said appliance based on said information.

52. A system for controlling future behavior one remotely located appliance using a communication system, comprising:

a means for monitoring a communication system for incoming activity in the form of an access code and instructions from a plurality of remote data input terminals;

a means for the server to determine when to forward the information received from a remote input terminal;

a means for the server to establish contact with a targeted remote location over the communication system;

a means for a server to determine whether a device at a remote location is able to accept information;

a means for a device at a remote location to determining whether the incoming information from the server is correctly targeted the remote location;

a means for the device at the remote location to transmit received information to a targeted appliance at said remote location; and for said information to control future behavior of said appliance.

53. A system for controlling a remotely located appliance with instructions forwarded from a remotely located input terminal, comprising the steps of:

a remotely located input terminal able to transmit instructions to a central server over a communication system;

a remotely located server able to monitor a connection to a communication system for incoming information from a remote input terminal;

a server able to determine whether the information communicated over a communication system should be accepted by said server;

a server able to process and store information received over a communication system and later transmit the process information to a remote location;

a server able to detect a valid access code, a remote location identification, and instructions in the information received from the remotely located input terminal;

a remote location able to accept information from a remote server and determine whether said information contains a valid access code;

ability to convey instructions from said server to a targeted appliance; and control future behavior of said appliance based on said instructions.

* * * * *

UNITED STATES PATENT AND TRADEMARK OFFICE
CERTIFICATE OF CORRECTION

| | |
|---|---|
| PATENT NO. | : 7,194,072 B2 |
| APPLICATION NO. | : 09/803257 |
| DATED | : March 20, 2007 |
| INVENTOR(S) | : Oliver W. Gamble |

It is certified that error appears in the above-identified patent and that said Letters Patent is hereby corrected as shown below:

All should read

Figure 7A:
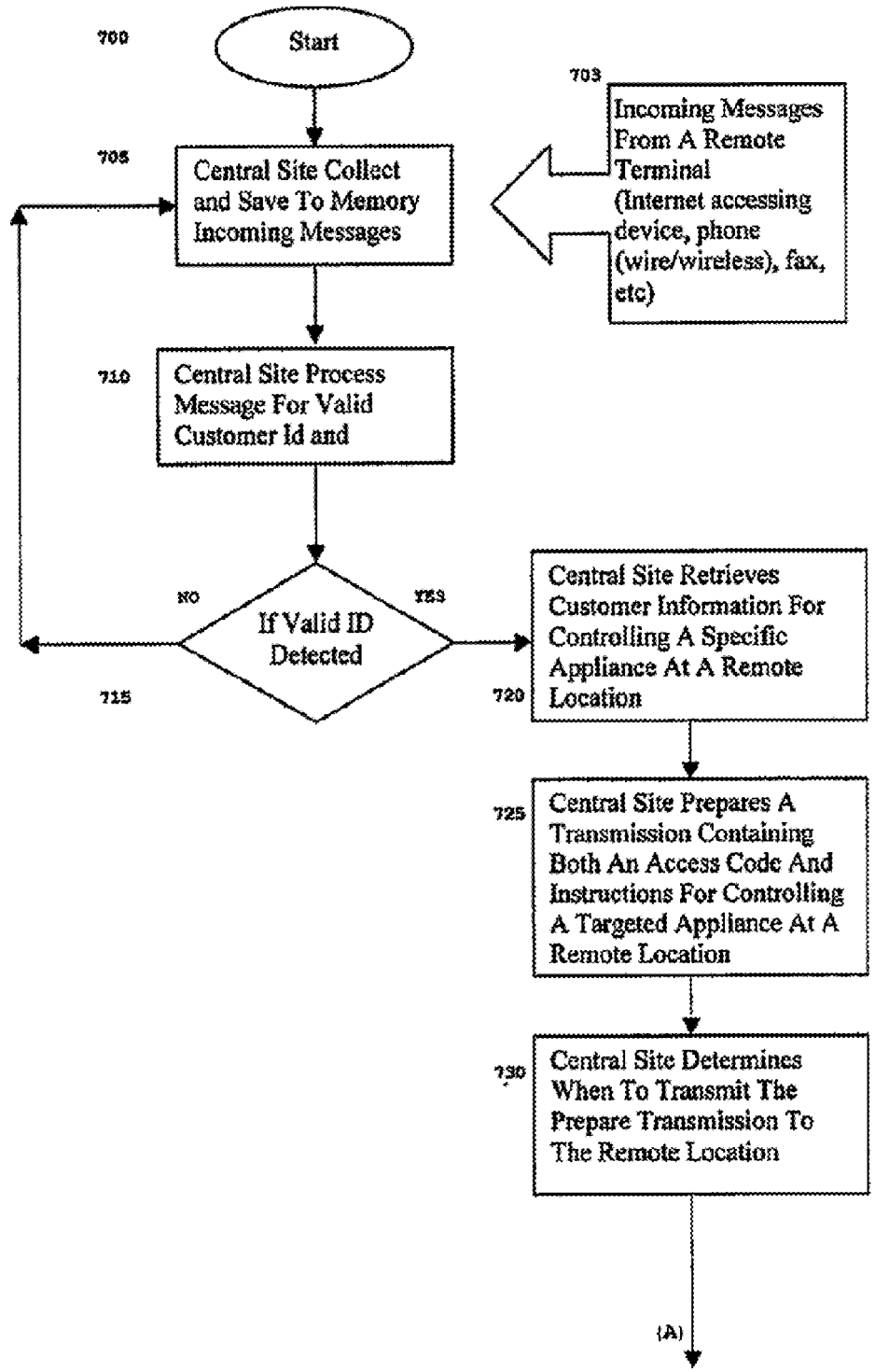
Figure 7:
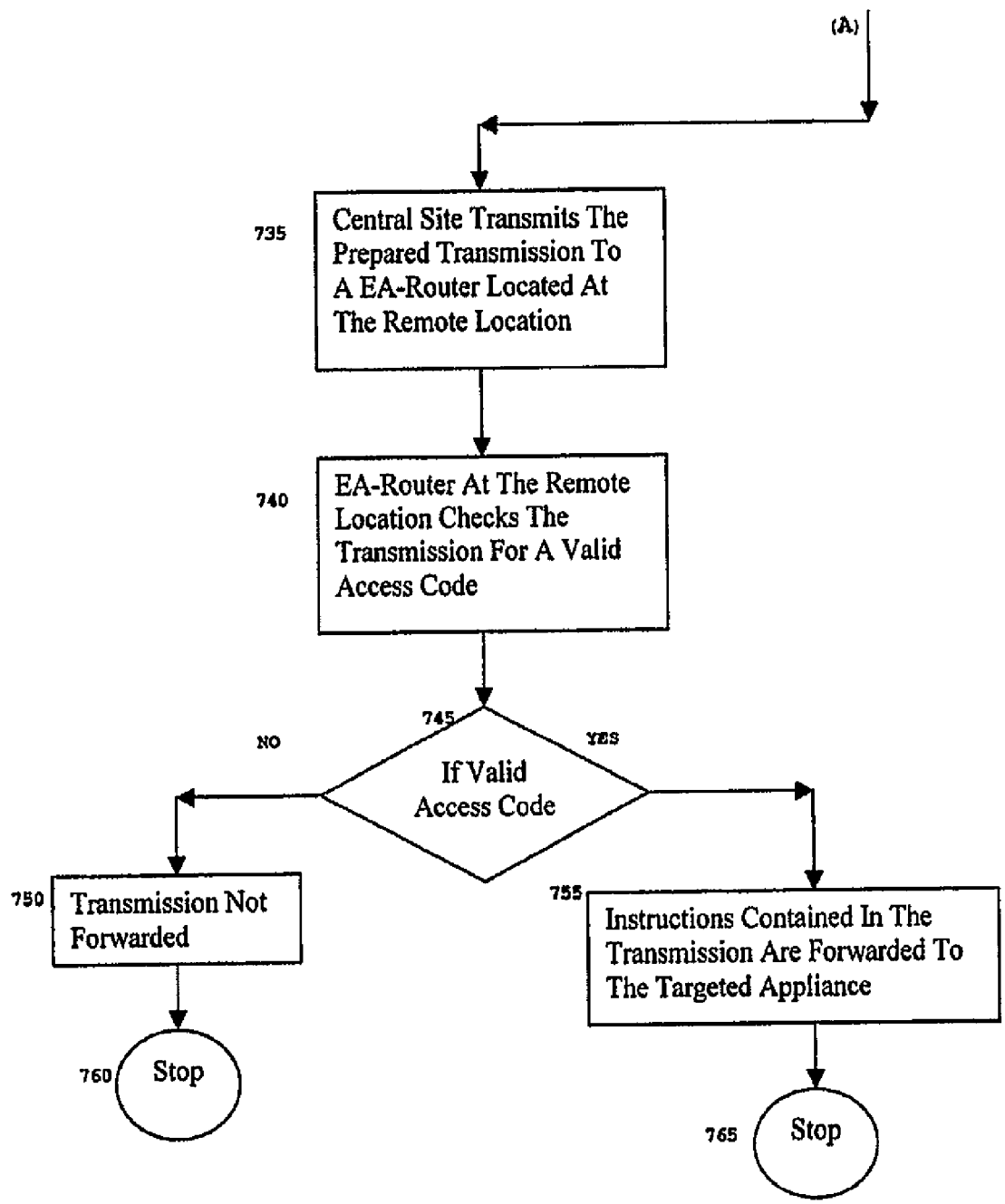

Fig. 7, item 703: Inputted instructions from a variety of remote input terminals, Fig. 7, item 705: The Central Site can stores information, until it is ready to act on it.

Fig. 7, item 710: The Central Site processes received information and validates the user's identity.

Fig. 7, item 715: If valid, the user's EA router access code, and model number information are retrieved from the user's record.

Fig. 7, item 720: If valid, the user's EA router access code, and model number information are retrieved from the user's record.

Fig. 7, item 725: This information is used to generate a numeric string that encodes the command instructions that are required to effectuate the recording.

Fig. 7, item 725: The central site validates the user's identity and collects information regarding the program the user wants to record: day of recording, time of the recording, channel from which to record the program. The central site then generates a string of DTMF tones that encodes the user's access code, channel from which the recording is to be made, the commands to activate the VCR, the commands for rewinding the tape, and the commands for start recording.

UNITED STATES PATENT AND TRADEMARK OFFICE
CERTIFICATE OF CORRECTION

PATENT NO. : 7,194,072 B2
APPLICATION NO. : 09/803257
DATED : March 20, 2007
INVENTOR(S) : Oliver W. Gamble It is certified that error appears in the above-identified patent and that said Letters Patent is hereby corrected as shown below:

Fig. 7, item 730: The central site sends the code out anywhere from 5 to 10 minutes before the desired recording time. This reduces the size and amount of coding required to be sent. In another embodiment, the string of DTMF tones sent to the EA router 120A contains coding information for selecting date and time. In other embodiments, the central site may allow interaction with the user's device directly.

Fig. 7, items 735 & 740: String of DTMF tones may be transmitted to the EA router 120A. The position and length of each component of the encoded instructions to the recording device is preset, allowing the EA muter 120A to easily convert the central site transmitted data string into an access code, instructions codes that mimic the recording device remote control unit, and a termination flag.

Fig. 7, item745: The central site generates a string of DTMF tones that encodes this information as shown above. In one embodiment the registered EA router's access code is attached to the beginning of the encoded information, and the end of data flag (#) is attached to the end of the encoded information. The access code allows the EA router 120A to determine if the captured string of DTMF-tones should be accepted. The end of data flag tells the EA router 120A when the end of the string of DTMF tones is reached, and that it can now begin to process the string into code signals that will mimic a remote control unit.

UNITED STATES PATENT AND TRADEMARK OFFICE
CERTIFICATE OF CORRECTION

| | | |
|---|---|---|
| PATENT NO. | : 7,194,072 B2 | |
| APPLICATION NO. | : 09/803257 | |
| DATED | : March 20, 2007 | |
| INVENTOR(S) | : Oliver W. Gamble | |

It is certified that error appears in the above-identified patent and that said Letters Patent is hereby corrected as shown below:

Fig. 7, item 745: Once the string of digits is convened into valid code signal that the recording device recognizes, the instruction codes are transmitted to the recording device. The transmission mode may be in the form of infrared light impulses generated by the infrared diode/transmitter attached to the EA muter 120A (FIG. 2A) and received by the recording device infrared detector.

Figure 7A:
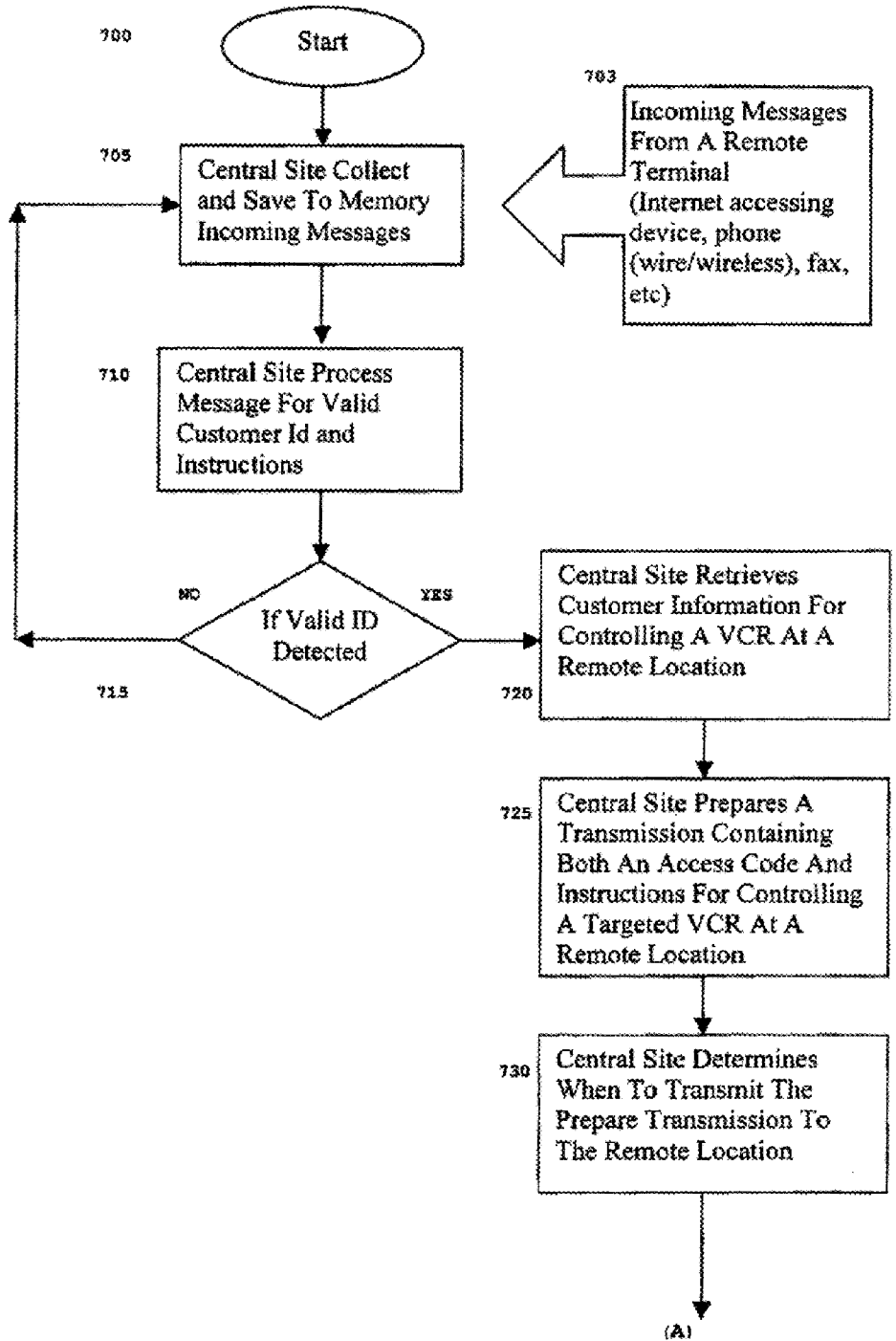
Figure 7B:
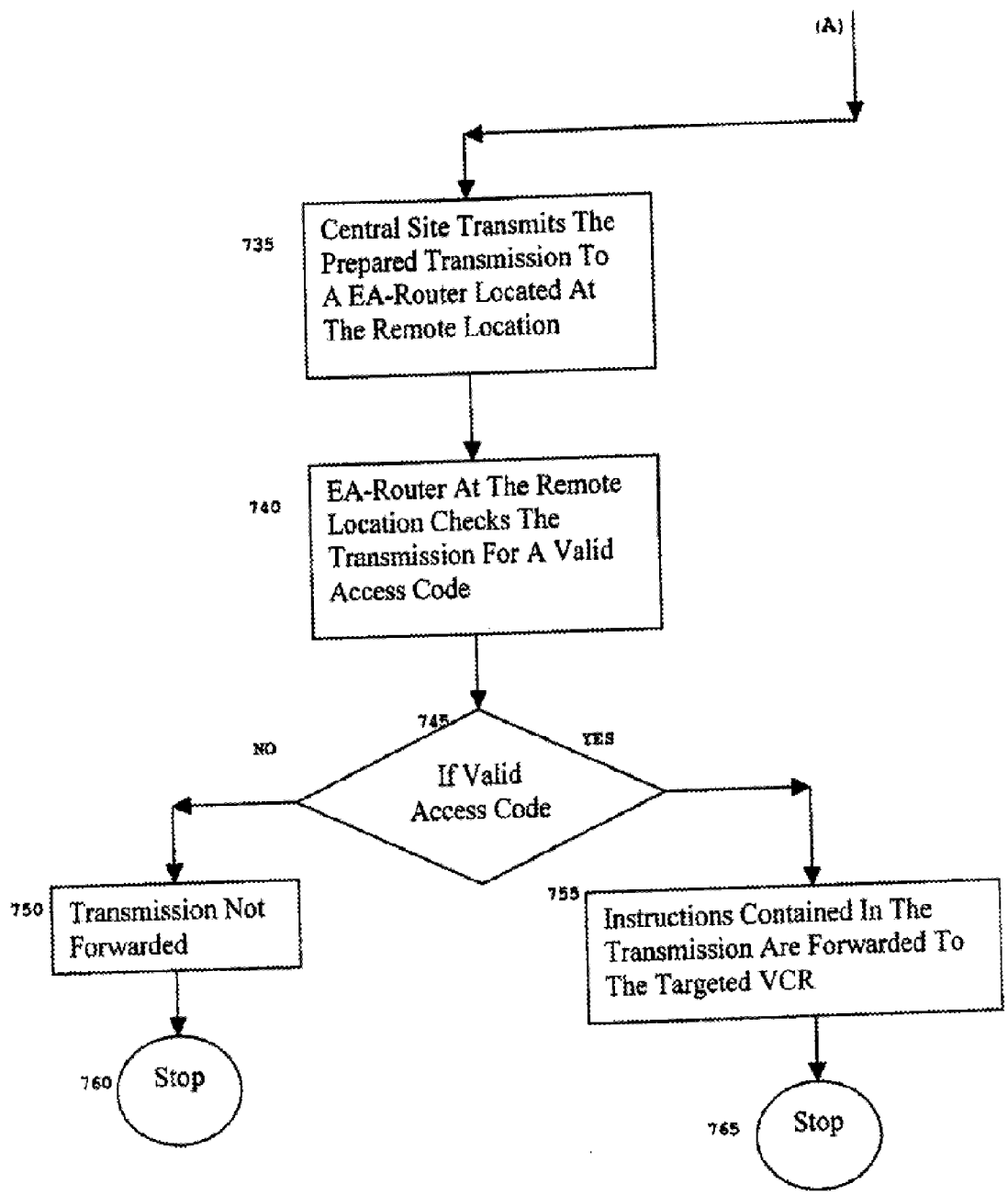
Figure 8:
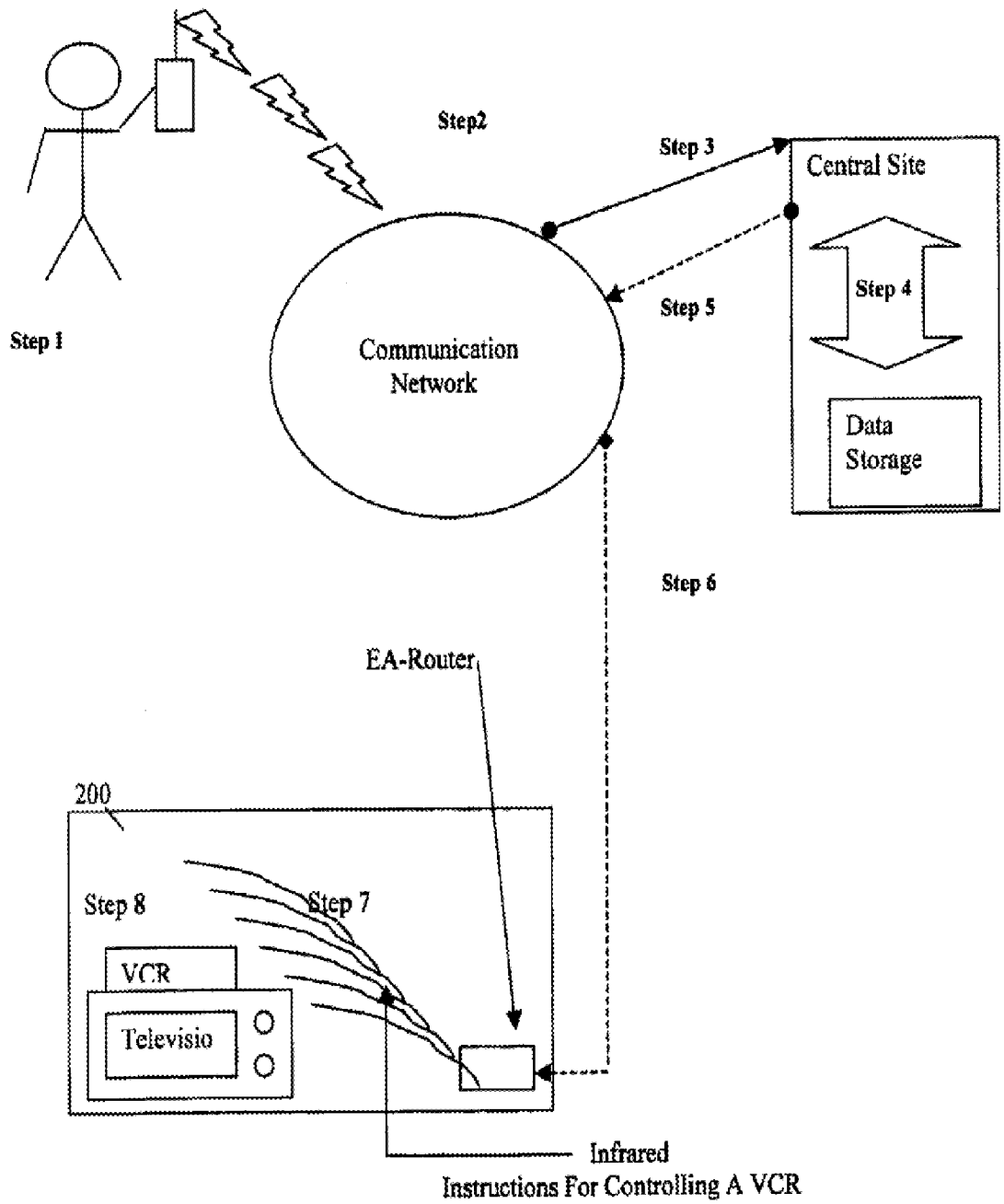
Figure 9:
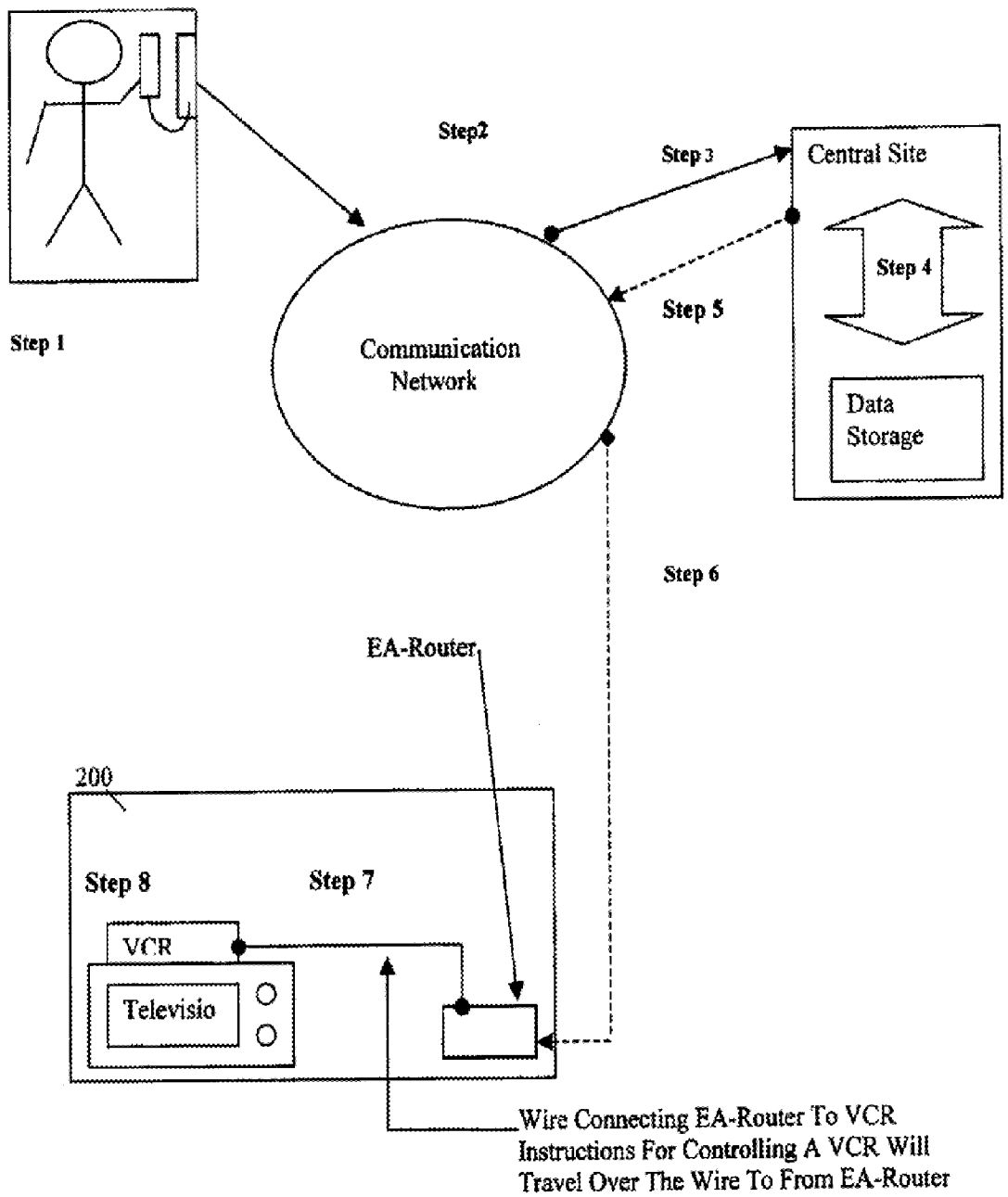
Figure 10:
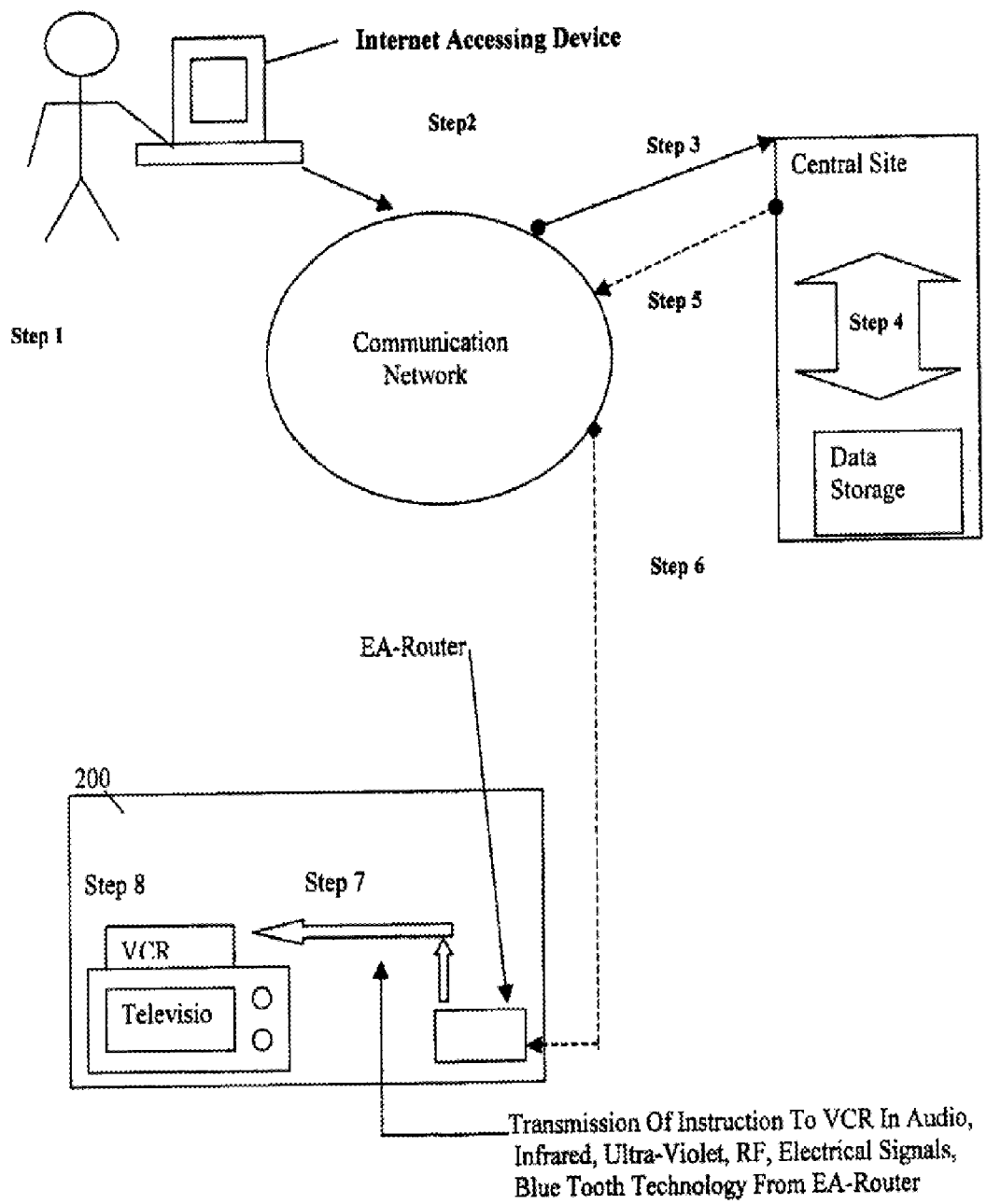

(As shown on attached Figs. 7A & 7B)

Figure 8:
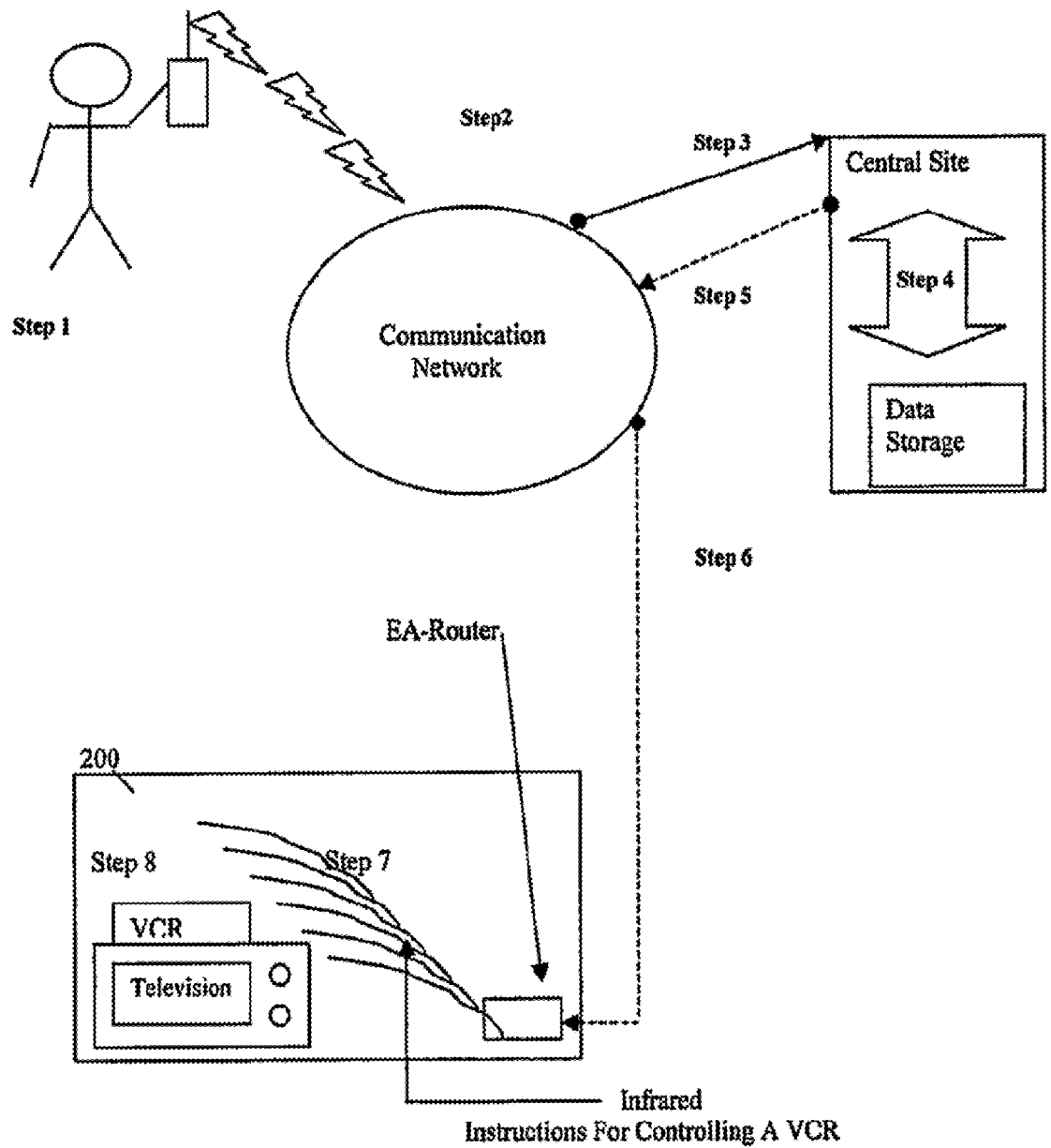

In Figure 8, there is a user (Step 1) contracting a Central Site (Step 3) via a communication network (Step 2). The Central Site will accept inputted instruction in the form of DTMF tones transmitted over a communication network. The Central Site will process and store the data at the Central Site (Step 4). The Central Site will then forward the process input from the user to a remote location (Illustration 1, item 200) over a communication network (Step 5 and Step 6). At the Remote location the EA-Router (AKA Device at Remote location) will accept and evaluate the information from the Central Site. If a valid authorization code is detected, the EA-Router will forward the Instructions from the Central Site to the targeted appliance (VCR) by Infrared signals.

(As shown on attached Fig. 8)

UNITED STATES PATENT AND TRADEMARK OFFICE
CERTIFICATE OF CORRECTION

| | |
|---|---|
| PATENT NO. | : 7,194,072 B2 |
| APPLICATION NO. | : 09/803257 |
| DATED | : March 20, 2007 |
| INVENTOR(S) | : Oliver W. Gamble |

Figure 9:
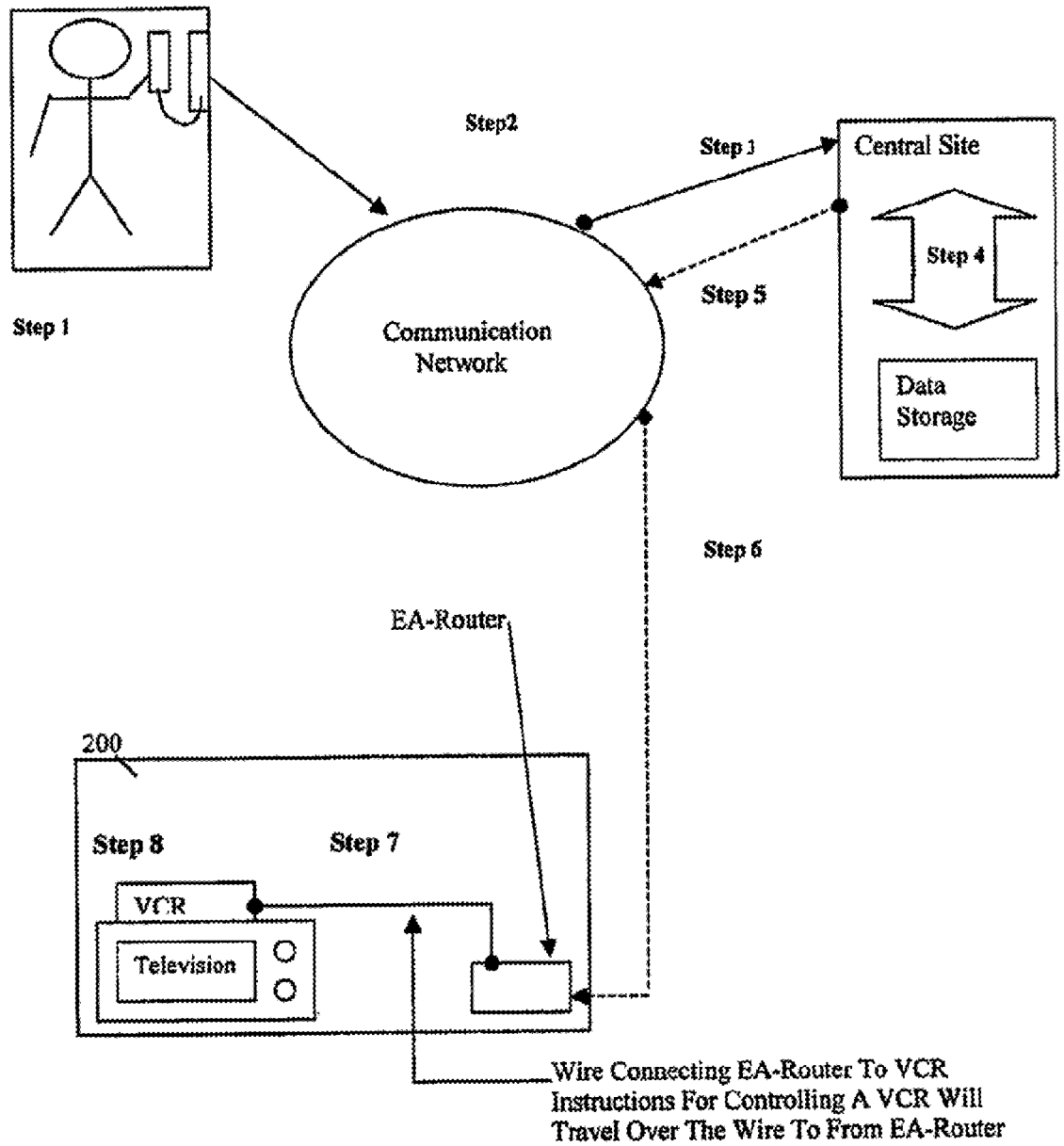

It is certified that error appears in the above-identified patent and that said Letters Patent is hereby corrected as shown below:

In Figure 9, there is a user (Step 1) contracting a Central Site (Step 3) via a communication network (Step 2). The Central Site will accept inputted instruction in the form of DTMF tones transmitted over a communication network. The Central Site will process and store the data at the Central Site (Step 4). The Central Site will then forward the process input from the user to a remote location (Illustration 2, item 200) over a communication network (Step 5 and Step 6). At the Remote location the EA-Router (AKA Device at Remote location) will accept and evaluate the information from the Central Site. If a valid authorization code is detected the EA-Router will forward the Instructions from the Central Site by transmitting electrical signals over a wire directly to the targeted appliance (VCR).

(As shown on attached Fig. 9)

UNITED STATES PATENT AND TRADEMARK OFFICE
CERTIFICATE OF CORRECTION

| | | |
|---|---|---|
| PATENT NO. | : 7,194,072 B2 | |
| APPLICATION NO. | : 09/803257 | |
| DATED | : March 20, 2007 | |
| INVENTOR(S) | : Oliver W. Gamble | |

Figure 10:
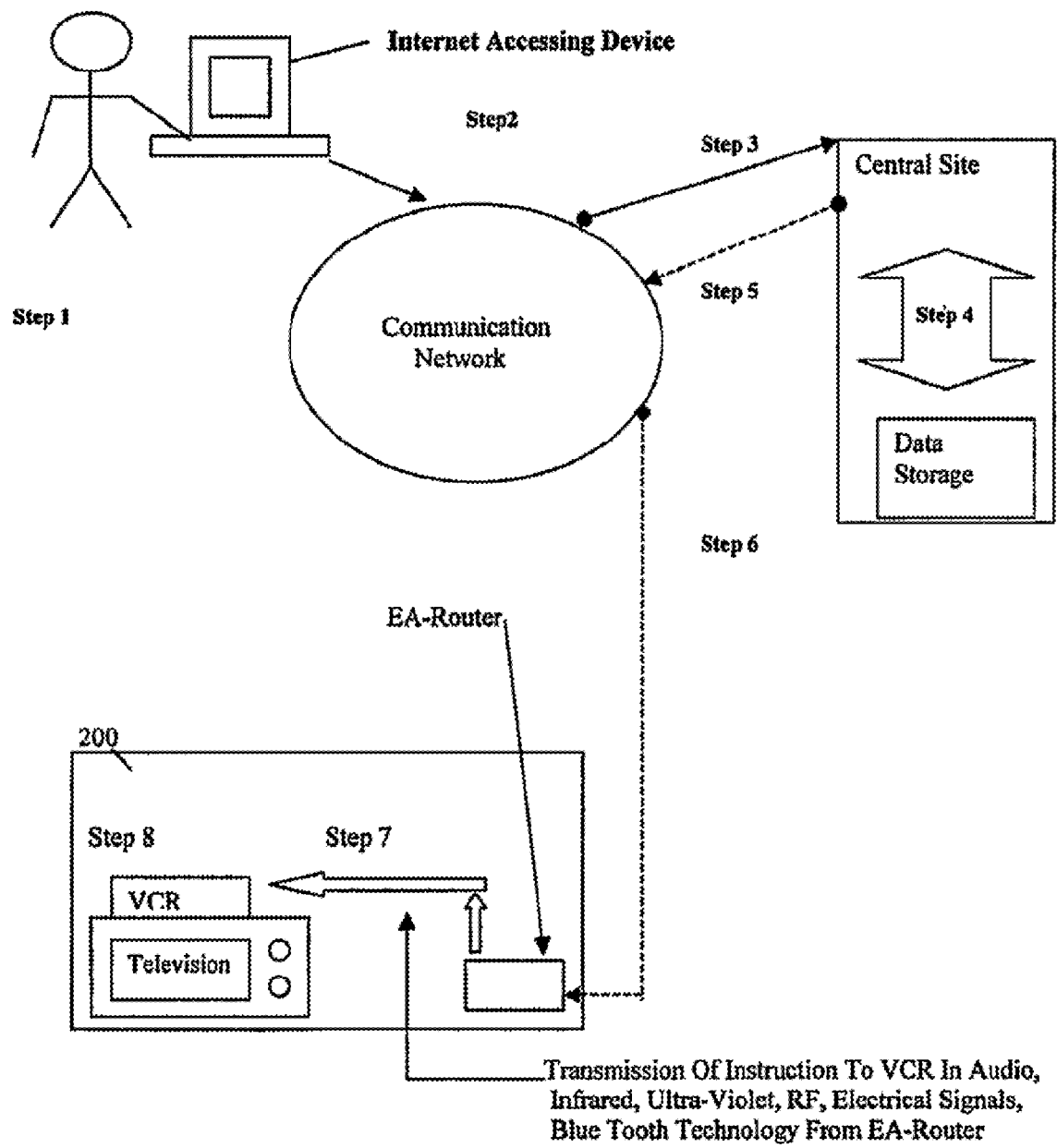
Figure 1:
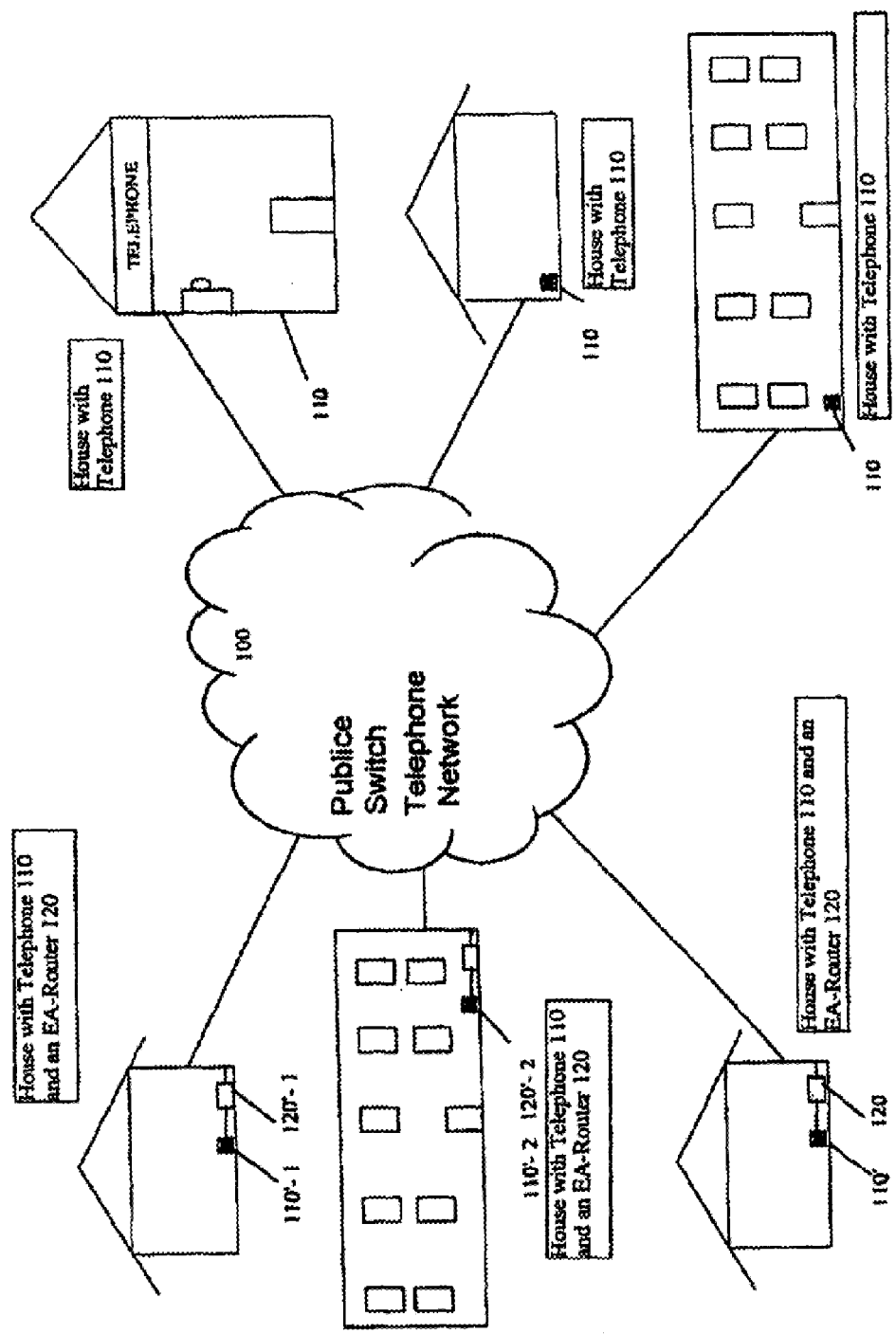

It is certified that error appears in the above-identified patent and that said Letters Patent is hereby corrected as shown below:

In Figure 10, there is a user (Step 1) contracting a Central Site (Step 3) via a communication network (Step 2). The Central Site will accept inputted instruction in the form of DTMF tones transmitted over a communication network. The Central Site will process and store the data at the Central Site (Step 4). The Central Site will then forward the process input from the user to a remote location (Illustration 3, item 200) over a communication network (Step 5 and Step 6). At the Remote location the EA-Router (AKA Device at Remote location) will accept and evaluate the information from the Central Site. If a valid authorization code is detected, the EA-Router will forward the Instructions from the Central Site to the targeted appliance (VCR) by Audio, Infrared, Ultra-Violet, RF, Electrical Signals, or Blue Tooth Technology.
(As shown on attached Fig. 10)

Signed and Sealed this

Twenty-first Day of August, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,194,072 B2 | Page 1 of 33 |
| APPLICATION NO. | : 09/803257 | |
| DATED | : March 20, 2007 | |
| INVENTOR(S) | : Gamble | |

It is certified that error appears in the above-identified patent and that said Letters Patent is hereby corrected as shown below:

The title page showing an illustrative figure, should be deleted and substitute therefore the attached title page Delete drawing sheets 1 through 12 and substitute therefore the drawing sheets 1-17 as attached Please delete column 1 line 1 through column 26 line 57 and insert column 1 line 1 through column 28 line 46, as attached Signed and Sealed this Sixth Day of May, 2008

JON W. DUDAS
*Director of the United States Patent and Trademark Office*

(12) United States Patent  (10) Patent No.: US 7,194,072 B2
Gamble  (45) Date of Patent: Mar. 20, 2007

(54) METHOD AND SYSTEM FOR REMOTELY ACCESSING AND CONTROLLING REMOTE DEVICES

(76) Inventor: Oliver W. Gamble, 436 E. 75th St., New York, NY (US) 10021

(*) Notice: Subject to any disclaimer, the term of this patent is extended or adjusted under 35 U.S.C. 154(b) by 354 days.

(21) Appl. No.: 09/803,257

(22) Filed: Mar. 9, 2001

(65) Prior Publication Data
US 2002/0041667 A1   Apr. 11, 2002

Related U.S. Application Data

(63) Continuation-in-part of application No. 09/552,711, filed on Apr. 19, 2000, now Pat. No. 7,068,776.

(60) Provisional application No. 60/263,506, filed on Jan. 24, 2001.

(51) Int. Cl.
*H04M 11/08* (2006.01)

(52) U.S. Cl. ............... 379/102.03; 340/825.69; 455/403; 713/168

(58) Field of Classification Search ............ 379/563, 379/102.01–102.09, 379–382, 29.03, 29.04, 379/106.05, 106.08, 93.27, 93.18, 93.05; 455/419, 403, 414
See application file for complete search history.

(56) References Cited

U.S. PATENT DOCUMENTS

| | | | | |
|---|---|---|---|---|
| 5,051,720 A | * | 9/1991 | Kittirutsunetorn | 340/310.12 |
| 5,761,280 A | * | 6/1998 | Noonen et al. | 379/93.27 |
| 5,915,026 A | * | 6/1999 | Mankovitz | 713/168 |
| 5,974,449 A | * | 10/1999 | Chang et al. | 709/206 |
| 6,044,278 A | * | 3/2000 | Goto et al. | 455/422.1 |
| 6,144,848 A | * | 11/2000 | Walsh et al. | 455/419 |
| 6,167,251 A | * | 12/2000 | Segal et al. | 455/406 |

FOREIGN PATENT DOCUMENTS

JP    410126494    * 5/1998

* cited by examiner

*Primary Examiner*—Gerald Gauthier

(57) ABSTRACT

A method and system for enabling users to remotely activate a device using a router. The router may be accessed by communication over one or more networks including, but not limited to, the internet, wireless networks, cable networks, etc. A user accesses an emitter of the user's router and, using transmitted DTMF tones, controls the device.

53 Claims, 17 Drawing Sheets

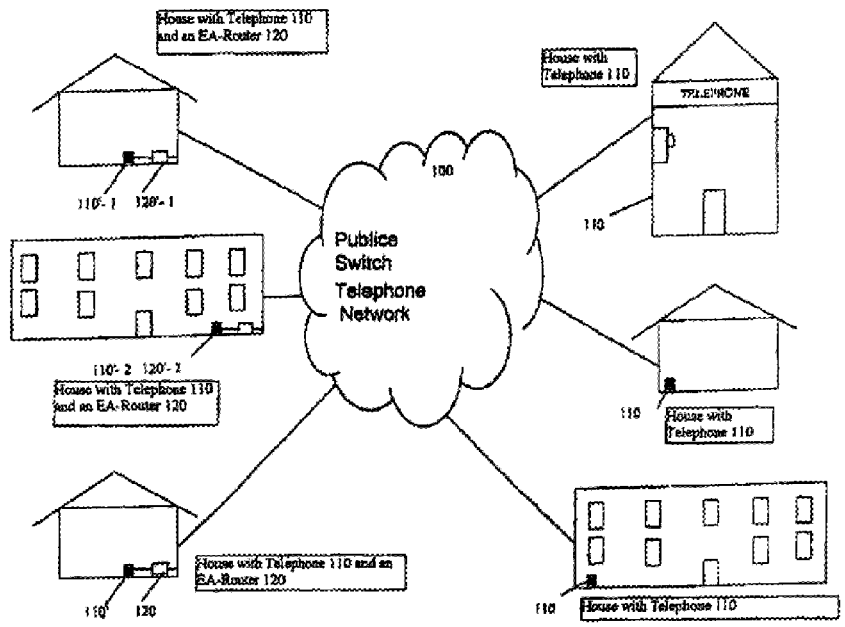

RINGING

ANSWER

DIALING

METHOD AND SYSTEM FOR REMOTELY ACCESSING AND CONTROLLING REMOTE DEVICES

This is a continuation-in-part of application Ser. No. 09/552,711, filed Apr. 19, 2000, now U.S. Pat. No. 7,068,776.

I claim the priority of provisional patent application 60/263,506, filed on Jan. 24, 2001; this application is incorporated by reference in it entirely.

FIELD OF THE INVENTION

The present invention relates generally to a method and system for accessing and controlling devices via remote control over communication systems, and more particularly to a method and system for controlling media recording using the telephone, internet or cable.

BACKGROUND OF THE INVENTION

Often, individuals wish to view a program which requires users to set a media recorder to record the desired program or to contact another person to record the program on a user's behalf. The result is that viewers may miss out on programs that they would like to see because they lack the time to actually view the program, did not set their recorder to record the program, or could not get another person to record the program for them.

Various methods and systems exist for the recording of media, be it media in the form of conventional television, cable, Internet or satellite. The media can be recorded on tapes (e.g., VCR), digital storage sit on top boxes (e.g., TiVo) and hard disk or compact disk storage system. If there is no method of communicating with the storage device via remote access, then there is a lack of opportunity to record interesting media if user is away from the recording device.

SUMMARY OF THE INVENTION

The present invention allows users to remotely set their media recording devices for programs that they want to see, event if no one is in the same location as the recording device. This is accomplished by accessing an enhanced automatic router unit that is in communication with any device that may recognize an incoming call (e.g., answering machine, modified caller ID box, etc.).

The present invention is part of a system/method that allows users to contact a central site and leave instructions for their media recording devices. In one embodiment, users may be signed up purchasers of registered remote units.

The remote user can contact the central site via any Internet accessing device, phone (wire/wireless), fax, etc. The user may then supply requested information to enable the central site to access and set the user's recording device. The enhanced automatic router (EA router) may be attached to a modified Caller ID Box, a phone line with a standard answering machine, a computer, a cable line, etc. The media recording device can be one of a variety of media storage devices including, but not limited to, tape (e.g., VCR), digital (e.g., TiVo), laser (write-able compact disk), etc.

BRIEF DESCRIPTION OF THE DRAWINGS

FIG. 1 illustrates a system according to one embodiment of the current invention.

FIG. 2 illustrates one embodiment of the router used in the system shown in FIG. 1.

FIG. 2A illustrates another embodiment of the router (EA router) used in the system shown in FIG. 1.

FIGS. 3A and 3B are flowcharts showing telephone line monitoring, discount call detection and call completion processes performed by the router shown in FIG. 2.

FIGS. 4A and 4B are flowcharts showing an alternate embodiment of the telephone line monitoring, discount call detection and call completion process performed by the router shown in FIG. 2.

FIG. 5 is a chart illustrating the various signals detected by the automatic router shown in FIG. 2 as it monitors the phone line for activity.

FIG. 6 is a flowchart showing the media recording access and control processes performed by the EA router shown in FIG. 2A.

FIG. 7, item 703: Inputted instructions from a variety of remote input terminals.

FIG. 7, item 705: The Central Site can stores information, until it is ready to act on it.

FIG. 7, item 710: The Central Site processes received information and validates the user's identity.

FIG. 7, item 715: If valid, the user's EA router access code, and model number information are retrieved from the user's record.

FIG. 7, item 720: If valid, the user's EA router access code, and model number information are retrieved from the user's record.

FIG. 7, item 725: This information is used to generate a numeric string that encodes the command instructions that are required to effectuate the recording.

FIG. 7, item 725: The central site validates the user's identity and collects information regarding the program the user wants to record: day of recording, time of the recording, channel from which to record the program. The central site then generates a string of DTMF tones that encodes the user's access code, channel from which the recording is to be made, the commands to activate the VCR, the commands for rewinding the tape, and the commands for start recording.

FIG. 7, item 730: The central site sends the code out anywhere from 5 to 10 minutes before the desired recording time. This reduces the size and amount of coding required to be sent. In another embodiment, the string of DTMF tones sent to the EA router 120A contains coding information for selecting date and time. In other embodiments, the central site may allow interaction with the user's device directly.

FIG. 7, items 735 & 740: String of DTMF tones may be transmitted to the EA router 120A. The position and length of each component of the encoded instructions to the recording device is preset, allowing the EA router 120A to easily convert the central site transmitted data string into an access code, instructions codes that mimic the recording device remote control unit, and a termination flag.

FIG. 7, item 745: The central site generates a string of DTMF tones that encodes this information as shown above. In one embodiment the registered EA router's access code is attached to the beginning of the encoded information, and the end of data flag (#) is attached to the end of the encoded information. The access code allows the EA router 120A to determine if the captured string of DTMF-tones should be accepted. The end of data flag tells the EA router 120A when the end of the string of DTMF tones is reached, and that it can now begin to process the string into code signals that will mimic a remote control unit.

FIG. 7, item 745: Once the string of digits is converted into valid code signal that the recording device recognizes, the instruction codes are transmitted to the recording device. The transmission mode may be in the form of infrared light impulses generated by the infrared diode/transmitter attached to the EA router 120A (FIG. 2A) and received by the recording device infrared detector.

(As shown on attached FIGS. 7A & 7B)

In FIG. 8, there is a user (Step 1) contracting a Central Site (Step 3) via a communication network (Step 2). The Central Site will accept inputted instruction in the form of DTMF tones transmitted over a communication network. The Central Site will process and store the data at the Central Site (Step 4). The Central Site will then forward the process input from the user to a remote location (Illustration 1, item 200) over a communication network (Step 5 and Step 6). At the Remote location the EA-Router (AKA Device at Remote location) will accept and evaluate the information from the Central Site. If a valid authorization code is detected, the EA-Router will forward the Instructions from the Central Site to the targeted appliance (VCR) by Infrared signals.

(As shown on attached FIG. 8)

In FIG. 9, there is a user (Step 1) contracting a Central Site (Step 3) via a communication network (Step 2). The Central Site will accept inputted instruction in the form of DTMF tones transmitted over a communication network. The Central Site will process and store the data at the Central Site (Step 4). The Central Site will then forward the process input from the user to a remote location (Illustration 2, item 200) over a communication network (Step 5 and Step 6). At the Remote location the EA-Router (AKA Device at Remote location) will accept and evaluate the information from the Central Site. If a valid authorization code is detected, the EA-Router will forward the Instructions from the Central Site by transmitting electrical signals over a wire directly to the targeted appliance (VCR).

(As shown on attached FIG. 9)

In FIG. 10, there is a user (Step 1) contracting a Central Site (Step 3) via a communication network (Step 2). The Central Site will accept inputted instruction in the form of DTMF tones transmitted over a communication network. The Central Site will process and store the data at the Central Site (Step 4). The Central Site will then forward the process input from the user to a remote location (Illustration 3, item 200) over a communication network (Step 5 and Step 6). At the Remote location the EA-Router (AKA Device at Remote location) will accept and evaluate the information from the Central Site. If a valid authorization code is detected, the EA-Router will forward the Instructions from the Central Site to the targeted appliance (VCR) by Audio, Infrared, Ultra-Violet, RF, Electrical Signals, or Blue Tooth Technology.

(As shown on attached FIG. 10)

DETAILED DESCRIPTION

System of the Invention

FIG. 1 shows one embodiment of a system incorporating the present invention. In this embodiment, the system includes telephones or user interface devices 110 and 110'. Although the interface user device, in one embodiment, is a telephone, in an alternate embodiment, user interface devices 110 and 110' may be a facsimile, computer, online access device, voice response unit or the like. It should be noted that although references are made herein to telephones and user interface devices, these terms are used interchangeably and may include the other user interface devices listed above, as well as those that are not listed herein, that utilize telephony services to effectuate communication over network 100. It should be noted that the difference between user interface devices 110 and 110' is the devices' connection with automatic router 120 which is described in detail below (i.e., 110' denotes that the device is connected to router 120, while 110 has no such router 120 connected to it).

As shown in FIG. 1, user interface devices or telephones 110 and 110' are connected to a network 100. Network 100 in one embodiment is a public switched telephone network (PSTN). In an alternate embodiment, network 100 may be the internet, world wide web or any network capable of effectuating long distance telephony communications between users. The network enables any one of the interface user devices 110 and/or 110' to be in communication with any of the other user interface devices 110 and/or 110'.

As shown in FIG. 1, some of the interface user devices 110 are connected to an automatic router 120 which may be situated between the telephone 110 and the port (i.e., wall socket) into which the telephone 110 is plugged. As will be described below with reference to FIGS. 3–5, router 120 enables users having such device to automatically make discount telephone calls (or telephone calls). It should be noted that while telephone 110 and automatic router 120 are shown as two separate devices, router 120 may be attached to, located within, or otherwise in communication with telephone 110. Finally, although users seeking to utilize discount long distance services are typically residential or non-commercial users, the scope of the system and method described herein are not limited to such use. Thus, the method and system described herein may include residential telephone users as well as commercial telephone users. Finally, it should be noted that the method and system described herein enable users to recognize discounts when placing potential discount calls. Discount calls are defined as long distance or international calls, and, in some cases, local calls. Because long distance carriers offer local telephone service, and vice versa, a discount telephone service provider may offer discounted service for international service calls, long distance calls, local calls, or any combination of these call types.

Automatic Router

FIG. 2 illustrates one embodiment of the router 120 used in the system shown in FIG. 1. The main components of the automatic call router 120 are a sensor array 122, relays 130, stamp 124 (containing a microprocessing unit, EEPROM, clock and RAM memory), DTMF (Dual Tone Multi-Frequency) decoder and encoder chip 126, a 2 kilo-ohm@5 watt resistor 129, voltage regulator and a power supply. The automatic router 120 may be interposed between and in communication with the telephone or user interface device and the network as shown in FIGS. 1 and 2.

The sensor array 122 may consist of the following three sensors: ring sensor 122-1, an answer/off hook sensor 122-2, and a time out sensor 122-3. These sensors will be termed the R.A.T. for ringing, answering incoming call/off hook status of phone, and time out.

The ringing sensor 122-1 comprises an alternating current optoisolator coupler. The coupler may be attached to the phone line by a reverse facing diode, allowing only negative current to flow through the diode and the trigger of the coupler. Ringing is a process that employs both positive and negative moving current. The reverse facing diode allows only the negative current to reach the coupler. The light emitting diode inside the coupler, in one embodiment, activates a photo-transistor. The photo-transistor allows current to flow through it to a pin on the microprocessor. The microprocessor detects the current as a high signal, indicating ringing of the phone.

The answering/off hook sensor 122-2, comprises an alternating current optoisolator coupler. The coupler is attached to the phone line by a forward facing diode, allowing only positive current to flow through the diode and trigger the coupler. When the phone 110 is off the hook, current flows through the phone line to the coupler. The light emitting diode inside the coupler activates a photo-transistor. The photo-transistor allows current to flow through it to a pin on the microprocessor. The microprocessor detects the current as a high signal, indicating the off hook status of the phone.

The time-out sensor 122-3, in one embodiment, is comprised of an alternating current optoisolator coupler and a triac. The coupler is attached to the phone line with leads coming from both the ring and answering sensors. When the phone 110 is off the hook, current flows through the phone line to the coupler. The light emitting diode inside the coupler activates a photo-transistor. The photo-transistor allows a signal current to flow through it to a pin on an optoisolator triac. The triac is activated by a signal from the microprocessor. The phone line signal is directed to the relays. The microprocessor sends a one time activation signal to the triac after it has determined that the phone 110 is off the hook to make an outgoing phone call. This late activation prevents the time-out sensor from falsely reading the ringing or answering incoming call. While the phone is off the hook, the triac will pass a current through a photo-transistor to the microprocessor. The triac will continue to pass current and maintain the high pin state until a circuit break occurs, resulting in a momentary drop in current (and voltage) followed by a resumption of current (and voltage). The microprocessor sends a signal to activate the triac each time the power flowing through it is momentarily halted. The high signal on the time-out pin is turned off. This continues until the triac is reactivated. The triac is activated once per outgoing telephone call. The absence of a high on the pin attached to the triac indicates expiration of the allotted time.

The optoisolator couplers employed, in one embodiment, is part number H11AA814AQT-ND or H11AA814QT-ND manufactured by Optoelectronics. The optoisolator triac may be part number MOC3010QT-ND also manufactured by Optoelectronics. Of course, other components and/or configurations may be used for accomplishing such monitoring.

The relays 130 used in one embodiment of the router 120 have both a normal close circuit and a normal open circuit. The application of a current to the coil will cause the normally open circuit to close, and the normally closed circuit to open. The default state (no power applied to the coil) allows a telephone call to pass through the automatic call router 120. When a current is applied to the coils of relay 1 (R1) 130-1 and relay 2 (R2) 130-2, an alternate path is opened, one that routes the phone line to the DTMF encoder/decoder 126. This re-routing of the phone line allow the microprocessor to monitor/read DTMF tones originating from the phone 110. The microprocessor initiates the monitoring for DTMF tones whenever it detects an outgoing call via the sensors 122. The signal from the microprocessor activating the relay designated relay 2 (130-2) also activates an optoisolator linking the phone line to a common ground, enabling the microprocessor to read the DTMF digits. The microprocessor activates the third relay (R3) 130-3 when it detects a one ("1") as the first DTMF position passing down the telephone line. Although detection of the number "1" as the first DTMF position activates relay 3 (130-3) and deactivates relay 1 (130-1) in the present embodiment, different number(s) and/or different DTMF position(s) may activate relay 3 (130-3) and deactivates relay 1 (130-1). Once relay 130-3 is triggered and relay 130-1 is deactivated, the phone 110 is isolated, and the phone line is seen as being busy to the outside world.

The signal that activates the third relay 130-3 may also activate an optoisolator. This optoisolator provides power needed to allow the phone 110 to continue functioning. When relay 3 (130-3) is activated, 2 kilo-ohm resistor which is connected across the incoming line from the wall enables the system to emulate that the phone 110 is busy. In one embodiment, the relays 130 used are part # G5E-134P-ST-US-DC5 made by Omron. Of course, other components and/or configurations may be used for accomplishing such control over the telephone line wiring.

A stamp 124 is employed by router 120 and comprises a PIC-micro-controller chip (microprocessor), PBasic interpreter chip (software language use to program the microcontroller), EEPROM (electrically erasable programmable read only memory), RAM (Random Access Memory), clock and ports through which information and instructions can be passed. In this embodiment these ports are called pins, and each pin may be in either a high or low state. The microcontroller uses the state of the sensor pins to monitor the phone line for activity. The sensors 122 are attached to specific pins on the micro-controller, and when these pins go high or low, the micro-controller via the program store in its memory, can determine what is happening. The micro-controller is able to detect an active phone state by monitoring the pin connected to the "A" (answer/off hook sensor). The relays 130 used in the router 120 are attached to specific pins of the micro-controller. The micro-controller recognizes which pin is attached to which relay 130, and the program tells the micro-controller when each relay should be employed. The micro-controller can activate a specific relay by outputting a small voltage to the pin attached to that relay coil. When the pin goes high the relay 130 is activated, and when the pin goes low the relay 130 is de-activated. In one embodiment a stamp II 124 manufactured by Parallax Inc./Microchip Technology (part # PIC 16C57) is used. Of course, other components and/or configurations may be used for accomplishing such control and monitoring of telephone line activity.

The CM8880 126 is a fully integrated DTMF transceiver. This transceiver 126 may be interfaced with a computer/microprocessor to detect and interpret DTMF signals. The transceiver 126 is attached to the telephone 110 via the alternate path created when the relay 1 (130-1) and relay 2 (130-2) are activated. By placing the transceiver 126 connection on the alternate path of the phone line, it is protected from the high voltage of a phone ringing. The phone ring consists of both forward and backward flowing (AC) current at a voltage level that could otherwise damage the transceiver 126.

Once the microprocessor detects an outgoing call state, it triggers the relays 130 that bring the transceiver 126 in contact with the phone line. This will enable the transceiver 126 to interpret the DTMF tones on the phone line, and pass it to the microprocessor. Although the current embodiment employs a CM8880 DTMF transceiver made by California Micro Devices (part # CM8880PI), other components and/or configurations may be used for accomplishing such decoding and encoding of DTMF.

A standard 9 volt and a standard 5 volt regulator may be employed as a power source for the router 120. The 5 volt supply may be used to power the DTMF transceiver 126, the relays 130, the sensors 122 to signal the microprocessor and the stamp 124. The 9 volt source powers the isolated telephone 110. The 5 volt and 9 volt regulators used by the router 126 may be, in one embodiment, Japan Radio Company part # NJM7809-FA and NJM7805-FA, respectively. Of course, other components may be used for accomplishing such regulation of voltage.

Modified Automatic Router

FIG. 2A discloses automatic router 120A which has many of the same components as, and largely function similarly to, the router 120 of FIG. 2. In one embodiment, the router 120A is the same as router 120, except that it can communicate with an external device via light, electrical signals, etc. Router 120A can mimic a remote control device via infrared lights signals (by, e.g., infrared emitter 192), or via a wire connecting it to microprocessor 190 inside a recording device.

It should be noted that, in another embodiment, the functionality of stamp 124 can be divided into two separate but linked microprocessors. The EA router 120A may be in communication with the user's answering machine or some other remote user interface device accessible by a telecommunication system.

In one embodiment, the EA router 120A works by mimicking a manufacturer-supplied remote control. This remote control device can, for example, take the form of a hand held light emitting device or a wire-attaching the router 120A to a microprocessor controlling the external device (e.g., TiVo sit on top box).

In one embodiment, the EA router 120A works by mimicking. The infrared emitter 192 (FIG. 2A) component of the EA router 120A can mimic the manufacture's remote control device code signals. This enables the user to key in instructions from a remote site and have the EA router 120A act as their proxy in issuing instruction to their recorder.

In an another embodiment the EA router 120A may be physically connected to the recording device by a wire that jacks into both units. The EA router stamp 124 (FIG. 2A), may send a series of electrical impulses through a connecting wire to a micro-controller in the recording device. The micro-controller 190 (e.g., PIC 16C63 from Microchip, Inc.) in the recording device (FIG. 2A) converts the stamp 124 communicated data into instructions for recording a desired program. This enables the user to key in instructions from a remote site and have the EA router 120A act as a proxy in issuing instruction to their recorder.

Automatic Routing Process

The process of automatic router 120 may be segmented into three functions: (1) monitoring the telephone line for activity; (2) detecting whether a potential discount telephone call is placed; and (3) placing such call at a discounted rate when such rate is available. These processes are described below in detail with reference to FIGS. 3–5 as well as the components illustrated in FIG. 2.

Phone Line Monitoring Process

The phone lines between the wall and the telephone 110 may be comprised of two wires. In one embodiment, the optoisolator of the "A" (answer/off hook) sensor 122-2 and "R" (ringing) sensor 122-1 are arranged in parallel with the telephone 110 red wire coming from the wall socket. The optoisolator of the time out sensor 122-3 is arranged in series with "A" (answer/off hook) sensor 122-2 and "R" (ringing) sensor 122-1. This allows the sensors to monitor phone line activity. In one embodiment, the phone line which the sensors are monitoring is connected to relay 1 (130-1). The optoisolator coupler of the time-out sensor 122-3 is connected to Relay 1 (130-1). Relay 1 is connected to relay 2 (130-2), and relay 2 is connected to the telephone 110. Relay 3 (130-3) is attached to the other wire in the line coming in from the wall and going to the phone 110. In this embodiment relay 3 (130-3) is attached to the green wire. The sensors are attached to the red wires.

Referring to FIG. 3, the automatic router 120 uses a sensor array 122 to monitor the telephone line for activity (i.e., ringing of the phone, answering an incoming call, or initiating a outgoing call) (steps 305 and 310). In FIG. 2 the sensor array 122 is denoted as 122-1 (ring), 122-2 (answer/off hook), and 122-3 (time out)- R.A.T.

The "A" (answering/off hook) sensor 122-2 is connected to the stamp 124 at a pre-determined pin. While this pin remains in a low state, the stamp 124 recognizes that the phone 110 is still on the hook (phone is inactive). The telephone 110 is considered active when it is ringing, being answered, or being used to make an outgoing call. When the phone is active the pin for the "A" (answer/off hook) sensor 122-2 is high.

Upon detecting a high state on the "A" (answer/off hook) sensor pin, the stamp 124 utilizes software to determine the exact nature of the phone active state. The stamp 124 briefly polls the pins for both the "R" (ringing) and "A" (answering) phone sensors. A polling cycle may vary, for example, from 0.3 to 0.6 seconds. The stamp 124 monitors the telephone line for activity that is specific to each of the three possible activities (FIG. 5). If the active state is the result of a ringing condition, the alternating (negative and positive flowing) current will appear as only the bottom portion of FIG. 5A. The reverse diode allows only the negative portion of the ring pattern to be detected. The pattern continues as long as the phone is ringing, and the stamp 124 experiences a series of periodic highs on the "R" (ring) sensor pin.

If the active state is the result of an incoming call being answered, the stamp 124 detects a pattern similar to FIG. 5B, and the "A" (answer/off hook) sensor 122-2 goes high and remains high until the telephone call is over. If the "A" (answer/off hook) sensor 122-2 is high because of an outgoing call, the stamp 124 detects a pattern similar to FIG. 5C. As FIG. 5C illustrates, a brief pause in the flow of current through the "A" (answer/off hook) sensor 122-2 is recognized. After the brief pause, the current will resume to flow and continue to flow until a time out occurs. A time-out is defined as a condition in which the phone company has determined that the phone 110 has been off the hook for a predetermined period of time and no valid phone number has been entered. When this occurs, the phone company may interrupt the calling process with a message instructing the caller to please hang-up and try again. In this embodiment, such message is termed the "time out message."

When the stamp 124 detects a high on the "A" (answer/off hook) sensor 122-2 pin, it briefly polls both the "A" (answer/off hook) sensor 122-2 and "R" (ring) sensor 122-1 for status. If a high on the "R" (ring) sensor 122-1 is detected, a ring-flag is changed from "0" to "1" in the software. The stamp 124 likewise changes the call-flag from "0" to "1" if the high on the "A" (answer/off hook) sensor pin is briefly interrupted. The stamp 124 continues the polling process until it no longer detects a high on the "R" (ring) sensor 122-1 during a polling cycle. Upon detecting a high on the ring sensor, the stamp 124 will restart the polling cycle. Once the ringing stops, or if no ringing is detected within a polling cycle, the stamp 124 polls the "A" (answer/off hook) sensor 122-2 to determine the "call-flag" status. If the call-flag has a value of "1", and the ring-flag has a value of "0", and the "A" sensor is high, then the stamp 124 recognizes that the call is outgoing. If the ring-flag has a value of "1" and the call-flag has a value of "0", and the "A" sensor is high, then the stamp 124 recognizes that the call is an answered incoming call. For a summary, see Table 1 below.

TABLE 1

| Ring-Flag | Call-Flag | Answer/Off Hook Sensor Status | Meaning |
|---|---|---|---|
| 1 | 0 | Low | Phone Ringed But Not Answered |
| 1 | 0 | High | Answer Incoming Call |
| 0 | 1 | High | Outgoing Call |
| 1 | 1 | High/Low | Phone is Ring |

The stamp 124 considers the "A" (answer/off hook) pin going low and remains low at the completion of an active event. The stamp 124 resets itself and goes back to polling the phone line for activity. In one embodiment, the "A" (answer/off hook) pin goes low and remains low once the call is completed and the phone is placed back on the hook.

If an outgoing call is being made, the router 120 will determine the nature of the call by looking, for example, for a "1" in the first position of the phone number being dialed. The absence of a "1," unless discounted local service is available, places the router 120 in a passive mode, and allows the phone call to occur but not to perform its routing function. The presence of a "1" in the first position of the phone number being dialed triggers the router 120 into performing its specialized function (routing the call) as described more fully below. Other series of numbers may be used to trigger router 120. For example, the router 120 may be configured to trigger all calls beginning with "011", or all eleven digit telephone numbers beginning with "1" less 1800, 1888, telephone numbers and the like, or all "9011", or "91" twelve digit phone numbers (usually dialed to gain long distance or international access in settings such as offices or hotels).

Long Distance Call Detection and Router Response Process

Although the system and methods may be configured for all types of telephone service, the process of detecting and routing long distance calls will now be described Referring back to FIG. 3, once an outgoing telephone call is detected in step 315, stamp program determines whether the outgoing telephone call being placed is a long distance call. It should be noted that when an off-hook condition exists but the call is not an outgoing call, the monitoring process for an outgoing call is restarted at the end of the off-hook condition (step 320).

In step 321, the stamp 124 and DTMF decoder 126 determine whether a DTMF tone is detected prior to a time out condition (step 319). In one embodiment, whenever a time out condition is detected, the relays are released (step 334) and the process restarts once the phone is on hook (step 335).

If time-out has not occurred, the stamp 124 will start counting the DTMF signal detected. With each detected DTMF signal, the count is advanced. A determination is then made in step 323 as to whether the number of DTMF tones detected is greater than one. If the count is not greater than 1 (step 323), the stamp 124 advances the system to determine if the first DTMF is equal to one (step 325). The detected DTMF is then stored in memory and the process returns to step 319 (checking for a time-out and new DTMF signal). If the first DTMF is equal to 1, the stamp 124, isolates the phone from the outside world (step 327) and sets the L-flag from "0" to "1" (long distance flag to true) (step 329). The stamp 124 returns the process back to step 319 (checking for a time-out and new DTMF signal).

If the number of detected/stored DTMF signals is greater than one (step 325) and no long distance call is indicated (step 336), the router 120 waits until the phone is on the hook (step 375) before monitoring the phone line again (step 305-310).

The presence of a "1" in the first, or in a predetermined position of the phone number being dialed informs the router 120 that the call is a long distance call. In one embodiment, the router 120 will be monitoring the first position of the dialed telephone number. When the router's microprocessor detects a "1" in the first position of the phone number being dialed, the router 120 assumes an active mode. In the active mode, the router 120 activates relay 3 (130-3) and de-activates relay 1 (130-1), effectuating the isolation of the telephone 110 from the outside world. The internal power source needed to keep the phone 110 functioning is also turned on. The phone 110 uses the power to run its internal DTMF generator enabling the caller to dial their desired phone number.

The DTMF transceiver attached to the telephone line, along the alternate path created by relay 1 (130-1) and relay 2 (130-2) activation, (FIG. 2 between 122-1 and 122-2), captures all dialed DTMF digits and pass them on to the microprocessor. The telephone numbers dialed by the user are captured and stored in the microprocessor RAM memory. While the dialed phone number is being captured, the microprocessor is periodically monitoring the "T" (time out) sensor. Once the microprocessor has captured the required number of DTMF digits to initiate the call it will check the first four digits. The first four digits will tell the router 120 if it should route the call to a discount carrier.

If the caller has dialed a special number such as 1(888), 1(800), 1(900), or 1(600) the router coding effectuates the dialing of the "balance" of the phone number that the user entered and then releases the relays 130. Releasing the relay will reconnect the telephone 110 to the outside world. The term "balance" refers to the condition in which a "1" was dialed before the telephone was isolated from the outside world. Therefore, to complete the call, the router 120 will only have to dial all the entered DTMF digits except the first "1". If the caller did not dial a special phone number, the router dials the "modify balance" of the number and releases the relays 130. In "modify balance" of the number, refers to the condition in which a "1" was already dialed before the telephone was isolated from the outside world. In "modify balance" mode, the router 120 dials the discount number without including the starting "1" when dialing the customer long distance number: for example, 1010-321 1(301)123-1234 would be 010-321 1(201)123-1234; and 1(800)7654321 would be 8007654321. If the long distance carrier requires an access code, the router 120 provides such code. The router 120 waits for the "A" (answer/off hook) sensor pin to go low and remain low before concluding that the call is over, and returns to monitoring the phone line for activity. It should be noted that the router 120 may be reconfigured/programmed such that any individual or series of digits and/or any predetermined positioning of such digit may trigger the discount long distance call placing process. For example, if the router 120 is being used in an office building, hotel or some other location where a "9" is dialed prior to placing outside call, the router 120 may be set (i.e., via a switch access by the user) so that the second position digit is detected for the number "1". If in the process of capturing the long distance telephone number being dialed by the user the "T" (time out) sensor 122-3 should go low (indicating the call can not be completed), the router's microprocessor releases the relays 130 allowing the user to hear the time out message. The microprocessor then waits until the "A" (answer/off hook) sensor 122-2 goes low before resetting the system and monitoring the telephone line for activity.

Returning to FIG. 3, if in step 336, a long distance call is indicated, DTMF tones are stored in memory (step 338) and a determination is made as to whether all of the numbers have been captured (step 342). If all of the numbers have not been captured, a determination is made as to whether a time-out condition has occurred (step 376). If such a condition has not occurred, the router 120 resumes detecting and collecting DTMF signals (step 319). If a time-out condition is sense in step 376, the relays are released (step 377) and the router 120 waits for an on hook condition (step 378) which restarts monitoring of the phone line (steps 305–310).

Discount Long Distance Call Placing Process

If long distance call has been detected (step 336) and all of the numbers have been captured (step 342), router 120 dials the access number for the discount supplier (step 345), provides the access code (if required) (step 350) and dials the telephone number entered by the user (step 355). The relays are then released (step 360), reconnecting the telephone 110 to the outside world allowing communication to occur. An end of call condition is then monitored (steps 365 and 370) upon which the router 120 returns to monitoring of the phone line (steps 305–310).

In certain cases, such as when the telephone user is accessing its dial around service from home, the access code may not be required by the discount long distance carrier. In those cases, the access code is not provided. The appropriate number and code may be, in one embodiment, chosen from a plurality of such numbers and codes in accordance with a predetermined protocol. For example, software may enable router 120 to choose a certain access number/code when such number/code is the most cost-efficient. In another embodiment, the stored access numbers/codes may be utilized on a rotating basis so that the subscribing long distance companies can benefit equally from use of its service while the customer continues to recognize savings associated with the discounted services.

Again, it should be noted that router 120 may be reconfigured such that any individual or series of digits and/or any predetermined positioning of such digits may trigger the discount long distance call placing process. For example, the router 120 may be programmed such that if the DTMF encoder/decoder chip 126 of router 120 senses that the first three number are "011" (or first four numbers are "9011" where "9" is required for an outside line), then an international call is being made. Accordingly, router 120 may be programmed with the appropriate discount international call access numbers in order to apply discounted rates to these calls as well. Once the predetermined sensing is accomplished, the discount long distance call placing process may be effectuated.

Discount Long Distance/International Call Dialing Process

FIGS. 3A and 3B illustrate an embodiment of the present invention for primarily making long distance calls recognizing that the process may include dialing international and local calls. The process described with respect to FIGS. 4A and 4B illustrate an alternate process of effectuating discount long distance and international calls.

In step 402, the process is initiated. In step 406, the router 120 determines whether the telephone 110 is in an off hook condition. If the telephone 110 is experiencing such a condition, relays R2 and R3 are triggered together, isolating the telephone 110 from the outside world. The DTMF decoder 126 monitors whether DTMF signal are detected from the telephone 110 (steps 410 and 412). If DTMF signals are detected, they are stored in memory of the stamp 124 (step 414).

In step 416, the DTMF value and positions are analyzed by the microprocessor. This is done to determine the type of call that is being placed. For example, if the first digit is a "1", a long distance call (call type=1) is being placed. If the first digits are "011", an international call (call type=2) is being placed. If the first digits are "*69", "1800", "1888", or some other preprogrammed special prefix, then the call is classified under the "other" category (call type=3). Most of the remaining calls are local calls (call type=0). The type of call is determined in steps 418–426.

In step 428, a determination is made as to whether a time-out condition has occurred. As described above, if the appropriate number of digits is not captured (or some other problem occurs) within the parameters of the polling protocol, a time-out occurs, the line is released (i.e., user accesses the outside world and hears the time out message).

If no time-out condition occurs, the automatic router 120 checks to see if the DTMF digit count is full (step 436). If it is not full, the process returns to step 410 and awaits further DTMF tones from the telephone 110.

If the DTMF digit count is full, a determination is made as to whether the call is a local call (call type=0) (step 438), a long distance call (call type=1) (step 442), an international (call type=2) or other (call type=3) type of call (step 446). This determination is made by analyzing the beginning DTMFs of a dialed telephone number as described in detail above.

If the call is a local call, the microprocessor 124 dials the captured telephone number in step 440 and relays 130 are released (step 442). If the call is a long distance telephone call, microprocessor 124 dials the long distance access code and the dialed telephone number (step 444) and relays 130 are released (step 442). If the call is an international call, the microprocessor 124 dials the international access code and the number dialed (step 448) and then relays 130 are released (step 442). Finally, if the call being placed is not a local, long distance or international call, automatic router 120 treats the call as meeting the "other" category. Accordingly, the microprocessor 124 dials the captured numbers and the relays are released.

The phone line is then monitored for the end of the call (step 432). Once the call has ended the process returns to the beginning (step 402).

Media Recording Access and Control Process

FIG. 6 illustrates an embodiment of the present invention for accessing and controlling a recording device situated in a remote location. These processes are accomplished by EA router 120A and is described below with reference to FIGS. 2A and 6. The EA router 120A monitors a telephone line for activity, detects whether a potential activity on the phone line allows incoming instructions, captures such instructions and transmits them to an intended device.

As describe below, the EA router 120A is able to receive a string of DTMF tones and translate it into a series of digits. The received string of digits contains coded instructions for the EA router 120A. The instructions tell the EA router 120A how to generate signals that access and properly set the recording device to record a desired program. The user can communicate with their EA router 120A by keying in DTMF tones, supplying information over the internet or by voice commands over telephone to a central site. The central site converts the user's instructions into DTMF tone and transmits them to the user's EA router 120A. The EA router 120A may communicate with the user's recording device via a variety of methods such as light wave (infrared light) or electronic signals (analog or digital signals).

In one embodiment, for example, a request may be placed on a Sunday, to record a program that is aired at 9:30 PM on channel 7 Sunday night. At the central site, where the request is logged in, the user's file is located and checked for validity. If valid, the user's EA router access code, and model number information are retrieved from the user's record. This information is used to generate a numeric string that encodes the command instructions that are required to effectuate the recording. Since each manufacturer may use different remote control codes/pulses for a given digit or command, each user must register the type, brand, and model of their recording device in order to ensure that the EA router 120A can function properly. Panasonic, RCA and Toshiba VCRs, for example, may be encoded to start recording with a 123 cycle (c.p.s.) of duration 20 ms, 210 c.p.s. for 15 ms, and 30 c.p.s. for 50 ms, respectively. In this embodiment, pulses refer to the number of impulse (light/electrical) to be generated in one second. This difference in command coding makes it necessary for each user to register the make and model of their recording device.

In one embodiment, the central site validates the user's identity and collects information regarding the program the user wants to record: day of recording, time of the recording, channel from which to record the program. The central site then generates a string of DTMF tones that encodes the user's access code, channel from which the recording is to be made, the commands to activate the VCR, the commands for rewinding the tape, and the commands for start recording.

EA router 120A, in this embodiment, recognizes that the central site sends a string of DTMF tones in a predetermined format. This allows the EA router 120A to convert the captured DTMF tone sequence into a numeric string that can be segmented into both remote control command codes and access codes. The access codes allows the EA router 120A to recognize that the instructions come from an authorized VCR user. The command codes allows the EA router 120A to turn on the VCR, rewind the tape in the VCR, select the channel to record and then start recording.

In this embodiment, the central site sends the code out anywhere from 5 to 10 minutes before the desired recording time. This reduces the size and amount of coding required to be sent. In another embodiment, the string of DTMF tones sent to the EA router 120A contains coding information for selecting date and time. In other embodiments, the central site may allow interaction with the user's device directly.

In one embodiment, the instruction components may consist of two elements: number of pulses and duration of pulses. Each component may appear in a fixed position in the string and occupies a set number of spaces. If all the spaces are not required, the unneeded portion may be filled with zero(s) (e.g., 0020 is 20 ms).

In one embodiment, the password may be the first (9) nine digits of the decoded DTMF tone numeric string. The access code and the "End Of Data Flag" (#) components of the transmitted string of DTMF tones may not need a duration aspect.

The EA router 120A receives the number of pulses and the duration of a pulse in order to properly mimic a remote control device. Instructions may be transmitted from the central site in the form of code blocks. Each code block (CB) may consist of two distinct aspects: number of pulses and duration per pulse (in milliseconds (ms)).

In a CB, for example, the day of the week for which the recording is to be made is denoted by a single numeric character: Sunday, the first day of the week is "1" and Saturday, the last day of the week is a "7". A "0" can be used to indicate that the recording is to be made on the same day as the entry into the central site. The central site may indicate to the EA router 120A how the instruction codes are to be generated: as monotone or as dual tones (DTMF). If the code is to be generated in mono-tonal manner, the central site may indicate this with a "1" and a dual tone may be indicated with a "2". Further, the central site may use a 24 hours system time system, in which mid-night is 0000 and 1 pm is 1300. The central site may indicate the channel that is to be recorded as a three digit number: allowing for a range of 001 to 999.

The following are tables of codes that may be used in accordance with one embodiment.

| Code Key | Translation |
| --- | --- |
| 0 | If the recording is to be made on the same day as the entry is made into the central site |
| 1 | Recording is to be made on Sunday |
| 2 | Recording is to be made on Monday |
| 3 | Recording is to be made on Tuesday |
| 4 | Recording is to be made on Wednesday |
| 5 | Recording is to be made on Thursday |
| 6 | Recording is to be made on Friday |
| 7 | Recording is to be made on Saturday |
| 1 | Mono-tonal code generation format, instruction codes for controlling the recording device may be generated by the EA router combining the number of impulses and a duration of the impulses. |
| 2 | Dual tonal code generation format, instruction codes for controlling the recording device may be generated by combining two different tones to generate a unique new tone (DTMF). |
| 0000 | The start of the day at midnight |
| ↓ | |
| 1200 | Twelve noon |
| ↓ | |
| 1300 | One in the afternoon |
| ↓ | |
| 2359 | One minute before midnight |
| ↓ | |
| 001 | The channel can range from 1 to 999, channel 7 is 007. |
| ↓ | |
| 999 | |
| ABCD | The number of cycles per second to instruct the recording device to turn on. |
| EFGH | The duration of which the pulses should be transmitted to activate the recording device. Both ABCD & EFGH may be require to mimic the Remote control activation of the recording device. |
| PQRS | The number of cycles per second to instruct the recording device to start recording. |
| TUVW | The duration of which the pulses should be transmitted to start recording. |

Both PQRS & TUVW may be required to mimic the Remote control device to start recording instruction. The cycle duration of both instructions (activate and record) may be the same or different, depending of the recording device manufacture.

In one embodiment, the following string of DTMF tones may be transmitted to the EA router 120A. The position and length of each component of the encoded instructions to the recording device is preset, allowing the EA router 120A to easily convert the central site transmitted data string into an access code, instructions codes that mimic the recording device remote control unit, and a termination flag.

123456789DFTTTT 9999 8888 ABCD EFGH ANMY RETW PQRS TUVW #

123456789012130 0134 0020 0020 0050 0170 0020 0150 0020 #

In one embodiment, the above numeric string of digits may be converted into a string of DTMF tones. A DTMF encoder converts each digit into a distinct DTMF tone. The DTMF tone is transmitted to the EA router 120A. The EA router 120A then converts the DTMF tones back into digits that can be translated into instructions, access code information, and an end of data flag.

POSITION TABLE
123456789DFTTTT ABCD EFGH ANMY RETW PQRS TUVW #

| Segment | Contents | Position |
|---|---|---|
| 123456789 | Access Code | (1-9) |
| D | Day Of Recording | (10) |
| F | Format To Use In Creating Control Codes | (11) |
| TTTT | Time Of Day To Start Recording | (12-15) |
| 9999 | Number Of Pulses In Channel Select Command | (16-19) |
| 8888 | Duration Of The Channel Command | (20-23) |
| ABCD | Number Of Pulses In VCR Activate Command | (27-31) |
| EFGH | Duration Of The Activate Command | (32-35) |
| ANMY | Number Of Pulses In VCR Rewind Command | (36-39) |
| RETW | Duration Of The Rewind Command | (40-43) |
| PQRS | Number Of Pulses In VCR Record Command | (44-47) |
| TUVW | Duration Of The Record Command | (48-51) |
| # | End Of Data Flag | Always Last |

CONTENT TABLE
123456789012130013400200020050017000020150020#

| Segment | Contents | What It Contains |
|---|---|---|
| 123456789 | Access Code | 123456789 |
| 0 | Day Of Recording | Today |
| 1 | Mono Tone Format | Single Tone |
| 2130 | Time Of Day To Start Recording | 9:30 PM |
| 0134 | Number Of Pulses In Channel 7 Command | 134 pulses |
| 0020 | Duration Of The Channel Command | 20 ms |
| 0020 | Number Of Pulses In VCR Activate Command | 20 pulses |
| 0050 | Duration Of The Activate Command | 50 ms |
| 0170 | Number Of Pulses In VCR Rewind Command | 170 pulses |
| 0020 | Duration Of The Rewind Command | 20 ms |
| 0150 | Number Of Pulses In VCR Record Command | 150 pulses |
| 0020 | Duration Of The Record Command | 20 ms |
| # | End Of Data Flag | # |

As shown in FIG. 2A and explained above, the EA router 120A may receive a string of DTMF tones from the central site and convert them into light signals that may be communicated to the recording device via the infrared emitter 192 (FIG. 2A) attached to the stamp/micro-controller 124. An EA router user may enter information about what programs are to be recorded via the internet, wire/wireless phone, fax, etc.

In one embodiment the string of DTMF tones that originate from the central site is generated in the following manner. The user, using the internet, for example, logs into the central site web page and uses a graphical user interface to enter their username and password. The central site checks to ensure that the user is valid. All valid users have registered their EA router 120A, the phone number to which the EA router 120A is attached, brand and model number of their recording device.

In one embodiment the user may enter the day of the week for which they want to record, the time of day that they want to start recording and the channel that they want to record. The central site generates a string of DTMF tones that encodes this information as shown in the tables above. In one embodiment, the registered EA router's access code may be attached to the beginning of the encoded information, and the end of data flag (#) may be attached to the end of the encoded information. This allows the EA router 120A to determine if the incoming string of DTMF tones should be accepted. The end of data flag tells the EA router 120A that all of the sent information has been received, and that it can now proceed with process the string of DTMF tones.

In another embodiment, the EA router 120A user may communicate the user password name, and the pertinent recording information (day, time and channel) for recording a desired program via the phone either by voice response technology or by using the keypad to respond to options heard over the phone. Once the central site has gathered all of the required information, it generates a string of DTMF tones that contains instructions for creating commands that causes the user recording device to record a specific program.

The central site generates a string of DTMF tones that encodes this information as shown above. In one embodiment the registered EA router's access code is attached to the beginning of the encoded information, and the end of data flag (#) is attached to the end of the encoded information. The access code allows the EA router 120A to determine if the captured string of DTMF-tones should be accepted. The end of data flag tells the EA router 120A when the end of the string of DTMF tones is reached, and that it can now begin to process the string into code signals that will mimic a remote control unit.

At step 610, a determination is made as to whether telephone 110 is in an off-hook condition. If it is not, then the EA router 120A awaits such a condition. Once an off-hook condition is established, the micro-controller/stamp 124 may determine whether an outgoing or incoming call is being made (step 615). If the call being made is outgoing, the system and method proceed to 319 of FIG. 3A or step 408 of FIG. 4A (depending on the call type as described above).

The EA router 120A may detect an incoming call in using the method described above. When both an incoming call and off-hook status are detected, the EA router 120A may activate Relay 1 (R1) and Relay 2 (R2). Activation of R1 and R2 (step 620) in this embodiment enables the EA router 120A to detect any DTMF tones that may be transmitted on the incoming phone line (step 625).

If no DTMF tones are detected on the incoming line, the system will continue to await for such tones until the call is terminated. If a string of DTMF tones are detected on the incoming line, the system captures the DTMF tones one by one and converts them into digits using a DTMF decoder.

Captured digit(s) are evaluated and then stored in an array (step 635 and step 640). The process of monitoring the incoming line for DTMF tones continues until one of the captured DTMF tones is a "#": the end of data flag (step 630).

Once the end of data flag is detected "#", the system stores the flag (step 640) and begins to process the captured string of DTMF-tones in the manner indicated above. The system checks the first nine (9) digits to see if they form a valid access code: the access code specific to that EA router 120A (step 645). If this access code does not match the access code stored in the EA router 120A, the entire stored string of digits is erased (step 650). After erasing the digits stored in the array, the system awaits the end of the call (step 655).

If the first nine digits matches the access code stored in the EA router 120A, the system processes the balance of the string of digits in the above-indicated manner. In this embodiment, the digits are converted into code signals that are transmitted by infrared light to the recording device. In one embodiment, the sequence of codes follows an order that allows the recording device to know which channel to record (step 660) and when to start recording (step 665). After the EA router 120A has started the recording process, it erases the stored string of digits (step 675) and deactivates R1 and R2 (step 670). The system then awaits the end of the call (step 655) before resetting itself.

In this embodiment, once the string of digits is converted into valid code signal that the recording device recognizes, the instruction codes are transmitted to the recording device. The transmission mode may be in the form of infrared light impulses generated by the infrared diode/transmitter attached to the EA router 120A (FIG. 2A) and received by the recording device infrared detector.

In another embodiment, once the string of digits is converted into valid code signal that the recording device recognizes, the instruction codes are transmitted to the recording device. The transmission mode may be in the form a direct electrical line between the two devices (EA-Router and Recording Device). The instructions may go directly to a microprocessor/micro-controller inside of recording device. This may obviate the need for an infrared light sensor in the recording device, and permit greater flexibility in the control of the user's recording device.

In another embodiment, the recording device remote control may transmit instructions to the recorder in a dual tone (DTMF) format. The transmitted string of digits (CB) sent from the central site may contain an indicator telling the EA router 120A that the instruction codes are to be generated by combining two distinct tones. A dual tone CB may consist of paired tones ("A" and "B") and may not have or need a duration aspect. The system then retrieves the digits from the tone stream (CB) and convert them into a string of digits that may be used to create specific paired groups of tones. These tones may be combined by the system to form DTMF signals that the recording device would recognize. These signals may be transmitted to the recording device by infrared light or electrical impulses over a wire. In this embodiment the paired tones are indicate below as "A" and "B", and when "A" and "B" are combined, they produce a unique byproduct/signal.

POSITION TABLE
123456789DFTTTT ABCD EFGH ANMY RETW PQRS TUVW #

| Segment | What It Contents | Position |
|---|---|---|
| 123456789 | Access Code | (1–9) |
| D | Day Of Recording | (10) |
| F | Format To Use In Creating Control Codes | (11) |
| TTTT | Time Of Day To Start Recording | (12–15) |
| 9999 | Pulses/second (A) In Channel Select Command | (16–19) |
| 8888 | Pulses/second (B) In Channel Select Command | (20–23) |
| ABCD | Pulses/second (A) In VCR Activate Command | (27–31) |
| EFGH | Pulses/second (B) In VCR Activate Command | (32–35) |
| ANMY | Pulses/second (A) In VCR Rewind Command | (36–39) |
| RETW | Pulses/second (B) In VCR Rewind Command | (40–43) |
| PQRS | Pulses/second (A) In VCR Record Command | (44–47) |
| TUVW | Pulses/second (B) In VCR Record Command | (48–51) |
| # | End Of Data Flag | Always Last |

CONTENT TABLE
1234567890121300134032001900150017002000150018 0#

| Segment | Contents | What It Contains |
|---|---|---|
| 123456789 | Access Code | 123456789 |
| 0 | Day Of Recording | Today |
| 1 | Mono Tone Format | Single Tone |
| 2130 | Time Of Day To Start Recording | 9:30 PM |
| 0134 | Pulses/second (A) In Channel Select Command | 134 pulses/sec. |
| 0320 | Pulses/second (B) In Channel Select Command | 320 pulses/sec. |
| 0190 | Pulses/second (A) In VCR Activate Command | 190 pulses/sec. |
| 0150 | Pulses/second (B) In VCR Activate Command | 150 pulses/sec. |
| 0170 | Pulses/second (A) In VCR Rewind Command | 170 pulses/sec. |
| 0200 | Pulses/second (B) In VCR Rewind Command | 200 pulses/sec. |
| 0150 | Pulses/second (A) In VCR Record Command | 150 pulses/sec. |
| 0180 | Pulses/second (B) In VCR Record Command | 180 pulses/sec. |
| # | End Of Data Flag | # |

It should be noted that the example above describes accessing a media recording device by a user over a telephone line. It should be noted that many other types of communication networks may be used including, but not limited to, the internet, cable networks, wireless networks, etc. Further, although the example above describes an infrared emitter 192 accessing a media recording device, the emitter 192 may be replaced with another type of emitter (i.e., infrared, ultra-violet, RF, electrical signals, blue tooth technology) and the activated device may be any device that can receive such a signal.

It will be apparent to those skilled in the art that various modifications and variations can be made in the system and processes of the present invention without departing from the spirit or scope of the invention. Thus, it is intended that the present invention cover the modifications and variations of this invention provided they come within the scope of the appended claims and their equivalents. In this context, equivalents means each and every implementation for carrying out the functions recited in the claims, even if not explicitly described herein.

What is claimed is:

1. A method for controlling one or more remote targeted devices over a communication network by accessing a central computer, selecting a specific targeted device at a remote location, and entering instruction that will control future behavior of said targeted device at said remote location, comprising:
   accessing a central computer using a plurality of remote data entry points;
   accessing a central computer using a plurality of remote data entry modes;
   a central computer able to process and store instructions inputted from a plurality of data entry points;
   a central computer able to determine if incoming instructions are authorized to be accepted and forwarded to a specific remote location;
   a central computer able to forward instructions over a communication system to a chosen remote location where said instructions will be relayed to a targeted device; said targeted device accepting instructions that will control said device future behavior.

2. The method of claim 1, further comprising:
   a central computer receiving one or more DTMF tones over said communication network; and
   translating said tones into said instructions that can affect the future behavior of a specific device located at a remote location.

3. The method according to claim 2, further comprising:
   a central computer determining what information is encoded within a string of DTMF tones by analyzing order in which DTMF tones are received; and
   generating instructional coding that corresponds to the detected sequence of DTMF tones.

4. A method for controlling the future behavior one or more remotely located appliances at a remote site using instruction communicated over a communication network from a remote input terminal, comprising:
   a) monitoring a communication network linked of a central computer to detect incoming instructions from a remote data entry terminal;
   b) determining whether communication between a central computer and a remote site is established to transmit instructions to a device located at said remote site;
   c) a central computer for storing, processing, and transmitting instructions received from a remote data entry terminal;
   d) a central computer able to transmit the process instructions to a device located at a specific remote site;
   e) a device located at a remote site able to determine whether the incoming instructions are authorized to be used at said specific remote site;
   f) device able to transmitting any received instructions to a targeted appliance; and
   g) controlling the future behavior of the targeted appliances based on said instructions.

5. The method of claim 4, further comprising:
   a server receiving DTMF tones over said communication network from a remote input terminal; and
   translating said tones into instructions and information that is directed to a targeted remote site according to input received by the central computer.

6. The method according to claim 5, further comprising:
   a central computer analyzing the position and nature of DTMF tones to decipher the information contained within said DTMF.

7. The method according to claim 5 wherein the DTMF tones encoding information are transmitted by a central server over a telecommunication network to a site remote to both the server and the remote data entry terminal.

8. The method according to claim 5 wherein the DTMF tones encoding information are transmitted over the Internet to a central server where information and instructions are extracted and process before being passed on to a remote targeted site where said instructions will affect the future behavior of an appliance.

9. The method of claim 5, further comprising: a device at the remote site converting said DTMF tones received from the central computer into infrared light signals containing instructions that will control the behavior of the targeted appliance.

10. The method of claim 5, further comprising: a device at the remote site converting said DTMF tones received from the central computer into audio signals containing instructions that will control the behavior of the targeted appliance.

11. The method of claim 5, further comprising: the device at the remote site converting said DTMF tones received from the central computer into electrical signals containing instructions that are conveyed by cable to the target appliance, and wherein said instructions will control the future behavior of the targeted appliance.

12. A system for controlling a specifically targeted appliance at a remote location using information entered from a remote input terminal to a central computer that relay the instructions to a targeted device via a communication network, comprising:
   a means for central computer to monitor for incoming communication from a plurality of remote input terminals that are linked to said computer via a communication network;
   a means for determining whether said incoming communication contains valid instructional information;
   a means for processing, storing, and forwarding said instructional information from the central computer to a device at a targeted remote location;
   a mean for the device at the remote location to determine whether any incoming information over a communication network is authorized to be accepted as valid and proper;
   a means for the instructional information received by the device at the remote location being conveyed to said targeted appliance; and controlling said appliance future behavior using the instructions received from the remote input terminal.

13. The system of claim 12, further comprising:
a means for the central computer to receive DTMF tones encoded instructions over a communication network;
a means for he remotely located device to receive instructional information in the form of DTMF tones over said communication network; and
a means for translating said tones into instructions that will control a targeted appliance future behavior.

14. The system according to claim 12, further comprising:
a means for analyzing the position of each DTMF tone in a string of DTMF tones to determine what information is encoded in the string; and
a means for translating said information into instructions that will control a specific appliance at a remote location.

15. A system for controlling one or more remotely targeted appliance by transmitting instructional information received from a remote input terminal over a communication system, comprising:
a means for a central server to collect information from a plurality of remote input points linked to said server via a communication system;
a means for monitoring a communication system for activity between a server at a central location and a remote input terminal;
a means for determining whether a device at a targeted remote location can detect incoming instructions over the communication system;
a means for determining whether the remote device is authorized to allow acceptance of input from the server;
a means for transmitting incoming instructional information to a targeted device when reception of incoming instructions is enabled;
a means for transmitting said instructions from said device to a targeted appliance; and
a means for controlling said appliance future behavior based on said instructions.

16. The system of claim 15, further comprising:
a means for said targeted device to receive one or more DTMF tones over said communication system; and
a means for translating any received DTMF tones into instructions that will control the behavior a targeted appliance located at the remote location.

17. The system according to claim 16, further comprising:
a means for determining what information is encoded into a sequence of DTMF tones by analyzing order in which the tones are arranged; and means for translating said information into an access code, targeted appliance location identify, and instructions to be used by the server to in affecting the behavior of said targeted appliance at the remote location.

18. The system according to claim 16, wherein the DTMF-tones are transmitted via a communication system to a central server from a remote input terminal and from the central server to the targeted device at a remote location.

19. The system according to claim 16, wherein said DTMF-tones are transmitted via the Internet to a central server from a remote input terminal and from the central server to the targeted device at a remote location.

20. The system of claim 16, further comprising:
a means for said device to convert said DTMF-tones into Bluetooth Technology signals containing said instructions that will affect the future behavior of a targeted appliance.

21. The system of claim 15, further comprising:
a means for said device to convert said DTMF-tones into audio signals containing said instructions that will affect the future behavior of a targeted appliance.

22. The system of claim 15, further comprising:
a means for said device to convert said DTMF-tones into electrical pulses containing said instructions that will affect the future behavior of a targeted appliance.

23. A system for controlling a remotely located appliance by relaying instructions from a remote input terminal to a device over a communication system, comprising:
a device with a processor at a remote location configured for monitoring a communication system for incoming activity from a central computer;
a device further configured for determining whether incoming activity in a form of DTMF-tones over the communication system should be accept by said device;
a central computer having memory for storing incoming instructions from a remote input terminal;
a device at the remote location able to monitor the incoming activity on the communication system for the existence of a signal that enables the central computer forwarded instructions to be accepted as being authorized;
a device at the remote location able to transmit received instructions to said appliance; and said instructions are able to control the future behavior of the appliance.

24. The system of claim 23, further comprising:
a device containing a decoder configured for translating DTMF tones into instructions by generating signals that the targeted appliance will recognize as valid incoming instruction code.

25. The system according to claim 23, wherein a device is further configured for analyzing the position of a DTMF tone in a string of DTMF tones to determine what information is encoded in said string; and
translating the string of DTMF tones into instructions.

26. A system for controlling one or more remote appliance with instructions communicated over a communication network from a input terminal remote to a central computer, comprising:
a device with a processor located at a remote location configured to monitor a communication network for incoming instructions from a central computer;
a plurality of remote input terminals configured to transmit information to a central computer via a communication network;
a central computer configured to receive information from a plurality of remote input terminals via a communication network;
a central computer with memory configured for processing and storing information received from a remote input terminal;
a central computer configured to determine whether a valid password, target location, and instructions are contained in the information received from a remote input terminal;
a central computer able to send said instructions to a targeted location using a communication network;
a device with a processor located at a remote location able to receive instructions over said network from said central computer and able to transmit the received instructions to a targeted appliance at said remote location; and
control said appliance future behavior with said instructions.

27. The system of claim 26, further comprising:
a processor within the device at a remote location configured for transmitting received electrical pulses that containing instructions to the targeted appliance.

28. The system according to claim 26, wherein information is encoded in electrical pulses transmitted to a central server over a communication network from a remote input terminal.

29. The system according to claim 27, wherein the said electrical pulses are transmitted via the Internet from a remote input terminal to a central server.

30. The system of claim 27, wherein the device with a processor is further configured for converting said electrical pulses into Bluetooth Technology signals that encode the instructions that originated from the remote input terminal.

31. The system of claim 26, wherein the device with a processor is further configured for converting said electrical pulses into audio signals that encode the instructions that originated from the remote input terminal.

32. The system of claim 26, wherein the device with a processor at the remote location is further configured for converting received instructions into electrical pulses that are communicated to a microprocessor located in a targeted appliance via a cable.

33. The system of claim 27, wherein the processor within the targeted appliance is further configured for processing electrical pulses that encode instructions that were forwarded from a central computer and said instructions will affect future behavior of said appliance.

34. The system according to claim 26, wherein the processor at a remote location is further configured for decoding instructions from a string of DTMF tones by analyzing the order in which tones are arranged in a string; and said processor is further configured for transmitting the decoded instructions to a targeted device.

35. The system of claim 32, wherein the electrical pulses containing said incoming instructions are transmitted from the device to a microprocessor located in the remote device.

36. The system according to claim 26, wherein the processor at a remote location is further configured for decoding instructions from a string of DTMF tones by analyzing order in which the tones are arranged in the string; and said processor is further configured for transmitting the decoded instructions to a targeted device.

37. A computer readable medium having computer executable software code stored thereon, the code for controlling at least one remote device over a communication system, comprising:
code for enabling a remotely located computer to monitor a communication system for activity;
code for enabling a computer to determine whether an incoming activity from an input terminal contains instructions for controlling a device at a remote location;
code for enabling a remotely located processor to accept incoming instructions from a computer;
code for enabling a remotely located processor to determine whether incoming instructions over a communication system are authorized to be relayed to a device at a remote location;
code for storing incoming instructions when activity on the communication system enables reception of incoming instructions;
code for enabling a remotely located processor to transmit said incoming instructions to said device; and
code for controlling said device based on said instructions.

38. A method for controlling future behavior of least one remotely located device via a communication system, comprising:
a server able to monitor a communication system for activity for incoming information containing an access code, remote location id, and instructions;
determining whether the incoming information is authorized to be accepted by the server;
processing and storing said incoming information when said activity on the communication system contains a signal indicating that the incoming information should be process and forwarded to a remote device; and
controlling the behavior of said device with the instructions received from the server.

39. A system for controlling the future behavior of at least one remotely located appliance, comprising:
a means for a server to monitor a communication system for information from a remote input terminal;
a means for detecting whether activity on the communication system contains coding authorizing reception of any incoming information;
a means for directing information stored on a server to a remote location according to direction received from a remote input terminal; and
a means for transmitting information that will affect the future behavior of a targeted device.

40. A system for controlling behavior of an appliance using a communication system to transmit time delayed instructions received from a remote input device, comprising:
a central server containing executable software code stored for monitoring a communication network for activity incoming from a plurality of remote input terminals;
a central server containing code for storing and validating and processing incoming instructions received over a communication network from a remote input device;
a central server containing code for determining whether instructions forwarded from said server over a communication network are authorized to be accepted at a remote location;
a device at a remote location able to accept instructions forwarded from said server and transmit said instructions to a targeted appliance; and
affect the behavior of the appliance with said instructions.

41. A system for affecting behavior of a remotely located appliance using a communication system to transmit time delayed instructions received from a remote input device, comprising:
a means for monitoring a communication system for incoming instructions from a remote input terminal;
a means for determining whether incoming instructions are accompanied by a valid authorizing password for controlling a targeted device at a remote location;
a means for enabling reception of any incoming instructions from a central computer;
a means for storing said incoming instructions when authorization received over the communication system enables reception of incoming instructions; and
a means for transmitting said incoming instructions to said remote appliance.

42. A computer readable medium having computer executable software code stored thereon, the code for controlling at least one remote device over a communication system, comprising:
code for enabling a remotely located computer to monitor a communication system for activity;

code for enabling a computer to determine whether an incoming call from an input terminal contains instructions for controlling a device at a remote location;

code for enabling a remotely located processor to accept incoming instructions from a computer;

code for enabling a remotely located processor to determine whether incoming instructions over a communication system are authorized to be relayed to a device at a remote location;

code for storing incoming instructions when activity on the communication system enables reception of incoming instructions;

code for enabling a remotely located processor to transmit said incoming instructions to said device; and code for controlling said device based on said instructions.

43. A remotely located server programmed for controlling a remotely located appliance by transmitting instructions over a communication system, comprising:

a central computer accessible to a plurality of remote input terminals via a communication system;

a central computer able to store and process information received from a plurality of remote input terminals;

a central computer able to response to received information from each remote input terminal by directing output to a specific remote location corresponding to the received information;

a central computer able to response to received information from each remote input terminal by directing an access coded and instructions to a specific remote location corresponding to the received information;

a device at the remote location is able to accept instructions received over a communication network once a valid access code is detected;

a device able to transmit received instructions to an appliance and effect said appliance behavior.

44. A remote input device able to relay instructions to a targeted device at remote location by transmitting instructions and an access code over a communication system to a server and said server re-transmitting the access code and instructions to an appliance at a remote location, comprising:

an input terminal able to transmit instructions and an access code over a communication system to a server for processing;

a server able to monitor a communication system for incoming information from a remote input terminal;

a server able to determine whether a received input from the input terminal should be accepted, process and stored in memory for future forwarding to a previously added location;

a server able to forward the process information over the communication system to a specific remote location;

a device at the remote location able to check for a valid access code before accepting the information forwarded from the server to the remote location;

a device able to transmit information received from the server to a targeted appliance at the remote location; and affect the future behavior of said appliance.

45. A method for controlling at least one remote device over a communication system, comprising:

monitoring a communication system for activity; detecting whether an outgoing call is being made;

determining whether activity on the communication system contains instructions;

storing incoming instructions when activity on the communication system contains a signal indicating that the incoming instructions are authorized to be process and forwarded to a remote device; and controlling behavior of a targeted appliance with the instructions the remote device received and relayed to said appliance.

46. A method for controlling future behavior of a remotely located appliance by transmitting instructions over a communication system using a central computer and a plurality of remote input terminals, comprising:

monitoring a communication system for activity; determining whether the communication system is able to relay instructions from a remote terminal to a central computer;

determining whether an incoming call is made from the central computer that is transmitting instruction to a remote location;

determining whether activity on the communication system contains a valid password that will enable reception of any incoming instructions;

storing said incoming instructions when valid authorization password enables reception of incoming instructions;

transmitting said incoming instructions to said device; and controlling said device based on said instructions.

47. A remote input device able to relay instructions to a targeted device at remote location by transmitting instructions and access codes over the Internet to a server and said server re-transmitting the access code and instructions to an appliance at a remote location, comprising:

an input terminal able to transmit instructions and an access code over a communication system to a server for processing;

a server able to monitor the Internet for incoming information from a remote input terminal;

a server able to determine whether received input from the input terminal should be accepted, process and stored in memory for future forwarding to a previously added location;

a server able to forward the process information over the Internet to a specific remote location;

a device at the remote location able to check for a valid access code before accepting the information forwarded from the server to the remote location;

a device able to transmit information received from the server to a targeted appliance at the remote location; and affect future behavior of said appliance.

48. A device able to affect future behavior a targeted appliance at a remote location by enabling the reception of instruction from a remote input terminal, comprising:

a means for a server to monitor a communication system for activity incoming from a remote input terminal;

a means for a server to determine whether activity incoming over a communication system from a remote input terminal contains information should be process and stored;

a means for a server store any incoming information from a remotely located terminal when it contains an access code, a remote location identifier, and instructions;

a means for the server to transit the information over a communication system to a targeted remote location;

a means for the transmitted information to be convey to a selected appliance at the remote location; and controlling said appliance behavior with said instructions.

49. A method for controlling future behavior of a remotely located appliance by transmitting instructions over a communication system using a central computer and a plurality of remote input terminals, comprising:
- a means for a server to monitor a communication system for incoming activity containing instructional information and a valid access code;
- a means for a server to process and store information received over a communication system;
- a means for a server to transmit the process information to a targeted appliance at a remote location; and
- affect the appliance behavior with the transmitted information.

50. A system for controlling at least one remote appliance, comprising:
- a means for a server to monitor a communication system for incoming information related to controlling an appliance located at a remote location;
- a means for monitoring information inputted into a server over a communication system from a remote input terminal;
- a means for determining whether the communication system has established a connection between the server and a device at a remotely targeted location;
- a means for determining whether the remotely targeted device attached to the communication system is authorized to accept incoming information;
- a means for a device at the remote location to transmit received information as electrical impulses that are conducted to the targeted appliance via a connecting cable; and
- controlling said appliance based on said information.

51. A system for controlling behavior at least one remotely located appliance using a communication system, comprising:
- a means for a server to monitor a communication system for incoming information related to controlling an appliance located at a remote location;
- a means for monitoring information inputted into a server over a communication system from a remote input terminal;
- a means for determining whether the communication system has established a connection between the server and a device at a remotely targeted location;
- a means for determining whether the remotely targeted device attached to the communication system is authorized to accept incoming information;
- a means for a device at the remote location to transmit received information as Bluetooth Technology signals to the targeted appliance; and
- controlling said appliance based on said information.

52. A system for controlling future behavior one remotely located appliance using a communication system, comprising:
- a means for monitoring a communication system for incoming activity in the form of an access code and instructions from a plurality of remote data input terminals;
- a means for the server to determine when to forward the information received from a remote input terminal;
- a means for the server to establish contact with a targeted remote location over the communication system;
- a means for a server to determine whether a device at a remote location is able to accept information;
- a means for a device at a remote location to determining whether the incoming information from the server is correctly targeted the remote location;
- a means for the device at the remote location to transmit received information to a targeted appliance at said remote location; and
- for said information to control future behavior of said appliance.

53. A system for controlling a remotely located appliance with instructions forwarded from a remotely located input terminal, comprising the steps of:
- a remotely located input terminal able to transmit instructions to a central server over a communication system;
- a remotely located server able to monitor a connection to a communication system for incoming information from a remote input terminal;
- a server able to determine whether the information communicated over a communication system should be accepted by said server;
- a server able to process and store information received over a communication system and later transmit the process information to a remote location;
- a server able to detect a valid access code, a remote location identification, and instructions in the information received from the remotely located input terminal;
- a remote location able to accept information from a remote server and determine whether said information contains a valid access code;
- ability to convey instructions from said server to a targeted appliance; and control future behavior of said appliance based on said instructions.

* * * * *